(12) United States Patent
Park et al.

(10) Patent No.: US 12,674,955 B2
(45) Date of Patent: Jul. 7, 2026

(54) LENS DRIVING DEVICE AND CAMERA MODULE COMPRISING SAME

(71) Applicant: LG INNOTEK CO., LTD., Seoul (KR)

(72) Inventors: Sang Ok Park, Seoul (KR); Byung Wook Son, Seoul (KR); Seong Min Lee, Seoul (KR); Jun Taek Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 436 days.

(21) Appl. No.: 18/322,272

(22) Filed: May 23, 2023

(65) Prior Publication Data

US 2023/0296858 A1     Sep. 21, 2023

Related U.S. Application Data

(63) Continuation of application No. 17/661,686, filed on May 2, 2022, now Pat. No. 11,698,509, which is a
(Continued)

(30) Foreign Application Priority Data

| Mar. 5, 2014 | (KR) | .......................... | 10-2014-0026062 |
| May 9, 2014 | (KR) | .......................... | 10-2014-0055364 |
| Aug. 20, 2014 | (KR) | .......................... | 10-2014-0108487 |

(51) Int. Cl.
*G02B 7/04* (2021.01)
*G02B 7/08* (2021.01)
(Continued)

(52) U.S. Cl.
CPC ................. *G02B 7/08* (2013.01); *G03B 3/10* (2013.01); *H02K 41/0356* (2013.01); *G03B 2205/0069* (2013.01)

(58) Field of Classification Search
CPC . G02B 7/08; G02B 7/026; G02B 7/04; G02B 7/09; G02B 13/001
See application file for complete search history.

(56) References Cited

U.S. PATENT DOCUMENTS

| 4,727,529 A | 2/1988 | Araki |
| 5,220,461 A | 6/1993 | Inoue et al. |
| (Continued) | | |

FOREIGN PATENT DOCUMENTS

| CN | 1190746 A | 8/1998 |
| CN | 1959453 A | 5/2007 |
| (Continued) | | |

OTHER PUBLICATIONS

Office Action dated Feb. 25, 2025 in Japanese Application No. 2023-130061.
(Continued)

*Primary Examiner* — Joseph P Martinez
(74) *Attorney, Agent, or Firm* — SALIWANCHIK, LLOYD & EISENSCHENK

(57) ABSTRACT

A lens driving device according to an embodiment comprises: a movable unit on which at least one lens is mounted; a first coil and a driving magnet which face and interact with each other such that the movable unit is moved in the optical axis direction of the lens; a position sensor for sensing the position of the movable unit in the optical axis direction or a driver comprising the position sensor; and a positively magnetized magnet arranged to face the position sensor or the driver, wherein the positively magnetized magnet comprises a first side surface, which faces the position sensor and has a first polarity, and a second side surface, which faces the position sensor, which is arranged to be spaced from the first side surface in a direction parallel with the optical axis direction or arranged to abut the first side surface, and which has a second polarity that is the opposite
(Continued)

of the first polarity of the first side surface, and the length of the first side surface in the optical axis direction may be equal to or larger than the length of the second side surface in the optical axis direction.

20 Claims, 44 Drawing Sheets

Related U.S. Application Data continuation of application No. 16/289,466, filed on Feb. 28, 2019, now Pat. No. 11,353,679, which is a continuation of application No. 15/123,906, filed as application No. PCT/KR2015/001825 on Feb. 25, 2015, now Pat. No. 10,295,781.

(51) Int. Cl.
   *G03B 3/10*      (2021.01)
   *H02K 41/035*    (2006.01)

(56)                References Cited

U.S. PATENT DOCUMENTS

| | | | |
|---|---|---|---|
| 5,541,777 | A | 7/1996 | Sakamoto et al. |
| 5,715,622 | A | 2/1998 | Giordano, Jr. et al. |
| 7,152,040 | B1 | 12/2006 | Hawthorne et al. |
| 7,598,925 | B2 | 10/2009 | Koyama et al. |
| 8,310,774 | B2 | 11/2012 | Lee |
| 8,390,946 | B2 | 3/2013 | Hu et al. |
| 9,001,224 | B2 | 4/2015 | Moriya et al. |
| 9,310,584 | B2 | 4/2016 | Lam |
| 9,554,023 | B2 | 1/2017 | Park |
| 9,766,476 | B2 | 9/2017 | Yeo |
| 10,042,140 | B2 | 8/2018 | Park |
| 10,107,987 | B2 | 10/2018 | Osaka et al. |
| 10,116,849 | B2 | 10/2018 | Park |
| 10,197,762 | B2 | 2/2019 | Park et al. |
| 10,222,579 | B2 | 3/2019 | Park et al. |
| 10,606,025 | B2 | 3/2020 | Lee et al. |
| 10,656,375 | B2 | 5/2020 | Kim et al. |
| 10,712,530 | B2 | 7/2020 | Park et al. |
| 2003/0164694 | A1 | 9/2003 | Moseneder et al. |
| 2005/0174009 | A1 | 8/2005 | Kayama et al. |
| 2006/0267421 | A1 | 11/2006 | Aoshima |
| 2007/0047942 | A1 | 3/2007 | Chang et al. |
| 2007/0097530 | A1 | 5/2007 | Kuo et al. |
| 2007/0177279 | A1 | 8/2007 | Cho et al. |
| 2007/0242152 | A1 | 10/2007 | Chen |
| 2011/0122495 | A1 | 5/2011 | Togashi |
| 2011/0170204 | A1 | 7/2011 | Park et al. |
| 2012/0008220 | A1 | 1/2012 | Lee et al. |
| 2012/0026611 | A1 | 2/2012 | Hu et al. |
| 2012/0148223 | A1 | 6/2012 | Chiu et al. |
| 2012/0154938 | A1 | 6/2012 | Ohishi et al. |
| 2012/0200176 | A1 | 8/2012 | Park |
| 2012/0314307 | A1 | 12/2012 | Ikushima et al. |
| 2013/0050828 | A1 | 2/2013 | Sato et al. |
| 2013/0088607 | A1 | 4/2013 | Akutsu et al. |
| 2013/0163085 | A1 | 6/2013 | Lim et al. |
| 2013/0293179 | A1 | 11/2013 | Lee |
| 2014/0072289 | A1 | 3/2014 | Lim et al. |
| 2014/0104486 | A1 | 4/2014 | Seol et al. |
| 2015/0319345 | A1 | 11/2015 | Park |
| 2016/0178923 | A1 | 6/2016 | Hayashi |
| 2017/0115463 | A1* | 4/2017 | Osaka ............... H02K 41/02 |

FOREIGN PATENT DOCUMENTS

| | | | |
|---|---|---|---|
| CN | 101055342 | A | 10/2007 |
| CN | 101231373 | A | 7/2008 |
| CN | 102062926 | A | 5/2011 |
| CN | 102073194 | A | 5/2011 |
| CN | 102315748 | A | 1/2012 |
| CN | 102629815 | A | 8/2012 |
| CN | 102650723 | A | 8/2012 |
| CN | 102902038 | A | 1/2013 |
| CN | 103166417 | A | 6/2013 |
| CN | 203761238 | U | 8/2014 |
| EP | 0 469 532 | A2 | 2/1992 |
| EP | 0 618 664 | A2 | 10/1994 |
| JP | 10-225083 | A | 8/1998 |
| JP | 11-289743 | A | 10/1999 |
| JP | 2006-235583 | A | 9/2006 |
| JP | 2007-121850 | A | 5/2007 |
| JP | 2007-128072 | A | 5/2007 |
| JP | 2008-58391 | A | 3/2008 |
| JP | 2010-8446 | A | 1/2010 |
| JP | 2011-102824 | A | 5/2011 |
| JP | 2012-27051 | A | 2/2012 |
| JP | 2012-27433 | A | 2/2012 |
| JP | 2012-68339 | A | 4/2012 |
| JP | 2012-177753 | A | 9/2012 |
| JP | 3179634 | U | 11/2012 |
| JP | 2013-033179 | A | 2/2013 |
| JP | 2013-513821 | A | 4/2013 |
| JP | 3183101 | U | 4/2013 |
| JP | 2013-127492 | A | 6/2013 |
| JP | 2013-167867 | A | 8/2013 |
| JP | 2013-190705 | A | 9/2013 |
| JP | 3186519 | U | 10/2013 |
| JP | 2014-21397 | A | 2/2014 |
| JP | 2014-35367 | A | 2/2014 |
| JP | 2020-52238 | A | 4/2020 |
| JP | 2020-154254 | A | 9/2020 |
| KR | 10-2008-0010861 | A | 1/2008 |
| KR | 10-2010-0105307 | A | 9/2010 |
| KR | 10-2012-0012086 | A | 2/2012 |
| KR | 10-2012-0025811 | A | 3/2012 |
| KR | 10-2012-0078915 | | 7/2012 |
| KR | 10-2012-0090379 | A | 8/2012 |
| KR | 10-2012-0097117 | A | 9/2012 |
| KR | 10-2013-0015666 | A | 2/2013 |
| KR | 10-2013-0060535 | A | 6/2013 |
| KR | 10-2013-0073379 | A | 7/2013 |
| KR | 10-2013-0073380 | A | 7/2013 |
| KR | 10-2013-0088052 | A | 8/2013 |
| KR | 10-1343197 | B1 | 12/2013 |
| KR | 10-2014-0059329 | A | 5/2014 |
| TW | 200708873 | A | 3/2007 |
| TW | 201205143 | A1 | 2/2012 |
| WO | 2009/133690 | A1 | 11/2009 |
| WO | 2011/105470 | A1 | 9/2011 |
| WO | 2012/015010 | A1 | 2/2012 |
| WO | 2013/094963 | A1 | 6/2013 |
| WO | 2014/025167 | A1 | 2/2014 |

OTHER PUBLICATIONS

Office Action dated Dec. 11, 2024 in Korean Application No. 10-2024-0033338.

Office Action dated Feb. 11, 2022 in Korean Application No. 10-2021-0143111.

Office Action dated Oct. 21, 2021 in Chinese Application No. 201910661265.9.

Office Action dated Nov. 4, 2020 in Japanese Application No. 2019-201698.

Office Action dated Dec. 7, 2020 in Korean Application No. 10-2014-0108487.

International Search Report dated May 28, 2015 in International Application No. PCT/KR2015/001825.

Office Action dated Jul. 17, 2018 in Chinese Application No. 201580024027.7, along with its English translation.

Office Action dated Jul. 25, 2018 in related co-pending application, U.S. Appl. No. 15/937,330.

Office Action dated Feb. 12, 2019 in Japanese Application No. 2016-555679.

Notice of Allowance dated Mar. 19, 2021 in U.S. Appl. No. 16/655,943.

Office Action dated Feb. 24, 2021 in Chinese Application No. 201910661265.9.

(56) References Cited

OTHER PUBLICATIONS

Office Action dated Mar. 12, 2021 in Chinese Application No. 201910661282.2.
Office Action dated Mar. 17, 2021 in Korean Application No. 10-2021-0000933.
Office Action dated Mar. 25, 2019 in European Application No. 15758167.9.
European Search Report dated Jul. 9, 2020 in European Application No. 20168004.8.
Office Action dated May 7, 2020 in Korean Application No. 10-2014-0026062.
Office Action dated Nov. 10, 2020 in U.S. Appl. No. 16/655,943.
Office Action dated Apr. 6, 2022 in Chinese Application No. 201910661265.9.
Notice of Allowance dated Dec. 24, 2021 in U.S. Appl. No. 16/289,466.

Office Action dated Sep. 1, 2021 in U.S. Appl. No. 16/289,466.
Notice of Allowance dated Aug. 8, 2022 in Korean Application No. 10-2021-0164880.
Notice of Allowance dated Aug. 24, 2022 in Korean Application No. 10-2021-0143111.
Office Action dated Aug. 10, 2022 in Japanese Application No. 2021-112328.
Office Action dated Feb. 21, 2023 in Japanese Application No. 2021-112328.
Office Action dated Dec. 26, 2022 in Korean Application No. 10-2022-0148284.
Notice of Allowance dated Feb. 23, 2023 in U.S. Appl. No. 17/661,686.
Office Action dated Jul. 18, 2024 in Korean Application No. 10-2024-0006323.
Office Action dated Aug. 6, 2024 in Japanese Application No. 2023-130061.

* cited by examiner

FIG. 47

LENS DRIVING DEVICE AND CAMERA MODULE COMPRISING SAME

CROSS-REFERENCE TO RELATED APPLICATIONS

This application is a continuation of U.S. application Ser. No. 17/661,686, filed May 2, 2022; which is a continuation of U.S. application Ser. No. 16/289,466, filed Feb. 28, 2019, now U.S. Pat. No. 11,353,679, issued Jun. 7, 2022; which is a continuation of U.S. application Ser. No. 15/123,906, filed Sep. 6, 2016, now U.S. Pat. No. 10,295,781, issued May 21, 2019; which is the U.S. national stage application of International Patent Application No. PCT/KR2015/001825, filed Feb. 25, 2015; which claims priority to Korean Application Nos. 10-2014-0026062, filed Mar. 5, 2014; 10-2014-0055364, filed May 9, 2014; and 10-2014-0108487, filed Aug. 20, 2014; all of which are hereby incorporated by reference in their entirety.

TECHNICAL FIELD

Embodiments relate to a lens driving device and a camera module including the same.

BACKGROUND ART

Recently, products in the field of IT having built-in miniature digital cameras, such as mobile phones, smart phones, tablet PCs, laptops, etc., have been actively developed. Camera modules including digital cameras are required to have various functions, such as auto-focusing, alleviation of shutter shake, a zoom function, etc., and the recent trend in the development thereof is focused on increasing pixel count and miniaturization.

Conventional camera modules may include lens driving devices capable of performing an auto-focusing function and a hand shake compensation function. The lens driving devices may be constituted in various fashions, among which a voice coil unit motor is commonly used. The voice coil unit motor is operated by the electromagnetic interaction between a magnet secured to a housing and a coil unit wound around an outer peripheral surface of a bobbin, to which a lens barrel is coupled, thereby performing an auto-focusing function. An actuator module having such a voice coil motor is configured such that a vertically movable bobbin is capable of being moved reciprocatingly in a direction parallel to an optical axis direction while being resiliently supported by lower and upper elastic members.

IT products having conventional built-in miniature digital cameras include lens driving devices for setting a focal distance of a lens by adjusting the distance between an image sensor and a lens. However, conventional miniature digital cameras have a problem in that an auto-focusing time taken to perform an auto-focusing function is considerably long. Therefore, many efforts have been made to shorten the auto-focusing time, but the performance of the lens driving device may be deteriorated somewhat due to the unstable electromagnetic force and eccentricity of a lens barrel attributable to magnetic force.

Conventional camera modules may include a Hall sensor (not illustrated) and a sensing magnet (not illustrated), which are arranged to face each other in a direction perpendicular to the optical axis direction of a lens in order to detect the focal position of the lens. In this case, the Hall sensor senses a magnetic field of the sensing magnet and outputs a voltage corresponding thereto. The position of the lens in the optical axis direction may be detected using the voltage output from the Hall sensor, but the Hall sensor is incapable of accurately sensing the movement of the lens in the optical axis direction, and thus there is a limitation with respect to the ability to detect the position of the lens.

DISCLOSURE

Technical Problem

Embodiments provide a lens driving device capable of receiving feedback on information about the position of a bobbin and a camera module including the same.

Another embodiment provides a lens driving device capable of shortening a lens auto-focusing time and a camera module including the same. Further, embodiments provide a lens driving device capable of positioning a lens at a focal distance of the lens more accurately and rapidly and a camera module including the same. Further, embodiments provide a lens driving device capable of improving an auto-focusing function, space efficiency and durability and a camera module including the same.

Still another embodiment provides a lens driving device capable of accurately detecting and controlling the position of a lens and a camera module including the same.

Technical Solution

In one embodiment, a lens driving device may include a bobbin, at least one lens mounted to the bobbin and a coil unit being disposed around an outer peripheral surface of the bobbin; a housing member, driving magnets being mounted to positions corresponding to the coil unit in the housing member; upper and lower elastic members for resiliently supporting movement of the bobbin in a direction parallel to an optical axis direction of the lens, the upper elastic member having one end coupled to a top surface of the bobbin and the lower elastic member having one end coupled to a bottom surface of the bobbin; and a sensing unit for sensing movement of the bobbin in the direction parallel to the optical axis direction, wherein the sensing unit includes: a sensing magnet mounted to the outer peripheral surface of the bobbin; and a circuit board mounted to a side wall of the housing member, a position sensor being disposed on an inner side surface thereof facing the sensing magnet.

For example, the lens driving device may further include a cover member for surrounding the housing member, and the cover member may have a window provided in a surface corresponding to the sensing magnet. The cover member may be formed of a metal material.

For example, the bobbin may include a magnet-mounting portion protruding from the outer peripheral surface thereof so that the sensing magnet is mounted to the magnet-mounting portion. The magnet-mounting portion may be disposed at a position capable of avoiding interference with the coil unit. The magnet-mounting portion may be disposed above the coil unit.

For example, the driving magnets may be disposed on two opposing surfaces of the housing member so as to be parallel to each other. The sensing magnet and the driving magnets may be disposed on different surfaces so as not to face each other.

For example, the position sensor may be a Hall sensor, and the circuit board may include a plurality of terminals mounted so as to be exposed outside.

In one embodiment, a camera module may include an image sensor; a printed circuit board to which the image sensor is mounted; and the lens driving device according to one embodiment.

In another embodiment, a lens driving device may include a housing member having a hollow column shape for supporting driving magnets; a bobbin, a coil being mounted to an outer peripheral surface of the bobbin so as to face the driving magnets, and being configured to be moved in a first direction parallel to an optical axis in the housing member by electromagnetic interaction between the driving magnets and the coil; and a sensing unit for sensing a first displacement value of the bobbin in the first direction.

For example, the lens driving device may further include a circuit board mounted to a side surface of the housing member.

For example, the sensing unit may include: a sensing magnet provided at the bobbin in a mounting, inserting, seating, contacting, coupling, securing, provisional securing, supporting or disposing manner; and a displacement sensing part provided at the housing member, at a position corresponding to the sensing magnet, in a mounting, inserting, seating, contacting, coupling, securing, supporting or disposing manner. First and second driving magnets may be provided on two opposing side surfaces of the housing member in a mounting, inserting, seating, contacting, coupling, securing, supporting or disposing manner, and the displacement sensing part may be provided on a side surface perpendicular to the two side surfaces of the housing member or on a surface other than the two side surfaces of the housing member in a mounting, inserting, seating, contacting, coupling, securing, supporting or disposing manner.

For example, first and second driving magnets may be provided on two opposing side surfaces of the housing member in a mounting, inserting, seating, contacting, coupling, securing, supporting or disposing manner, a third driving magnet and the displacement sensing part, which is spaced a predetermined distance apart from the third driving magnet, may be provided on one side surface perpendicular to the two side surfaces of the housing member or on a surface other than the two side surfaces of the housing member in a mounting, inserting, seating, contacting, coupling, securing, supporting or disposing manner, and a fourth driving magnet may be provided on the other side surface opposite the one side surface of the housing member in a mounting, inserting, seating, contacting, coupling, securing, supporting or disposing manner. The third driving magnet and the fourth driving magnet may be arranged symmetrically to each other about a center of the housing member.

For example, the bobbin may include an accommodation recess formed to a predetermined depth in an inward direction from the outer peripheral surface of the bobbin so as to accommodate the sensing magnet. At least a portion of the accommodation recess may be located inside the coil. The depth between the inner surface of the accommodation recess, by which one surface of the sensing magnet is supported, and the outer peripheral surface, on which the coil is disposed, may be equal to or smaller than the thickness of the sensing magnet.

For example, the accommodation recess may include an opening formed in one of a bottom surface and a top surface of the bobbin so as to communicate with the accommodation recess.

For example, the accommodation recess may further include: an inner surface for supporting one surface of the sensing magnet; and an adhesion recess formed concave to a predetermined depth in the inward direction from the inner surface so that an adhesive is injected into the adhesion recess. The accommodation recess may further include a first additional recess extending from the adhesion recess, and an overall length of the adhesion recess and the first additional recess is longer than the length of the sensing magnet in a vertical thickness direction of the bobbin.

For example, the accommodation recess may further include: an opening formed in one of a bottom surface and a top surface of the bobbin so as to communicate with the accommodation recess; and a second additional recess extending from the adhesion recess and formed to a predetermined depth in an inward direction of the bobbin from the opening.

For example, the bobbin may further include: an additional accommodation recess formed to a predetermined depth in an inward direction from the outer peripheral surface of the bobbin, opposite the outer peripheral surface having the accommodation recess formed therein, at a position symmetrical to the accommodation recess about a center of the bobbin; and a weight-balancing member accommodated in the additional accommodation recess and having the same weight as the sensing magnet.

For example, the lens driving device may further include: an upper elastic member; and a lower elastic member, inner frames of the upper and lower elastic members are coupled to the bobbin, and outer frames of the upper and lower elastic members may be coupled to the housing member.

In another embodiment, a camera module may include an image sensor; a printed circuit board to which the image sensor is mounted; and the lens driving device according to another embodiment.

In still another embodiment, a lens driving device may include a movable unit, at least one lens being mounted to the movable unit; a first coil and driving magnets arranged to face each other so as to move the movable unit in an optical axis direction of the lens through interaction therebetween; a position sensor for sensing a position of the movable unit in the optical axis direction or a driver including the position sensor; and a bipolar-magnetized magnet disposed to face the position sensor or the driver, wherein the bipolar-magnetized magnet includes: a first side surface facing the position sensor and having a first polarity; and a second side surface facing the position sensor, disposed to be spaced apart from or in contact with the first side surface in a direction parallel to the optical axis direction, and having a second polarity opposite the first side surface, and a length of the first side surface in the optical axis direction is equal to or longer than a length of the second side surface in the optical axis direction.

For example, the first polarity may be an S-pole and the second polarity may be an N-Pole. Alternatively, the first polarity may be an N-pole and the second polarity may be an S-pole.

For example, the bipolar-magnetized magnet may include: first and second sensing magnets arranged to be spaced apart from each other; and a non-magnetic partition wall disposed between the first and second sensing magnets. The first and second sensing magnets may be arranged to be spaced apart from each other in a direction parallel to the optical axis direction. The first and second sensing magnets may be arranged to be spaced apart from each other in the magnetization direction. The first side surface may be positioned above the second side surface. Alternatively, the second side surface may be positioned above the first side surface.

For example, in the initial state before the lens is moved in the optical axis direction, the height of a middle portion of the position sensor may be located on an imaginary horizontal plane extending from the top of the first side surface in the magnetization direction.

For example, in the initial state before the lens is moved in the optical axis direction, the height of the middle portion of the position sensor may be aligned with a first point on the first side surface in the magnetization direction.

For example, in the initial state before the lens is moved in the optical axis direction, the height of the middle portion of the position sensor may be aligned with the non-magnetic partition wall in the magnetization direction.

For example, in the initial state before the lens is moved in the optical axis direction, the height of the middle portion of the position sensor may be aligned with a second point, which is located above the first point, in the magnetization direction. A difference between the second point and the first point may be as follows:

$$\Delta h = H2 - H1 = \frac{\Delta D}{2} \pm \frac{D}{2}$$

Here, H2 is a height of the second point, H1 is a height of the first point, $\Delta D$ is a value calculated by subtracting a downward-displacement range from an upward-displacement range of the movable unit, and D is a displacement range of the movable unit.

For example, in the initial state before the lens is moved in the optical axis direction, the height of the middle portion of the position sensor may be aligned with the second side surface. When the lens is moved to the upper limit position in the optical axis direction, the height of the middle portion of the position sensor may be aligned with a point that is lower than the bottom of the second side surface.

For example, the first point may correspond to the height of the middle portion of the first side surface.

For example, the first and second side surfaces may respectively correspond to the side surfaces of the first and second sensing magnets, which face the position sensor.

For example, the first and second side surfaces may correspond to the side surface of the first or second sensing magnet, which faces the position sensor.

For example, the non-magnetic partition wall may include an empty space or a non-magnetic substance.

For example, the movable unit may be moved in one direction of the optical axis, or may be moved in both directions of the optical axis.

For example, in still another embodiment, the lens driving device may further include a fixed unit for supporting the driving magnets, the first and second sensing magnets may be provided at the movable unit in a coupling, contacting, supporting, securing, provisional securing, inserting or seating manner, and the position sensor may be provided at the fixed unit in a coupling, contacting, supporting, provisional securing, inserting or seating manner.

For example, in still another embodiment, the lens driving device may further include a fixed unit for supporting the driving magnets, the first and second sensing magnets may be provided at the fixed unit in a coupling, contacting, supporting, securing, provisional securing, inserting or seating manner, and the position sensor may be provided at the movable unit in a coupling, contacting, supporting, securing, provisional securing, inserting or seating manner.

For example, the intensity of the magnetic field may be encoded using 7 to 12 bits. The length of the non-magnetic partition wall may be ten percent or more or fifty percent or less of the length of the bipolar-magnetized magnet in the direction parallel to the optical axis direction. The length of the bipolar-magnetized magnet in the direction parallel to the optical axis direction may be at least 1.5 times larger than the movable range of the movable unit. The height of the middle portion of the position sensor may be biased toward any one of the first and second side surfaces.

In still another embodiment, a camera module may include an image sensor; a circuit board to which the image sensor is mounted; and the lens driving device according to still another embodiment.

Advantageous Effects

According to a lens driving device and a camera module including the same according to embodiments, a sensing magnet is mounted to an outer side surface of a bobbin and a position of the sensing magnet is sensed by a displacement sensing part such as a Hall sensor, thereby accurately detecting the position of a bobbin during the auto-focusing operation. An even number of magnets is arranged to face each other in order to control the movement of the bobbin in an optical axis direction, thereby stably maintaining the balance of electromagnetic force applied to a first coil. A window is provided at a cover member at a position corresponding to the sensing magnet, thereby inhibiting deterioration of the linear movement characteristics of the bobbin attributable to the attraction between the sensing magnet and the cover member.

Specifically, according to a lens driving device and a camera module including the same according to embodiments, the position of the lens in the optical axis direction is readjusted through feedback on the amount of displacement in the optical axis direction of the lens, thereby shortening a time taken for focal alignment of the lens and minimizing the distance between the sensing magnet and the displacement sensing part. Therefore, since the amount of displacement in the optical axis direction of the lens is more accurately detected, the lens is positioned at the focal distance of the lens more accurately and rapidly. Since the sensing magnet is mounted to the outer side surface of the bobbin, assembly processes are simplified. Specifically, since the sensing magnet is provided at the bobbin, which is a movable body, in a mounting, seating, contacting, securing, provisional securing, coupling, supporting, or disposing manner and the displacement sensing part is provided at the housing member, which is a fixed body, in a mounting, seating, contacting, securing, provisional securing, coupling, supporting or disposing manner, there is no need to secure additional space for mounting, seating, contacting, securing, provisional securing, coupling, supporting, or disposing of the sensing magnet and the displacement sensing part, which leads to improvement in space efficiency of the camera module (particularly, the bobbin). Since the position sensor and the bipolar-magnetized magnet are arranged so as to sense a magnetic field, the intensity of which is changed linearly, the movement of the lens in the optical axis direction is accurately sensed.

DESCRIPTION OF DRAWINGS

FIG. 47 is a graph showing the displacement of a movable unit depending on electric current supplied to a first coil in the lens driving devices depicted in FIGS. 45 and 46.

BEST MODE

Figure 1:
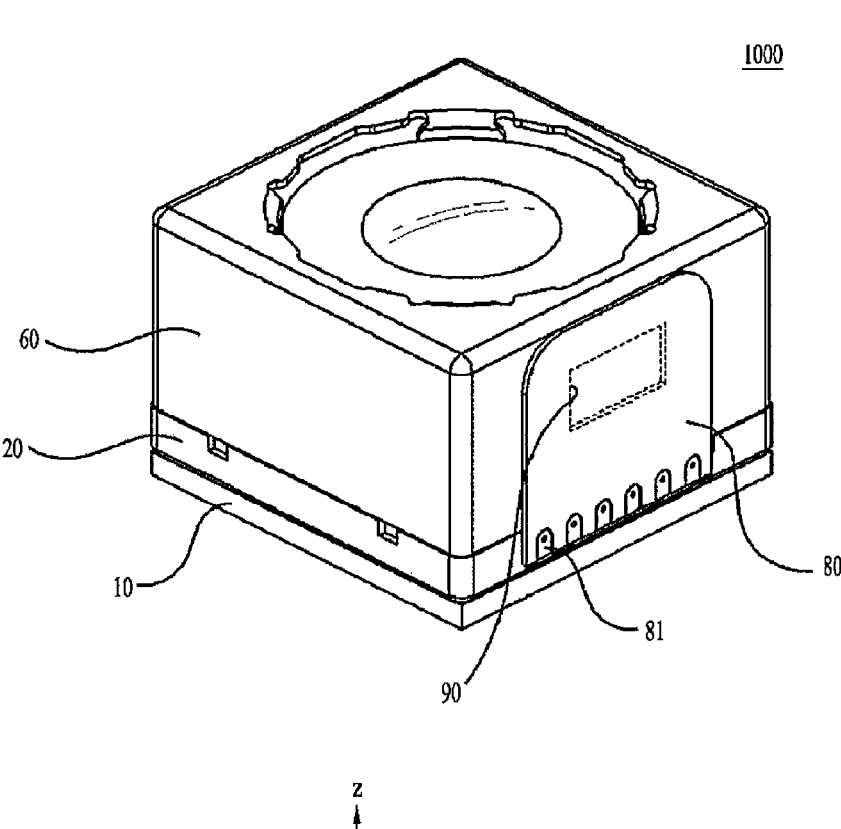
FIG. 1 shows a schematic perspective view of a camera module according to a Pt embodiment.

Hereinafter, embodiments will be described with reference to the accompanying drawings. In the following description, the same elements will be designated by the same reference numerals although they are shown in different drawings. Further, in the following description of the embodiments, a detailed description of known functions and configurations incorporated herein will be omitted when it may make the subject matter of the embodiments rather unclear. Certain features presented in the drawings are expanded, reduced, or simplified for easy explanation, and the drawings and the constituent elements may not be appropriately illustrated. However, those of ordinary skill in the art could easily understand such detailed matters.

Hereinafter, embodiments illustrated in FIGS. 1 to 51 will be explained using an orthogonal coordinate system (x, y, z), but the embodiments are not limited thereto. That is, the embodiments may, of course, be explained using other coordinate systems. In each drawing, the x-axis and the y-axis are perpendicular to an optical axis direction, and for convenience, the z-axis direction, which is the optical axis direction, may be referred to as a first direction, the x-axis direction may be referred to as a second direction, and the y-axis direction may be referred to as a third direction. Further, the first direction may be a vertical direction, and each of the second and third directions may be a horizontal direction.

1ˢᵗ Embodiment

Figure 2:
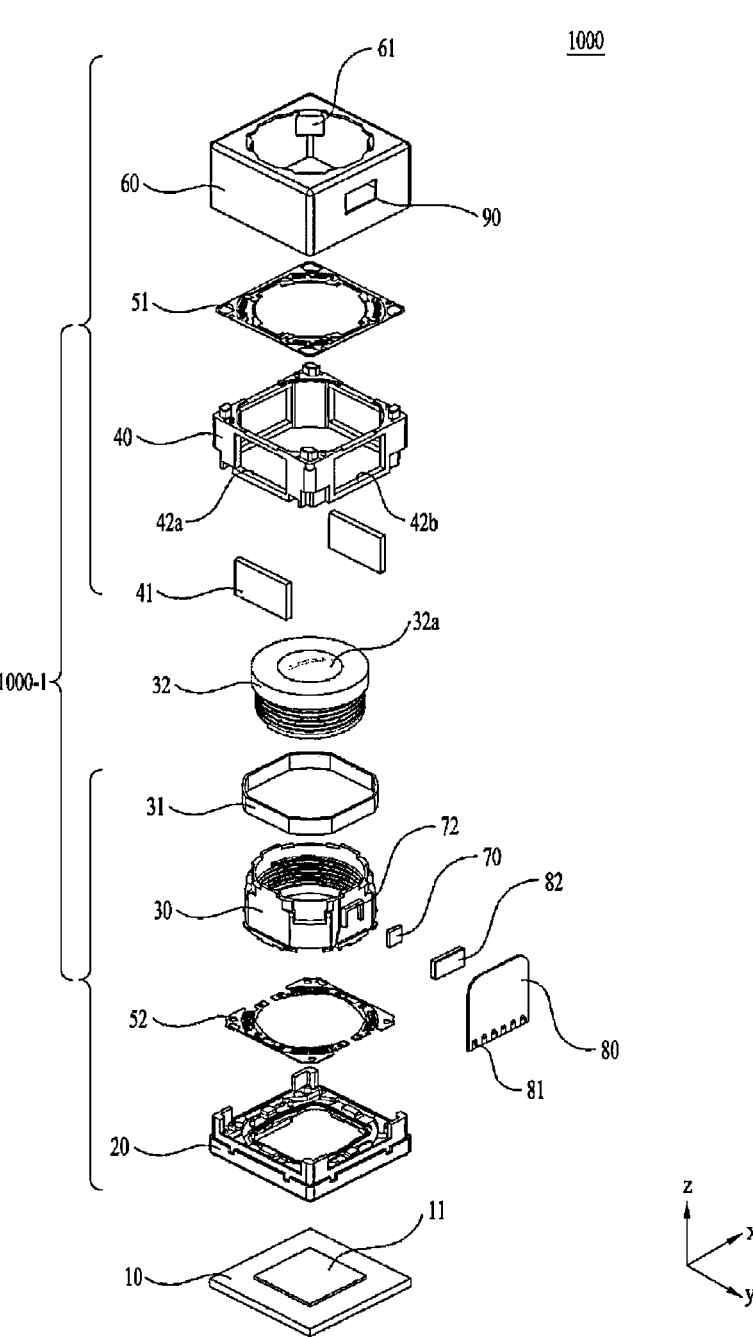
FIG. 2 shows an exploded perspective view of the camera module depicted in FIG. 1.
Figure 3:
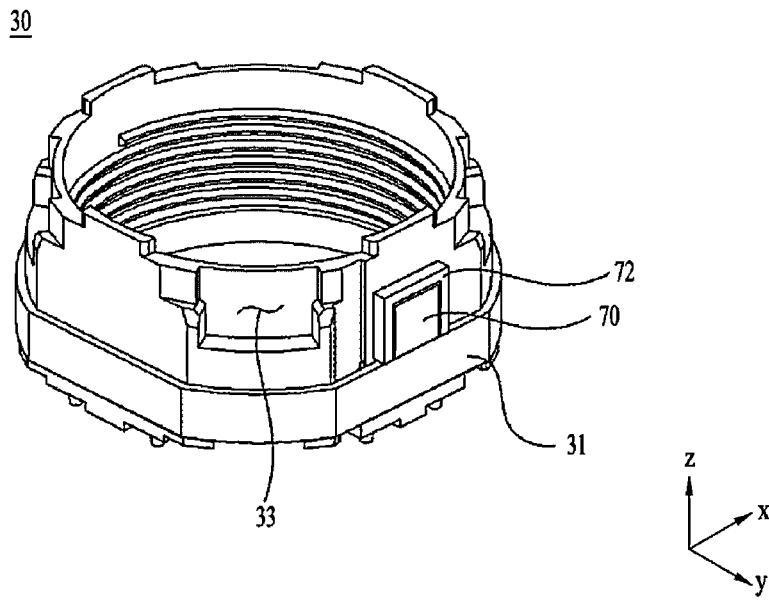
FIG. 3 shows a perspective view of a bobbin depicted in FIG. 2.
Figure 4:
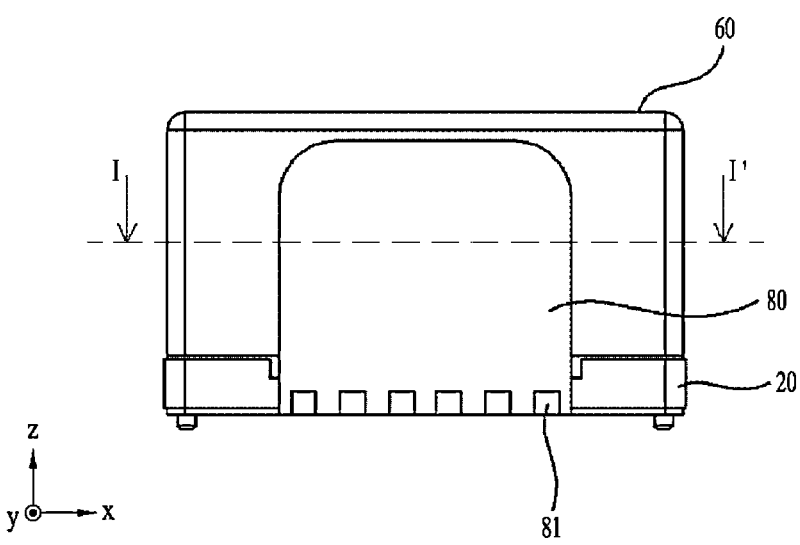
FIG. 4 shows a front view of the camera module depicted in FIG. 1.
Figure 5:
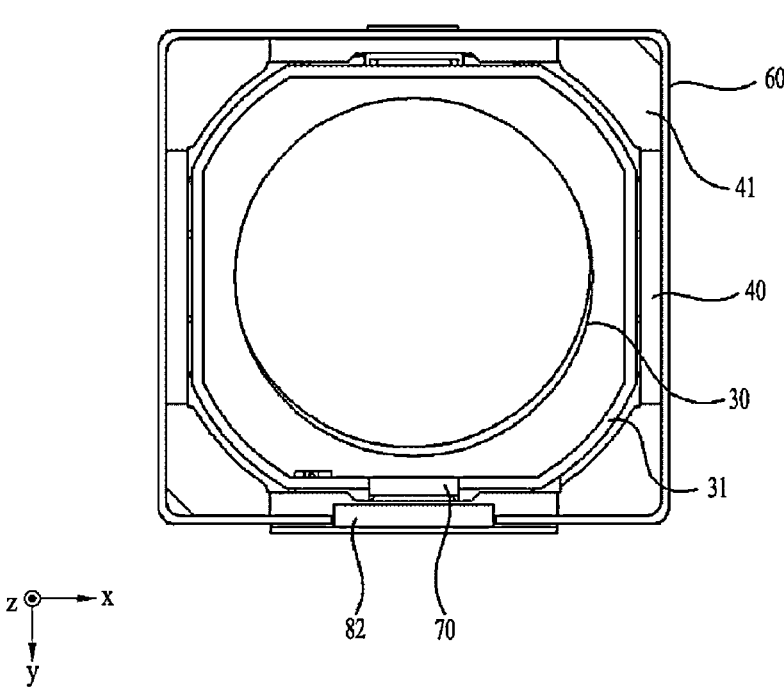
FIG. 5 shows a plan view of the camera module cut along line I-I' in FIG. 4.
Figure 6:
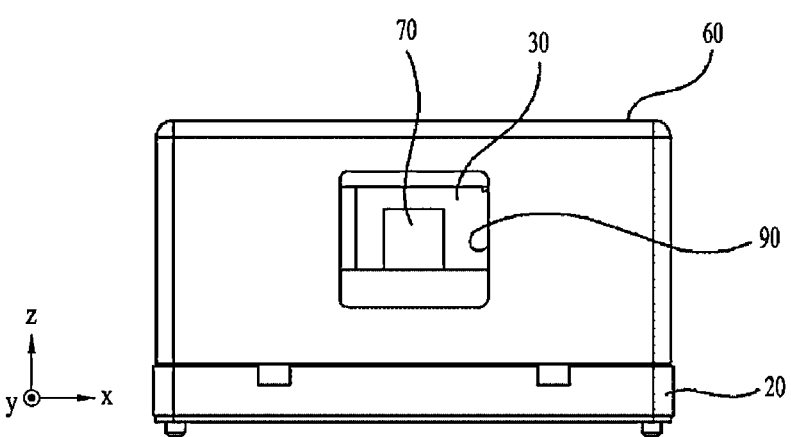
FIG. 6 shows a front view of a lens driving device after removing a circuit board from the camera module depicted in FIG. 1.

FIG. 1 shows a schematic perspective view of a camera module 1000 according to a Pt embodiment, FIG. 2 shows an exploded perspective view of the camera module 1000 depicted in FIG. 1, FIG. 3 shows a perspective view of a bobbin 30 depicted in FIG. 2, FIG. 4 shows a front view of the camera module 1000 depicted in FIG. 1, FIG. 5 shows a plan view of the camera module 1000 cut along line I-I' in FIG. 4, and FIG. 6 shows a front view of a lens driving device 1000-1 after removing a circuit board 80 from the camera module 1000 depicted in FIG. 1.

As shown in FIGS. 1 and 2, the camera module 1000 according to the 1ˢᵗ embodiment may include a lens driving device 1000-1, a printed circuit board 10, an image sensor 11, and a lens 32a. The lens driving device 1000-1 may include a base 20, a bobbin 30, a coil unit (or a coil) 31, a lens barrel 32, a housing member (or a housing) 40, a driving magnet 41, an upper elastic member (or a top elastic member) 51, a lower elastic member (or a bottom elastic member) 52, a cover member (or a cover can) 60, a sensing unit, and a circuit board (80). Here, the lens barrel 32 is a constitutional component of the camera module 1000, but may not be an essential component of the lens driving device 1000-1.

The cover member 60 may define the outer appearance of the camera module 1000, and as shown in the drawings, the housing member 40, which supports the driving magnet 41, which will be described later, may be disposed in the cover member 60.

The base 20 may be coupled to the cover member 60.

The bobbin 30 may be mounted in the cover member 60 so as to move reciprocatingly in the direction parallel to the optical axis. The coil unit 31 may be mounted on the outer peripheral surface of the bobbin 30.

The lens barrel 32, to which at least one lens 32a is mounted, may be disposed in the bobbin 30, and as shown in FIG. 2, the lens barrel 32 may be formed so as to be screwed to the inner portion of the bobbin 30. However, the embodiment is not limited to this structure, and although not illustrated, the lens barrel 32 may be directly secured to the inner portion of the bobbin 30 through a method other than the screw-coupling method, or one or more lenses 32a, without the lens barrel 32, may be integrally formed with the bobbin 30. Only a single lens 32a may be provided, or two or more lenses may be provided to form an optical system.

The upper and lower elastic members 51 and 52 may be respectively mounted to the upper portion and the lower portion of the bobbin 30. One end of the upper elastic member 51 may be connected to the bobbin 30, and the remaining end of the upper elastic member 51 may be coupled to the cover member 60 or the housing member 40. For example, the upper elastic member 51 may be coupled to the top surface or the bottom surface of the housing member 40. One end of the lower elastic member 52 may be connected to the bobbin 30, and the remaining end of the lower elastic member 52 may be coupled to the top surface of the base 20. Further, the base 20 may have a protrusion formed for coupling with the lower elastic member 52. The lower elastic member 52 may have a hole or a recess formed at a position corresponding to the protrusion, so as to be secured to the base 20 through the engagement between the protrusion and the hole or between the protrusion and the recess and to be inhibited from rotating. Further, an adhesive or the like may be added for secure coupling.

On the other hand, as shown in FIG. 2, the upper elastic member 51 may be embodied as a singular body, and the lower elastic member 52 may be embodied as two springs, that is, a two-divided structure, so as to receive powers of different polarities. That is, the powers may be transmitted to the two springs of the lower elastic member 52 via a terminal (or a terminal member) (not illustrated), and may subsequently be applied to the coil unit 31 wound around the bobbin 30. To this end, the lower elastic member 52 and the coil unit 31 may be electrically connected to each other through soldering or the like. That is, the two springs of the lower elastic member 52 and respective ends of the coil unit 31 may be electrically connected to each other through soldering or the like. However, the embodiment is not limited to this structure. Conversely, the upper elastic member 51 may be formed to have a two-divided structure, and the lower elastic member 52 may be formed in a singular body.

The bidirectional movement of the bobbin 30 in the optical axis direction may be supported by the upper and lower elastic members 51 and 52. That is, since the bobbin 30 is spaced a predetermined distance apart from the base 20, the bobbin 30 may be controlled so as to move upwards and downwards from its original position. Alternatively, the bobbin 30 may be originally positioned in the top surface of the base 20, and accordingly the bobbin 30 may be controlled so as to move only upwards from its original position.

On the other hand, the coil unit 31 may be embodied as a ring-shaped coil block, which is coupled to the outer peripheral surface of the bobbin 30. However, the coil unit is not limited to this configuration. The coil unit 31 may be embodied as a coil that is directly wound around the outer peripheral surface of the bobbin 30. The coil unit 31, as shown in FIG. 3, may be mounted to a position near the bottom surface of the bobbin 30, and may include straight surfaces and curved surfaces depending on the shape of the bobbin 30.

Alternatively, the coil unit 31, which is embodied as a coil block, may be formed in a polygonal shape, for example, an octagonal shape. The coil unit 31 may include only straight surfaces without any curved surfaces, in consideration of the electromagnetic action with the driving magnet 41, which is disposed opposite the coil unit 31. If the surface of the driving magnet 41 that faces the coil unit 31 is flat, the electromagnetic force may be maximized when the surface of the coil unit 31 that faces the driving magnet 41 is also flat. However, the embodiment is not limited to this configuration, and as specified by some design, the driving magnet 41 and the coil unit 31 may be configured such that both of them have curved surfaces, both of them have flat surfaces, or one of them has a curved surface and the other has a flat surface.

So as to allow the coil unit 31 to be coupled to the outer peripheral surface of the bobbin 30, the bobbin 30 may include first surfaces, which are formed to be flat corresponding to the straight surfaces of the coil unit 31, and second surfaces, which are formed to be round corresponding to the curved surfaces of the coil unit 31, but the second surfaces may also be formed to be flat. The second surfaces may have recesses 33 formed in a top portion thereof corresponding to inner yokes 61, which will be described later, and the coil unit 31 may be disposed below the recesses 33. However, the embodiment is not limited to this configuration. That is, a portion of the coil unit 31 may be disposed in the vicinity of the recesses 33. However, the embodiment is not limited to this configuration, and additional yokes may be provided instead of the inner yokes 61.

The housing member 40 may be embodied as a substantially hexahedral-shaped frame. The top surface and the bottom surface of the housing member 40 may be provided with coupling structures to which the upper and lower elastic members 51 and 52 are respectively coupled, and driving magnets 41 may be mounted to side surfaces of the housing member 40. As shown in FIG. 2, the housing member 40 may have mounting holes (or through holes for magnets) 42a formed therein and in which the driving magnets 41 are mounted, but the housing member is not limited to this configuration. The driving magnets 41 may be directly adhered to the inner peripheral surface of the housing member 40 without the mounting holes 42a. As such, if the driving magnets 41 are directly secured to the housing member 40, the driving magnets 41 may be directly bonded and fixed to the lateral surfaces or to the corners of the housing member 40.

Further, the housing member 40 may additionally have through holes 42b in addition to the mounting holes 42a. As illustrated, a pair of through holes 42b may be formed to face each other, but the through holes are not limited to this configuration. That is, the through hole 42b may be formed in the surface of the wall of the housing member 40 that faces the sensing magnet 70, as will be described later, and may have a larger size than the sensing magnet 70. At this time, the through hole 42b may be formed to have a quadrangular shape, a circular shape or a polygonal shape. Alternatively, the existing housing member 40 having four mounting holes 42a may be used without structural change in such a manner that the driving magnets 41 are mounted to two mounting holes 42a and at least one of the two remaining mounting holes 42a is used as a through hole 42b.

Alternatively, unlike the embodiment, the lens driving device 1000-1 may not include the housing member 40, and may include only the cover member 60. The cover member 60 may be formed of a ferromagnetic metal material such as steel. The cover member 60 may be formed to have a polygonal shape when observed from above so as to completely surround the bobbin 30. At this time, the cover member 60 may be formed in a quadrangular shape as shown in FIG. 1, or may be formed in an octagonal shape, unlike the shape shown in the drawing. If the cover member 60 has an octagonal shape when observed from above, when the driving magnet 41, which is disposed at the corner of the housing member 40, has a trapezoidal shape when observed from above, the magnetic field emitted from the corner of the housing member 40 may be minimized.

The cover member 60 may be integrally formed with the inner yokes 61, which are disposed at positions corresponding to the receiving recesses. According to the embodiment, one side surface of the inner yoke 61 may be spaced a predetermined distance apart from the coil unit 31, and the remaining side surface of the inner yoke 61 may be spaced a predetermined distance apart from the bobbin 30. Further, the inner yokes 61 may be formed at four corners of the housing member 40. The inner yokes 61 may be bent inwardly from the top surface of the housing member 40 in the direction parallel to the optical axis. Although not illustrated, the inner yoke 61 may have escape recesses formed at positions adjacent to the bent portion. At this time, the escape recesses may be formed in pair or the escape recesses may be symmetrically formed. The bent portion where the escape recesses are formed may form a bottleneck section. This section where the escape recesses are formed may function to minimize interference between the inner yoke 61 and the bobbin 30 when the bobbin 30 is driven up and down. That is, when the bobbin 30 is moved upwards, the bobbin 30 may be inhibited from being partially damaged due to interference with the corner portion of the inner yoke 61. The inner yoke 61 may be arranged such that the tip of the inner yoke 61 is spaced a predetermined distance apart from the bottom surface of the recess 33 at the reference position. The purpose of this is to inhibit the tip of the inner yoke 61 from coming into contact with or from generating interference with the bottom surface of the recess 33 when the bobbin 30, which is moved reciprocatingly, reaches the upper limit position. Further, the tip of the inner yoke 61 may also function as a stopper that inhibits the bobbin 30 from being moved beyond the limits set in the design specifications. Alternatively, in the case in which a separate housing member 40 is not provided, the driving magnets 41 may be directly bonded and fixed to the lateral surfaces or to the corners of the cover member 60. The magnetization direction of the driving magnets 41 may be directed toward the bobbin 30 and the cover member 60, but the magnetization direction is not limited thereto. The magnetization direction may vary depending on the design specifications.

On the other hand, the sensing unit of the lens driving device 1000-1 according to the 1$^{st}$ embodiment may serve to detect movement of the bobbin 30. To this end, the sensing unit may include a sensing magnet 70 and a position sensor (or a displacement sensing part) 82. Here, the position sensor 82 may be mounted to the circuit board 80.

The sensing magnet 70 may be formed to be smaller and thinner than the driving magnet 41, and may have a square shape, as illustrated in the drawings. However, the sensing magnet is not limited to the square shape, but may be diversely formed in, for example, a rectangular shape, a triangular shape, a polygonal shape, a circular shape, etc.

The sensing magnet 70 may be mounted to the outer peripheral surface of the bobbin 30. According to the embodiment, the sensing magnet 70 may be secured to a magnet-mounting portion 72, provided at the bobbin 30, using an adhesive or the like. The magnet-mounting portion 72 may include a rib-shaped guide that protrudes from the outer peripheral surface of the bobbin 30, but the magnet-mounting portion is not limited thereto. The magnet-mounting portion may include a recess, in which the sensing magnet 70 is disposed. As shown in FIG. 3, the rib-shaped guide may be formed to have an opening at the bottom thereof and to surround at least three surfaces of the sensing magnet 70. At this time, the protruding height of the guide of the magnet-mounting portion 72 may be the same as, lower than, or higher than the thickness of the sensing magnet 70. Therefore, when the sensing magnet 70 is secured to the magnet-mounting portion 72 using an adhesive or the like, the sensing magnet 70 may be or may not be exposed to the outside of the guide.

On the other hand, the sensing magnet 70 may be disposed at a position at which interference with the coil unit 31 is avoided. That is, as shown in FIG. 3, if the coil unit 31 is mounted to the lower portion of the bobbin 30, the sensing magnet 70 may be disposed above the coil unit 31. This serves to inhibit the coil unit 31 from affecting the upward and downward movement of the bobbin 30 in the optical axis direction.

Further, the sensing magnet 70, as shown in FIG. 2, may be disposed so as not to face the driving magnets 41. That is, a pair of driving magnets 41 may be arranged parallel to each other so as to face each other. At this time, if the housing member 40 is formed in a quadrangular shape, the sensing magnet 70 is not mounted to a position that faces two surfaces of the housing member 40 to which the driving magnets 41 are mounted. For example, referring to FIG. 2, the driving magnets 41 may be arranged to face each other in the x-axis direction, i.e., the second direction, and the sensing magnet 70 may be arranged in the y-axis direction, i.e., the third direction, which is different from the second direction.

The reason why the sensing magnet 70 is arranged so as not to face the driving magnets 41 is to inhibit interference between variation in the magnetic force of the sensing magnet 70 and the magnetic force of the driving magnets 41, thereby enabling the position sensor 82 to more accurately generate feedback on movement of the bobbin 30.

The circuit board 80, as shown in FIG. 2, may be disposed at a position corresponding to a side wall of at least one of the bobbin 30, the housing member 40, or the cover member 60. According to the embodiment, a cover member 60 that serves as a shield can may be provided, and the circuit board 80 may be disposed in close contact with the side wall of the cover member 60. The circuit board 80 may be secured to the outer side surface or to the inner side surface of the cover member 60 in a contact manner, and may be formed to be larger than a window 90 in the cover member 60. Further, the circuit board 80 may include terminals 81, which are disposed at one end portion of the circuit board 80 so as to be electrically connected to the printed circuit board 10, to which an image sensor 11 is mounted, which will be described later. Furthermore, in order to apply electric current to the coil unit 31 through the circuit board 80, the coil unit 31 may be directly and electrically connected to the circuit board 80, or may be indirectly connected to the circuit board 80 in such a manner that the coil unit 31 is connected to the two-divided springs of the lower elastic member 52 and the two springs are electrically connected to the circuit board 80. In this manner, the coil unit 31 may be electrically connected to the printed circuit board 10 through the circuit board 80. The electrical connection may be implemented by, for example, soldering, electrically conductive epoxy, Ag epoxy, or various other methods.

Since the position sensor 82, such as a Hall sensor, is disposed at the inner surface of the circuit board 80, the position sensor 82 may not be exposed to the outside. The side wall of the cover member 60, which corresponds to the position sensor 82, may have a window 90 formed therein, and the housing member 40 may have through holes 42b formed therein. Therefore, the position sensor 82 may pass through the window 90, and may be spaced a predetermined distance apart from the sensing magnet 70. The through holes 42b formed in the housing member 40 may have the same shape as the mounting portions 42a for mounting the driving magnets 41, or may have a larger width and height than the sensing magnet 70.

The circuit board 80 may be provided with a plurality of terminals 81. The terminals 81 may serve to output detection signals of the position sensor 82 and to apply electric current to the coil unit 31.

In the case of the camera module 1000 or the lens driving device 1000-1 according to the above-described $1^{st}$ embodiment, since feedback on the movement of the bobbin 30 in the optical axis direction is generated by the sensing magnet 70, the time taken for an auto-focusing operation may be shortened.

Further, the bobbin 30 is moved with the coil unit 31, which is wound around the bobbin 30, the thin and light sensing magnet 70 is adhered to the outer wall of the bobbin 30, and the position sensor 82 for detecting the magnetic force of the sensing magnet 70 is disposed on the surface of one wall of the camera module 1000 in a close-contact manner, thereby achieving an auto-focusing function precisely and rapidly without concern as to deterioration in the response characteristics thereof.

Further, the center of the position sensor 82 may be aligned with the center of the sensing magnet 70, and the vertical length (two magnetized portions) of the sensing magnet 70 may be longer than a sensing portion of the position sensor 82. Furthermore, since the surface of the sensing magnet 70 that faces the position sensor 82 is divided into two magnetized portions, position detection may be achieved.

Further, the vertical length of the through hole 42b and/or the window 90 may be larger than the space, in which the sensing magnet 70 is moved by the upward and downward movement of the bobbin 30, and/or the size of the position sensor 82.

Further, the position sensor 82 may be embodied as any sensor capable of detecting a position, such as, for example, a gyro sensor, an angular velocity sensor, an acceleration sensor, and a photo-reflector.

Further, an image sensor 11 may be mounted to the printed circuit board 10, and the printed circuit board 10 may serve as a bottom surface of the camera module 1000.

The base 20 may be coupled to the housing member 40. An additional terminal member may be mounted to the base 20 in order to achieve an electrical connection with the printed circuit board 10. Alternatively, the terminal member may be integrally formed with the base 20 using a surface electrode or the like.

$2^{nd}$ Embodiment

Figure 7:
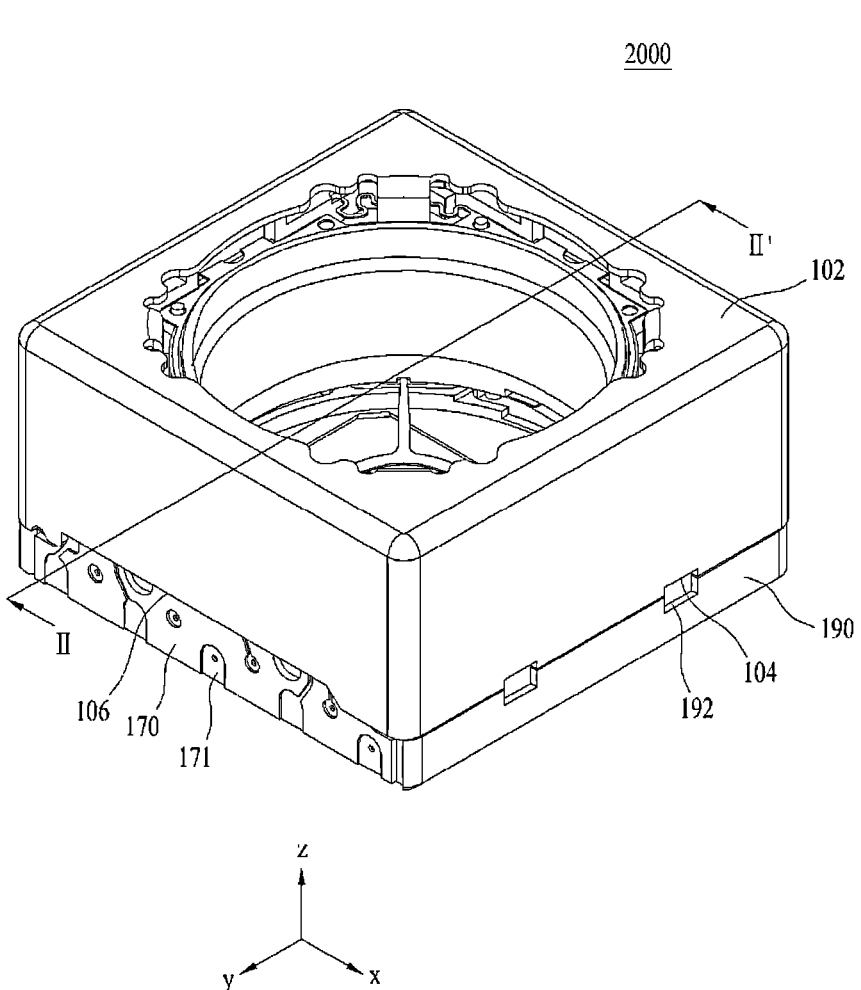
FIG. 7 shows a schematic perspective view of a lens driving device according to a 2nd embodiment.
Figure 8:
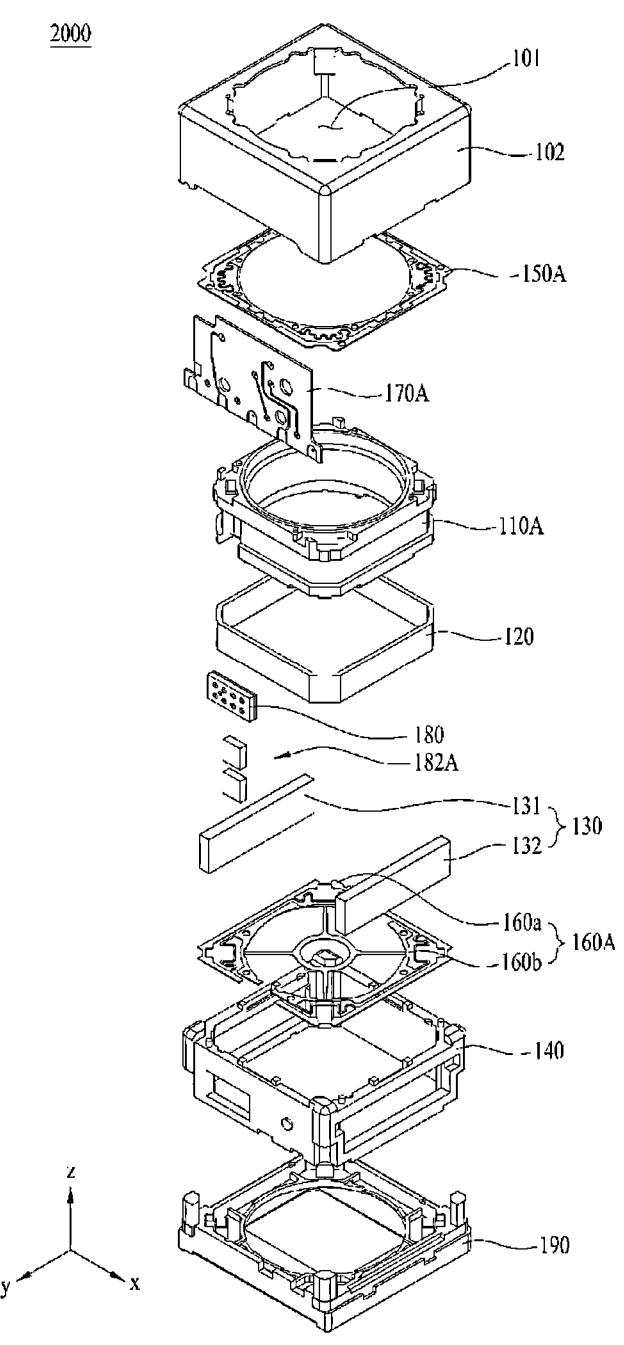
FIG. 8 shows a schematic exploded perspective view according to an embodiment of the lens driving device illustrated in FIG. 7.
Figure 9:
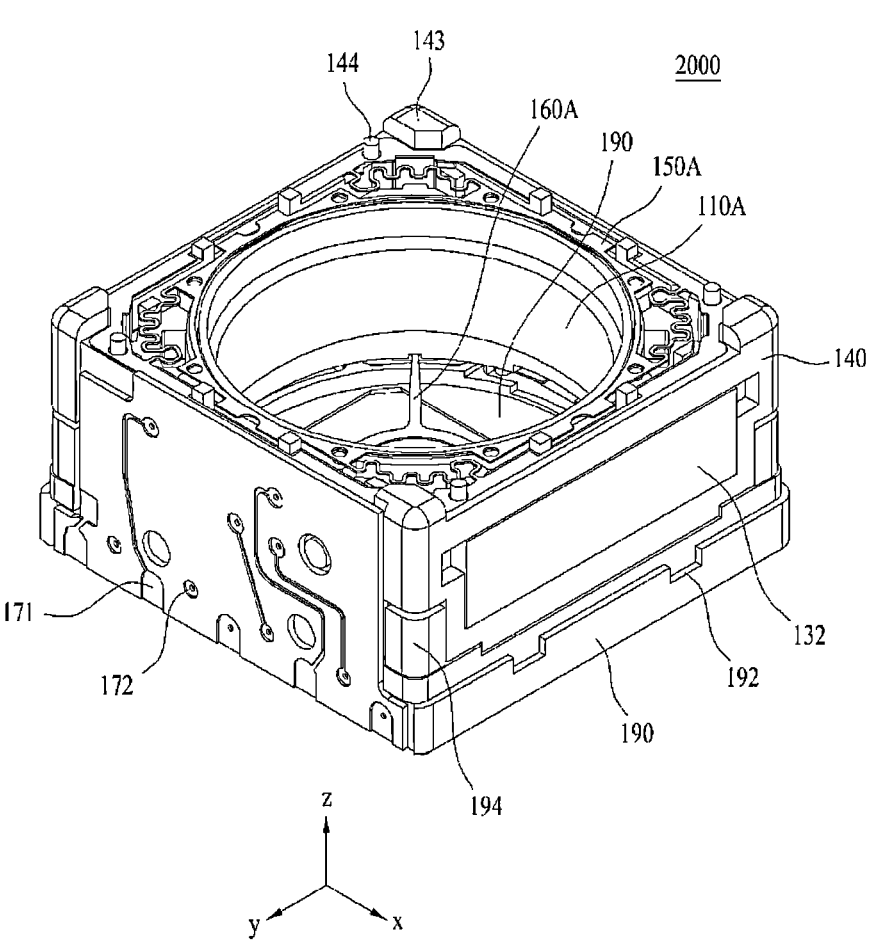
FIG. 9 shows a schematic perspective view according to an embodiment of the lens driving device in FIG. 7, from which a cover can is removed.

FIG. 7 shows a schematic perspective view of a lens driving device 2000 according to a $2^{nd}$ embodiment, FIG. 8 shows a schematic exploded perspective view according to an embodiment of the lens driving device 2000 illustrated in FIG. 7, and FIG. 9 shows a schematic perspective view according to an embodiment of the lens driving device 2000 in FIG. 7, from which a cover can 102 is removed.

The lens driving device 2000 according to the $2^{nd}$ embodiment is a device configured to adjust the distance between a lens (not illustrated) and an image sensor (not illustrated) in the camera module, thereby positioning the image sensor at the focal distance of the lens. That is, the lens driving device 2000 is a device that performs an auto-focusing function.

As illustrated in FIGS. 7 to 9, the lens driving device 2000 according to the 2$^{nd}$ embodiment may include a cover can 102, a bobbin 110A, a first coil 120, a driving magnet 130, a housing member 140, an upper elastic member 150A, a lower elastic member 160A, a first circuit board 170A, a displacement sensing part (or a position sensor) 180, a sensing magnet 182A, and a base 190. Here, the cover can 102, the bobbin 110A, the first coil 120, the driving magnet 130, the housing member 140, the upper elastic member 150A, the lower elastic member 160A, the first circuit board 170A, the displacement sensing part 180, the sensing magnet 182A, and the base 190 may respectively perform the same functions as the cover member 60, the bobbin 30, the coil unit 31, the driving magnet 41, the housing member 40, the upper elastic member 51, the lower elastic member 52, the circuit board 80, the position sensor 82, the sensing magnet 70, and the base 20 depicted in FIG. 2. Therefore, the explanation of the constitutional components 60, 30, 31, 41, 40, 51, 52, 80, 82, 70, and 20 in the 1$^{st}$ embodiment may be applied to the constitutional components 102, 110A, 120, 130, 140, 150A, 160A, 170A, 180, 182A, and 190 in the 2$^{nd}$ embodiment. The explanation of the constitutional components 102, 110A, 120, 130, 140, 150A, 160A, 170A, 180, 182A, and 190 in the 2$^{nd}$ embodiment may also be applied to the constitutional components 60, 30, 31, 41, 40, 51, 52, 80, 82, 70, and 20 in the 1$^{st}$ embodiment.

The cover can 102 may have the overall shape of a box, and may be configured so as to be provided on the top portion of the base 190 in a mounting, seating, contacting, securing, provisional securing, supporting, coupling or disposing manner. The bobbin 110A, the first coil 120, the driving magnet 130, the housing member 140, the upper elastic member 150A, the lower elastic member 160A, the first circuit board 170A, the displacement sensing part 180, and the sensing magnet 182A may be accommodated in the accommodation space that is defined by providing the cover can 102 on the base 190 in a mounting, seating, contacting, securing, provisional securing, supporting, coupling, or disposing manner.

The cover can 102 may have an opening 101 formed in the top surface thereof, through which the lens (not illustrated), coupled to the bobbin 110A, is exposed to external light. In addition, the opening 101 may be provided with a window that is made of a light-transmitting material, so as to inhibit foreign substances, such as dust, moisture, etc., from being introduced into the camera module.

The cover can 102 may have first recess portions 104 formed in the bottom thereof, and the base 190 may have second recess portions 192 formed in the top thereof. As described later, the second recess portions 192 may be formed in portions of the base 190 (positions corresponding to the first recess portions 104) that are brought into contact with the first recess portions 104 when the cover can 102 is provided on the base 190 in a mounting, seating, contacting, securing, provisional securing, supporting, coupling, or disposing manner. The contact, arrangement or coupling of the first recess portions 104 and the second recess portions 192 may form slots (or, recesses) having a predetermined area therebetween. An adhesive member having a predetermined viscosity, such as epoxy, may be injected and spread in the slots. The adhesive member spread in the slots may fill the gaps between the surfaces of the cover can 102 and the base 190 that face each other through the slots, thereby sealing the gaps between the cover can 102 and the base 190 when the cover can 102 is provided on the base 190 in a mounting, seating, contacting, securing, provisional securing, supporting, coupling, or disposing manner. Further, the side surfaces of the cover can 102 and the base 190 may be tightly assembled or coupled to each other when the cover can 102 is provided on the base 190 in a mounting, seating, contacting, securing, provisional securing, supporting, coupling, or disposing manner.

The cover can 102 may further have a third recess portion 106. Here, the third recess portion 106 may be formed in the surface of the cover can 102 that corresponds to the terminal surface of the first circuit board 170A so as to inhibit interference between a plurality of terminals 171 provided on the terminal surface and the cover can 102. The third recess portion 106 may be formed in a concave shape on the entire region of the surface of the cover can 102 that faces the terminal surface of the first circuit board 170A, and an adhesive member may be spread in the third recess portion 106 so that the cover can 102, the base 190 and the first circuit board 170A are sealed or coupled to each other.

The first recess portions 104 and the third recess portion 106 are formed in the cover can 102, and the second recess portions 192 are formed in the base 190, but the embodiment is not limited to this configuration. That is, according to another embodiment, the first to third recess portions 104, 192 and 106 may be formed only in the base 190, or may be formed only in the cover can 102.

The material of the above-described cover can 102 may include metal, but the embodiment is not limited as to the material of the cover can 102. Alternatively, the cover can may be formed of a magnetic material.

The base 190 may have an overall quadrangular shape, and may have a stepped portion that protrudes by a predetermined thickness in the outward direction in order to surround the bottom edge of the base 190. The stepped portion may be formed in a continuous strap shape or may have a discontinuous strap shape at the middle thereof. The thickness of the stepped portion may be the same as the thickness of the side surface of the cover can 102, and when the cover can 102 is provided on the base 190 in a mounting, seating, contacting, securing, provisional securing, supporting, coupling, or disposing manner, the side surface of the cover can 102 may be positioned on the top or the side surface of the stepped portion of the base 190 in a mounting, seating, contacting, coupling, securing, supporting or disposing manner. Accordingly, the cover can 102, which is coupled to the top of the stepped portion, may be guided by the stepped portion, and the end portion of the cover can 102 may be coupled to the stepped portion in a surface-contact manner. Here, the end portion of the cover can 102 may have a bottom surface or a side surface. At this time, the stepped portion and the end portion of the cover can 102 may be bonded, coupled or sealed to each other using an adhesive or the like.

The second recess portions 192 may be formed in the stepped portion and may be located at positions corresponding to the first recess portions 104 of the cover can 102. As described above, the second recess portions 192 may be coupled to the first recess portions 104 of the cover can 102, thereby forming slots (or, recesses), which serve as spaces to fill with an adhesive member.

Similar to the cover can 102, the base 190 may have an opening formed in a substantially central portion thereof. The opening may be formed at a position corresponding to the position of the image sensor disposed in the camera module.

Further, the base 190 may have four guide members 194, which protrude vertically upwards by a predetermined height from four corners of the base 190. The guide members 194 may have a polygonal column shape. The guide members 194 may be provided on lower guide recesses 148 of the housing member 140 in a mounting, inserting, seating, contacting, coupling, securing, supporting, or disposing manner, which will be described later. When the housing member 140 is provided on the top of the base 190 in a mounting, seating, contacting, coupling, securing, supporting, or disposing manner, the guide members 194 and the lower guide recesses 148 may function to guide the coupling position of the housing member 140 and the base 190 and to increase the coupling area between the housing member 140 and the base 190, and may further function to inhibit the housing member 140 from being separated from its normal mounting position due to vibrations generated during the operation of the lens driving device 2000 or due to a worker's mistake in an assembly process.

Figure 10:
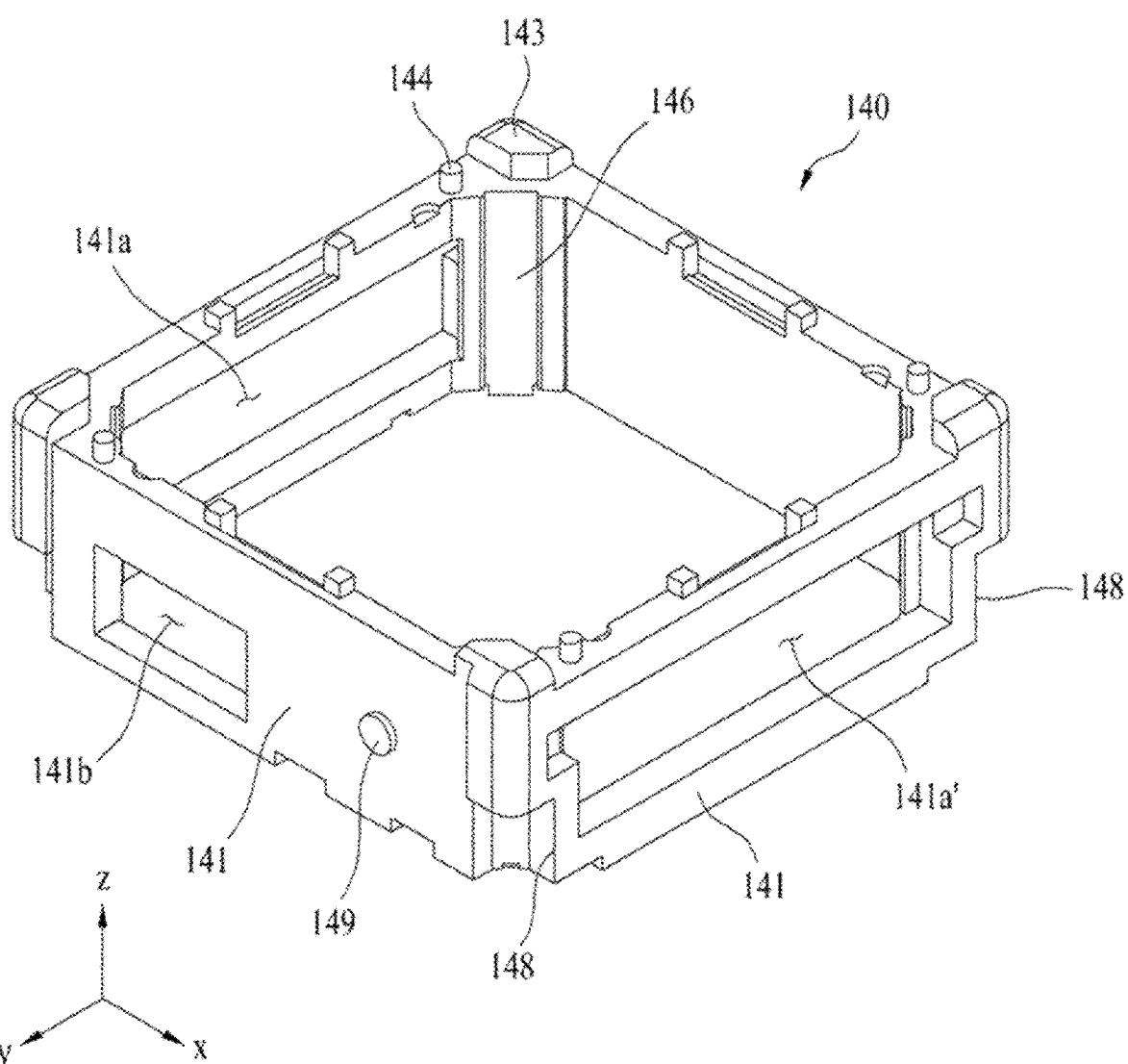
FIG. 10 is a schematic plan perspective view of a housing member according to another embodiment.
Figure 11:
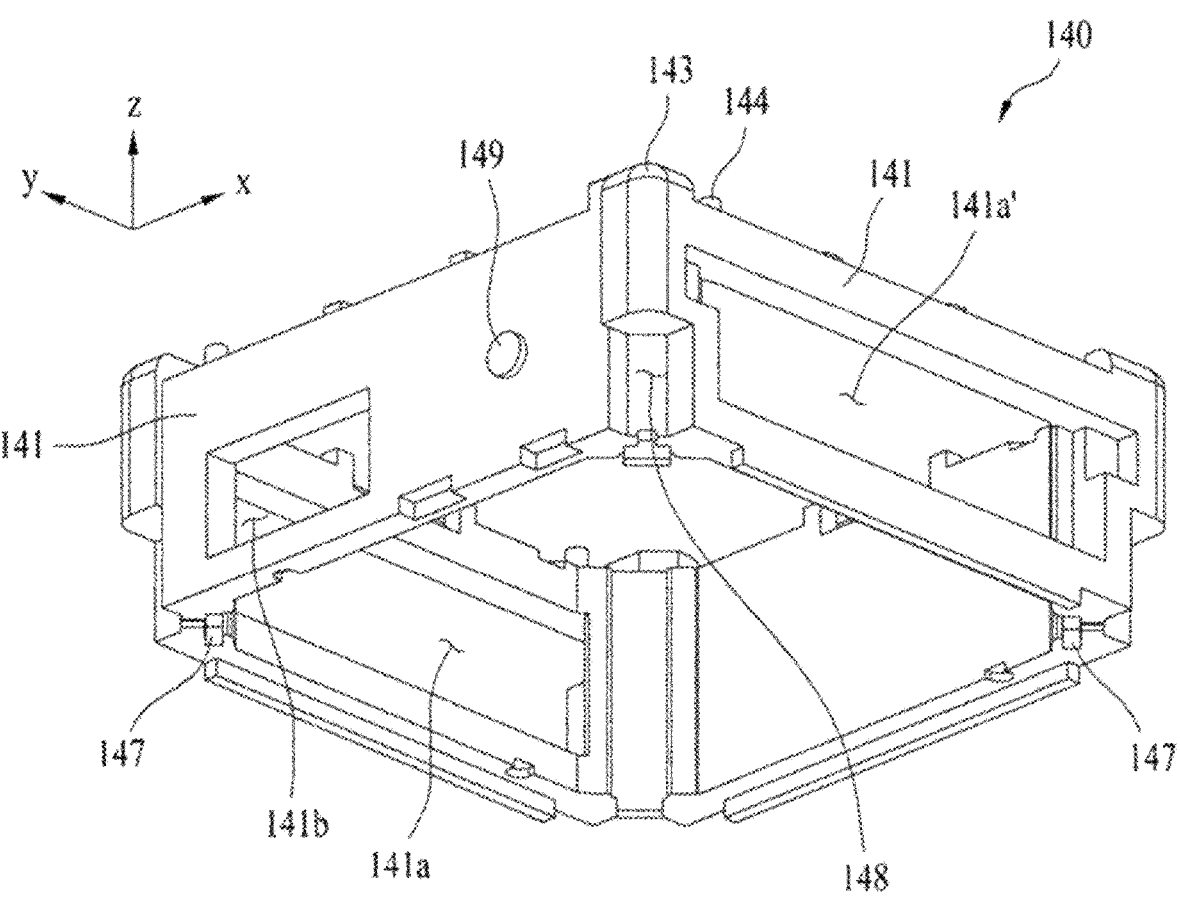
FIG. 11 is a schematic bottom perspective view of the housing member according to another embodiment.
Figure 12:
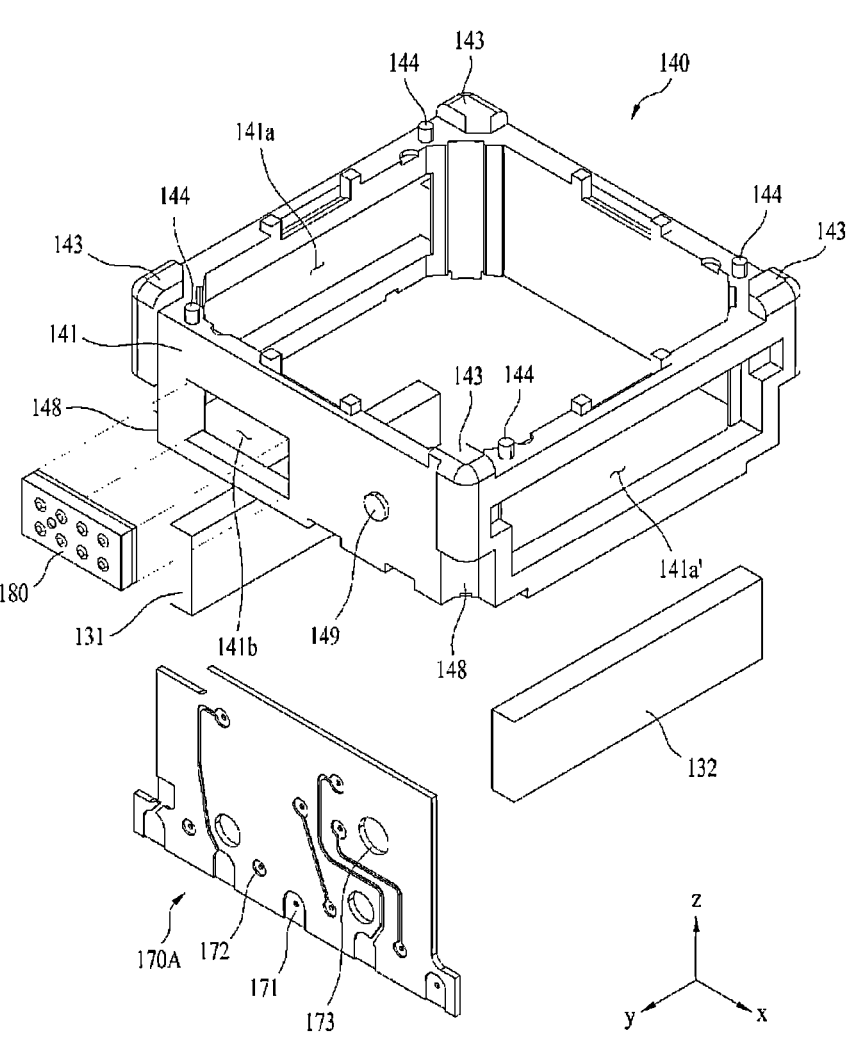
FIG. 12 shows a schematic exploded perspective view of a driving magnet, the housing member, a first circuit board and a displacement sensing part according to another embodiment.
Figure 13:
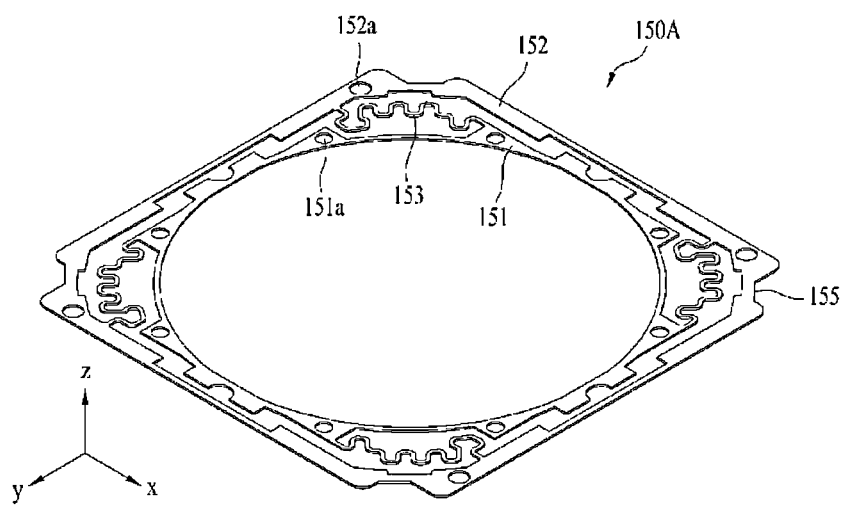
FIG. 13 shows a plan perspective view of an upper elastic member according to one embodiment.
Figure 14:
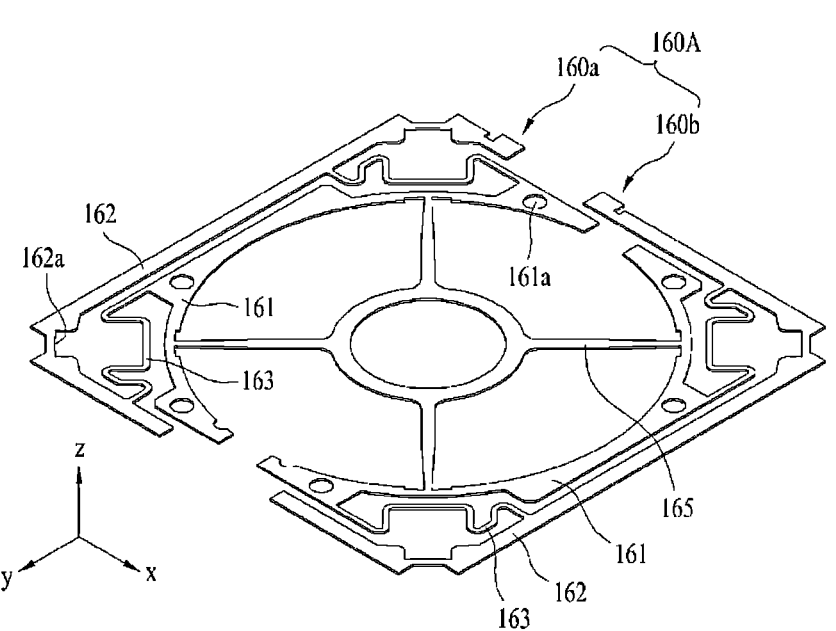
FIG. 14 shows a plan perspective view of a lower elastic member according to one embodiment.

FIG. 10 is a schematic plan perspective view of the housing member 140 according to another embodiment, FIG. 11 is a schematic bottom perspective view of the housing member 140 according to another embodiment, FIG. 12 shows a schematic exploded perspective view of the driving magnet 130, the housing member 140, the first circuit board 170A and the displacement sensing part 180 according to another embodiment, FIG. 13 shows a plan perspective view of the upper elastic member 150A, and FIG. 14 shows a plan perspective view of the lower elastic member 160A.

Referring to FIGS. 10 to 12, the housing member 140 may have an overall hollow column shape (for example, as illustrated, a hollow quadrangular column shape). The housing member 140 may have a configuration capable of supporting two or more driving magnets 130 and the first circuit board 170A, and may accommodate the bobbin 110A therein so that the bobbin 110A is movable in the z-axis direction, which is the first direction, relative to the housing member 140.

The housing member 140 may include four flat side surfaces 141. The area of each of the side surfaces 141 of the housing member 140 may be the same as or larger than that of each of the driving magnets 130.

As illustrated in FIG. 12, two opposing first side surfaces of the four side surfaces 141 of the housing member 140 may have respective through holes (or recesses) 141a and 141a' for magnets formed therein, the driving magnets 130 being provided in the through holes 141a and 141a' for magnets in a mounting, inserting, seating, contacting, coupling, securing, supporting or disposing manner. The through-holes 141a and 141a' for magnets may have a size and/or shape corresponding to the driving magnets 130, or may have a shape capable of guiding the driving magnets 130. One (hereinafter, referred to as a "first driving magnet 131") of the driving magnets 130 and the other (hereinafter, referred to as a "second driving magnet 132") of the driving magnets 130 may be provided in a corresponding one of the first and second through holes 141a and 141a' for magnets in a mounting, inserting, seating, contacting, coupling, securing, supporting, or disposing manner. Although total two driving magnets 130 are illustrated in the embodiment, the embodiment is not limited to this configuration. Of course, four driving magnets 130 may be provided.

The above-described driving magnets 130 may be generally classified into ferrite, alnico, and rare earth magnets, and may also be classified into a P-type and an F-type according to a magnetic circuit configuration. However, the embodiment is not limited as to the classification of the driving magnets 130.

One side surface of the four side surfaces 141 of the housing member 140, which is perpendicular to the two opposing first side surfaces, or one surface other than the two opposing first side surfaces may have a through hole 141b or a recess (not illustrated) for a sensor formed therein, the displacement sensing part 180, which will be described later, being provided in the through hole 141b or the recess in a mounting, inserting, seating, contacting, coupling, securing, supporting, or disposing manner. The through hole 141b for a sensor may have a size and a shape corresponding to the displacement sensing part 180, and may be spaced a predetermined distance apart from the first and second through holes 141a and 141a' for magnets. The through hole 141b for a sensor may be formed in one of the side surfaces 141 of the housing member 140, in which the first circuit board 170A is provided in a mounting, seating, contacting, coupling, securing, provisional securing, supporting, or disposing manner.

Further, one side surface of the housing member 140 may be provided with at least one mounting protrusion 149 so as to allow the first circuit board 170A to be provided in the one side surface of the housing member 140 in a mounting, seating, contacting, coupling, securing, provisional securing, supporting, or disposing manner.

The mounting protrusion 149 may be positioned in a mounting through hole 173 formed in the first circuit board 170A in a mounting, inserting, seating, contacting, coupling, securing, provisional securing, supporting, or disposing manner. At this time, the mounting through hole 173 and the mounting protrusion 149 may contact each other or may be coupled to each other in a shape-fitting or press-fitting manner, but these elements 173 and 149 may function merely to guide the first circuit board 170A to be positioned in the housing member 140 in a mounting, seating, contacting, coupling, securing, provisional securing, supporting, or disposing manner.

Here, another side surface of the four side surfaces 141 of the housing member 140, which is opposite the one side surface, may be a flat surface, but the embodiment is not limited to this configuration.

Although not illustrated, two opposing second side surfaces of the housing member 140, which are perpendicular to the two opposing first side surfaces, may additionally have third and fourth through holes for magnets formed therein.

At this time, the first through hole 141a for a magnet and the second through hole 141a' for a magnet may have the same size and shape as each other, and may have a length in the lateral direction that is (almost) the same as the overall length in the lateral direction of the two opposing first side surfaces of the housing member 140. Meanwhile, the third through hole for a magnet and the fourth through hole for a magnet may have the same size and shape as each other, and may have a smaller length in the lateral direction than the first through hole 141a for a magnet and the second through hole 141a' for a magnet. This is because the through hole 141b for a sensor is formed in the second side surface, in which the third or fourth through hole for a magnet is formed, and consequently there is a need to secure a space for formation of the through hole 141b for a sensor.

The first driving magnet 131 and the second driving magnet 132 may have the same size and shape as each other, and may have a length in the lateral direction that is almost the same as the overall length in the lateral direction of the two opposing first side surfaces of the housing member 140 as aforementioned. The third and fourth driving magnets (not illustrated), which may be respectively positioned in the third and fourth through holes (not illustrated) for magnets in a mounting, inserting, seating, contacting, coupling, securing, provisional securing, supporting, or disposing manner, may have the same size and shape as each other, and may have a smaller length in the lateral direction than the first driving magnet 131 and the second driving magnet 132.

Herein, similar to the first and second through holes 141 and 141a' for magnets, the third and fourth through holes for magnets may be arranged in a straight line in a symmetrical manner about the center of the housing member 140. That is, the third and fourth driving magnets (not shown) may be arranged based on the center of the housing member 140 or in a straight line in a symmetrical manner based on the center of the housing member 140.

If the first and second driving magnets 131 and 132 or the third and fourth driving magnets are arranged opposite each other in a manner of being biased from the center of the housing member 140, electromagnetic force may be biasedly applied to the first coil 120 of the bobbin 110A, and thus there may be the possibility of the bobbin 110A tilting. In other words, if the third and fourth driving magnets as well as the first and second driving magnets 131 and 132 are arranged in a straight line in a symmetrical manner based on the center of the housing member 140, electromagnetic force may be unbiasedly applied to the first coil 120 of the bobbin 110A, and consequently the bobbin 110A may be moved easily and accurately in the first direction.

Hereinafter, for convenience of explanation, the lens driving device 2000 according to the 1$^{st}$ embodiment will be described with reference to a structure that includes only the first and second driving magnets 131 and 132, but the explanation below may also be applied to a structure that further includes the third and fourth driving magnets.

The housing member 140 may have a plurality of first stoppers 143 protruding from the top surface thereof. The first stoppers 143 may function to inhibit collisions between the cover can 102 and the body of the housing member 140, and more particularly, to inhibit the top surface of the housing member 140 from directly colliding with the top inner surface of the cover can 102 when an external shock occurs. Further, the first stoppers 143 may function to guide the mounting position of the upper elastic member 150A. For example, referring to FIGS. 9 and 13, the upper elastic member 150A may have guide recesses 155, formed to have a shape corresponding to the first stoppers 143 at positions corresponding thereto.

The housing member 140 may have a plurality of upper frame support protrusions 144 protruding from the top surface thereof, so that an outer frame 152 of the upper elastic member 150A is positioned on the housing member 140 through the plurality of upper frame support protrusions 144 in an inserting, seating, contacting, securing, provisional securing, coupling, supporting, or disposing manner. The outer frame 152 of the upper elastic member 150A may have first through holes (or recesses) 152a, formed to have a shape corresponding to the upper frame support protrusions 144 at positions corresponding thereto. After being positioned in the first through holes 152a in an inserting, seating, contacting, securing, provisional securing, coupling, supporting or disposing manner, the upper frame support protrusions 144 may be fixed through an adhesive or welding, and the welding may include heat welding, ultrasonic welding or the like.

The housing member 140 may have a plurality of lower frame support protrusions 147 protruding from the bottom surface thereof for coupling of an outer frame 162 of the lower elastic member 160A to the housing member 140. The lower frame support protrusions 147 may be formed at four corners of the bottom surface of the housing member 140. Meanwhile, referring to FIG. 14, the outer frame 162 of the lower elastic member 160A may have engagement portions (or insertion recesses or holes) 162a formed at positions corresponding to the lower frame support protrusions 147, so that the lower frame support protrusions 147 are positioned in the engagement portions 162a in a mounting, inserting, seating, contacting, coupling, securing, provisional securing, supporting or disposing manner, the engaged portions may be fixed through an adhesive or welding, and the welding may include heat welding, ultrasonic welding or the like.

The housing member 140 may be a yoke housing member capable of functioning as a yoke. The yoke housing member may be structured such that the upper elastic member 150A and the top inner surface of the yoke are spaced apart from each other. This serves to inhibit interference between the upward movement of the bobbin 110A and the yoke.

Alternatively, the yoke (not illustrate) may serve as the housing member 140. In this case, the yoke may be coupled to the base 190, and the upper elastic member 150A may be disposed below or in the yoke.

According to another embodiment, an additional cover may be further disposed on the yoke. In this case, the upper elastic member 150A may be disposed on the yoke or between the yoke and the cover, and the upper elastic member 150A may be coupled to the cover or the yoke.

On the other hand, the driving magnets 130 (131 and 132) may be respectively secured to the through holes 141a and 141a' for magnets using an adhesive, but the securing method is not limited thereto, and may be implemented using an adhesive member such as a double-sided adhesive tape. Alternatively, according to a modified embodiment, unlike the drawings, the housing member 140 may have recess-shaped magnet-receiving portions (not illustrated) formed in the inner surface thereof, instead of the first and second through holes 141a and 141a' for magnets, and the magnet-receiving portions may have a size and a shape corresponding to the driving magnets 130.

The driving magnets 130 may be arranged at positions facing the first coil 120, which is disposed around the outer peripheral surface of the bobbin 110A. The driving magnets 130 may be divided into separate parts as illustrated, or may be formed in a singular body, unlike the drawings. According to the embodiment, each of the driving magnets 130 may be arranged such that the surface facing the first coil 120 of the bobbin 110A is an N-pole surface and the opposite surface is an S-pole surface. However, the arrangement of the driving magnets is not limited thereto, and the driving magnets may be arranged in the opposite manner.

The driving magnets 130 may have a two-divided structure that lies in the plane perpendicular to the optical axis. That is, the driving magnets 130 may be bipolar-magnetized magnets, and may include a first magnet (not illustrated) and a second magnet (not illustrated), which are arranged opposite each other in the plane perpendicular to the optical axis, with a non-magnetic partition wall (not illustrated) interposed therebetween. Here, the non-magnetic partition wall may be air or another non-magnetic substance. The first and second magnets may be arranged such that the polarities of the magnets facing each other are opposite each other, but the embodiment is not limited to this configuration, and may have various other configurations. The bipolar-magnetized magnet will be described later in detail with reference to FIG. 37a, FIG. 37b, FIG. 43a and FIG. 43b.

The first and second driving magnets 131 and 132 may be formed in a rectangular parallelepiped shape having a predetermined width, and may be respectively seated in the first and second through holes 141a and 141a' for magnets such that all or some of the surfaces of the first and second driving magnets 131 and 132 may serve as a portion of the side surface (the outer surface or the inner surface) of the housing member 140. The first and second driving magnets 131 and 132 may be disposed on the side surfaces of the housing member 140, may be disposed on or coupled to the inner surface of the above-described yoke, or may be coupled or secured to the inner surface of the yoke without the housing member 140. At this time, the driving magnets 131 and 132, which face each other, may be mounted parallel to each other. The surface of each of the driving magnets 130 and the surface of the first coil 120 of the bobbin 110A, which face each other, may be arranged parallel to each other. However, the embodiment is not limited to this configuration, and as specified by some design, only one of the driving magnets 130 and the first coil 120 of the bobbin 110A may be configured as a flat surface, and the other may be configured as a curved surface. Alternatively, both the surface of the first coil 120 of the bobbin 110A and the surface of each of the driving magnets 130, which face each other, may be curved surfaces, in which case the surface of the first coil 120 of the bobbin 110A and the surface of each of the driving magnets 130 that face each other may have the same curvature.

Further, as described above, the through hole 141b or the recess for a sensor may be formed in one side surface of the housing member 140, the displacement sensing part 180 may be positioned in the through hole 141b or the recess for a sensor in a mounting, inserting, seating, contacting, coupling, securing, provisional securing, supporting or disposing manner, and the displacement sensing part 180 may be electrically coupled to one surface of the first circuit board 170A in a soldering manner. In other words, the first circuit board 170A may be positioned on the outer portion of one of the four side surfaces 141 of the housing member 140, in which the through hole 141b or the recess for a sensor is formed, in a mounting, inserting, seating, contacting, coupling, securing, provisional securing, supporting or disposing manner.

The sensing unit may detect/determine a first displacement value in the first direction of the bobbin 110A. To this end, the sensing unit may include a displacement sensing part 180 and a sensing magnet 182A. The displacement sensing part 180 and the through hole 141b or the recess for a sensor may be disposed at a position corresponding to the position of the sensing magnet 182A. As illustrated, the sensing magnet 182A may be embodied as vertically two-divided bipolar-magnetized magnets in order to increase the intensity of a magnetic field, but the embodiment is not limited to this configuration.

The displacement sensing part 180 may be a sensor capable of detecting variation in the magnetic force emitted from the sensing magnet 182A of the bobbin 110A. For example, the displacement sensing part 180 may be a Hall sensor, but the embodiment is not limited to this configuration. According to another embodiment, any sensor, not necessarily a Hall sensor, may be used as the displacement sensing part 180 so long as it is capable of detecting variation in the magnetic force, and any sensor capable of detecting a position besides magnetic force may also be used. For example, a configuration using a photo-reflector may be possible. In the case in which the displacement sensing part 180 is embodied as a Hall sensor, calibration with respect to the driving distance of the actuator may be additionally carried out based on the Hall voltage difference with respect to variation in a magnetic flux density that is detected by the Hall sensor. For example, in the case in which the displacement sensing part 180 is embodied as a Hall sensor, the Hall sensor 180 may include a plurality of pins. For example, the plurality of pins may include $1^{st}$ and $2^{nd}$ pins. The Pt pins may include a 1-$1^{st}$ pin and a 1-$2^{nd}$ pin, which are respectively connected to a voltage source and a ground, and the $2^{nd}$ pins may include a 2-$1^{st}$ pin and a 2-$2^{nd}$ pin, which output sensing results. Here, the sensing results may be output from the 2-$1^{st}$ and 2-$2^{nd}$ pins in the form of electric current, but the embodiment is not limited to this type of sensing result output. The first circuit board 170A is connected to the Hall sensor 180 in order to supply power to the 1-$1^{st}$ and 1-$2^{nd}$ pins and to receive signals from the 2-$1^{st}$ and 2-$2^{nd}$ pins.

The first circuit board 170A may be positioned on one side surface of the housing member 140 in a mounting, inserting, seating, contacting, coupling, securing, provisional securing, supporting or disposing manner. At this time, as described above, since the first circuit board 170A has the mounting through hole 173 or the recess formed therein, the mounting position of the first circuit board 170A may be guided by the mounting protrusion 149 formed in one side surface of the housing member 140. The number of mounting protrusions 149 may be one or more, and in the case in which two or more mounting protrusions are provided, it may be easier to guide the mounting position of the first circuit board 170A.

The first circuit board 170A may include a plurality of terminals 171 so as to receive external power and to supply required electric current to the first coil 120 of the bobbin 110A and the displacement sensing part 180. The number of terminals 171 provided in the first circuit board 170A may be increased or decreased depending on the type of constitutional components that need to be controlled. For example, the plurality of terminals 171 of the first circuit board 170A may include power terminals, which receive external power, and I2C communication terminals. Here, one of the power terminals may be a terminal that is connected to a voltage source, and the other of the power terminals may be a terminal that is connected to a ground.

Further, referring to FIGS. 9 and 12, the first circuit board 170A may be provided with at least one pin 172. The number of pins 172 may be four or more or less. For example, the four pins 172 may include a test pin, a hole pin, a VCM+ pin, and a VCM− pin, but the embodiment is not limited to these types of pins. Here, the test pin may be a pin that is used to evaluate the performance of the lens driving device 2000. The hole pin may be a pin that is used to draw data output from the displacement sensing part 180. The VCM+ pin and the VCM− pin may be pins that are used to evaluate the performance of the lens driving device 2000 without receiving feedback from the displacement sensing part 180.

According to the embodiment, the first circuit board 170A may be embodied as an FPCB. Although it has been described above that the lens driving device 2000 includes the displacement sensing part 180, the displacement sensing part 180 may be omitted in some embodiments.

Further, although it has been described above that the first circuit board 170A is positioned on the outer side surface of the housing member 140 in a mounting, inserting, seating, contacting, coupling, securing, provisional securing, supporting or disposing manner, the embodiment is not limited to this configuration. That is, according to another embodiment, in the case in which the lens driving device 2000 does not include the displacement sensing part 180, the first circuit board 170A may be positioned below the housing member 140, rather than at the outer side surface of the housing member 140.

Figure 15:
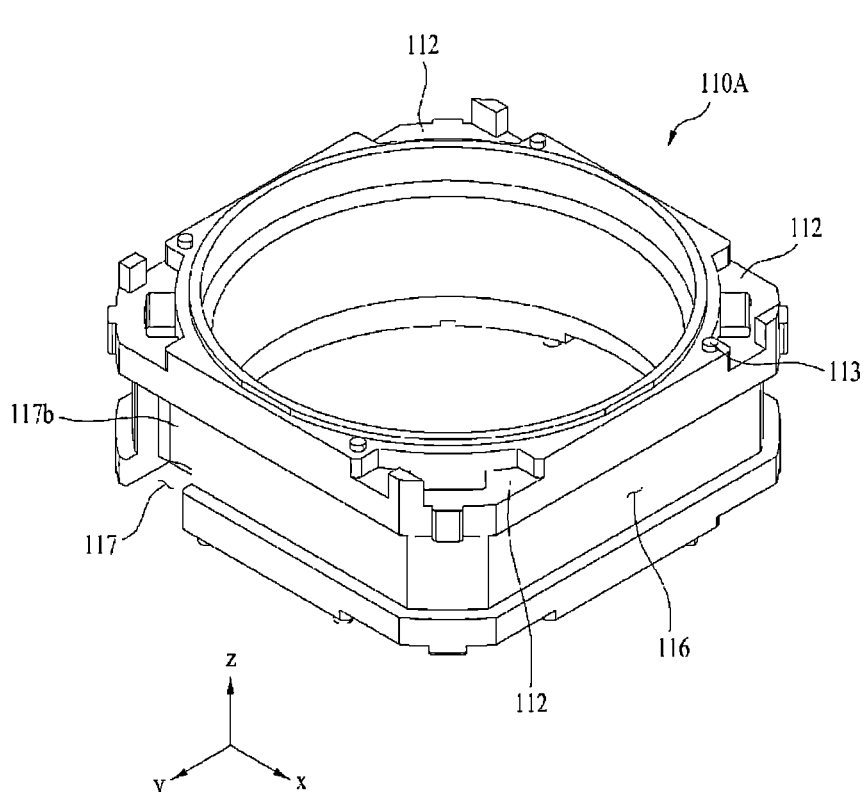
FIG. 15 shows a plan perspective view of a bobbin according to another embodiment.
Figure 16:
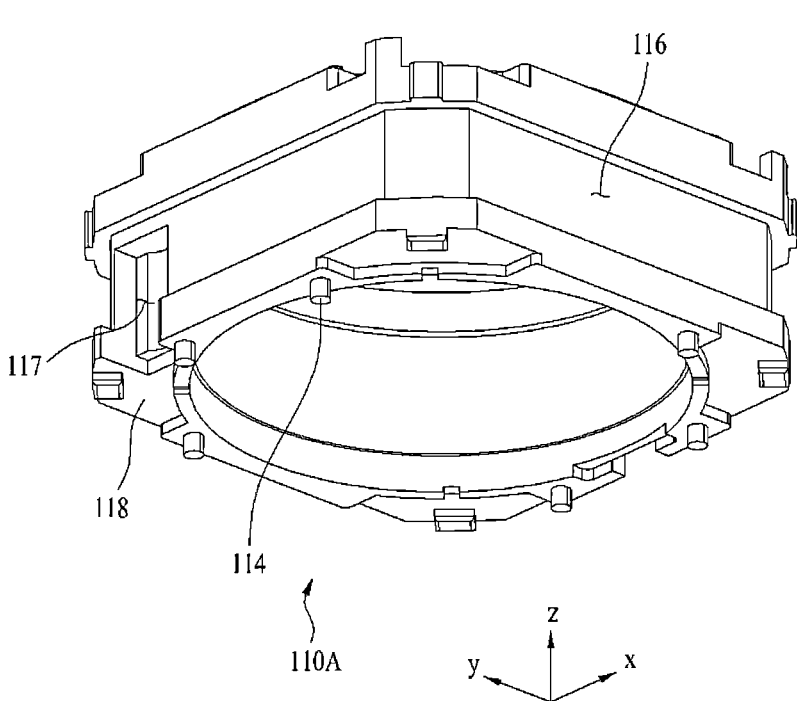
FIG. 16 shows a bottom perspective view of the bobbin according to another embodiment.

FIG. 15 shows a plan perspective view of the bobbin 110A depicted in FIG. 8 according to another embodiment, and FIG. 16 shows a bottom perspective view of the bobbin 110A depicted in FIG. 8 according to another embodiment.

Referring to FIGS. 10, 11, and 13 to 16, the upper elastic member 150A and the lower elastic member 160A may resiliently support upward and/or downward movement in the optical axis direction of the bobbin 110A. The upper elastic member 150A and the lower elastic member 160A may be embodied as a plate spring, but the embodiment is not limited to this configuration of the upper and lower elastic members 150A and 160A.

The upper elastic member 150A may include an inner frame 151, which is coupled to the bobbin 110A, an outer frame 152, which is coupled to the housing member 140, and connection portions 153, which connect the inner frame 151 and the outer frame 152.

The lower elastic member 160A may include an inner frame 161, which is coupled to the bobbin 110A, an outer frame 162, which is coupled to the housing member 140, and connection portions 163, which connect the inner frame 161 and the outer frame 162.

The connection portions 153 and 163 may be formed so as to be bent once or more in a certain pattern. Upward and/or downward movement of the bobbin 110A in the first direction, i.e., the optical axis direction, may be resiliently (or elastically) supported by a positional change and minute deformation of the connection portions 153 and 163.

According to the embodiment, as illustrated in FIG. 13, the upper elastic member 150A may include a plurality of first through holes 152a formed in the outer frame 152 and a plurality of second through holes 151a formed in the inner frame 151.

The first through holes 152a may be coupled to upper frame support protrusions 144 formed in the top surface of the housing member 140, and the second through holes 151a may be coupled to upper support protrusions 113 formed in the top surface of the bobbin 110A.

The upper support protrusions 113 will be described later in detail. That is, the outer frame 152 may be positioned on the housing member 140 in a mounting, seating, contacting, securing, provisional securing, supporting, disposing or coupling manner using the first through holes 152a, and the inner frame 151 may be positioned on the bobbin 110A in a mounting, seating, contacting, securing, provisional securing, supporting, disposing or coupling manner using the second through holes 151a.

The connection portions 153 of the upper elastic member 150A may connect the inner frame 151 and the outer frame 152 so that the inner frame 151 is capable of being elastically deformed within a predetermined range in the first direction relative to the outer frame 152.

At least one of the inner frame 151 or the outer frame 152 of the upper elastic member 150A may include at least one terminal that is electrically connected to at least one of the first coil 120 of the bobbin 110A or the first circuit board 170A.

Referring to FIG. 14, the lower elastic member 160A may include a plurality of engagement portions 162a formed in the outer frame 162, and a plurality of third through holes (or recesses) 161a formed in the inner frame 161.

As described above, the engagement portions 162a may be positioned on the bottom surface of the housing member 140 in a mounting, inserting, seating, contacting, coupling, securing, provisional securing, supporting or disposing manner, and the third through holes 161a may be assembled with lower support protrusions 114 formed in the bottom surface of the bobbin 110A, which is illustrated in FIG. 16, in a contacting, coupling, securing or provisional securing manner. That is, the outer frame 162 may be positioned on the housing member 140 in a mounting, inserting, seating, contacting, coupling, securing, provisional securing, supporting or disposing manner using the engagement portions 162a, and the inner frame 161 may be positioned on the bobbin 110A in a mounting, inserting, seating, contacting, coupling, securing, provisional securing, supporting or disposing manner using the third through holes 161a.

The connection portions 163 of the lower elastic member 160A may connect the inner frame 161 and the outer frame 162 so that the inner frame 161 is capable of being elastically deformed within a predetermined range in the first direction relative to the outer frame 162.

The lower elastic member 160A may include a first lower elastic member 160a and a second lower elastic member 160b, which are separated from each other. Due to such a two-divided structure, the first lower elastic member 160a and the second lower elastic member 160b of the lower elastic member 160A may receive power or current having different polarities. That is, the inner frame 161 and the outer frame 162 are respectively coupled to the bobbin 110A and the housing member 140, the inner frame 161 has solder portions provided at positions corresponding to both ends of the first coil 120 disposed around the bobbin 110A, and electrical connection, such as soldering, is performed to the solder portions, thereby applying power or current having different polarities to the first lower elastic member 160a and the second lower elastic member 160b of the lower elastic member 160A. Further, the first lower elastic member 160a may be electrically connected to one of the two ends of the first coil 120, and the second lower elastic member 160b may be electrically connected to the other of the two ends of the first coil 120, thereby receiving current and/or voltage from the outside. To this end, at least one of the inner frame 161 or the outer frame 162 of the lower elastic member 160A may include at least one terminal, which is electrically connected to at least one of the first coil 120 of the bobbin 110A or the first circuit board 170A. The two ends of the first coil 120 may be arranged on the opposite sides based on the bobbin 110A, or may be arranged adjacent to each other on the same side.

On the other hand, the upper elastic member 150A, the lower elastic member 160A, the bobbin 110A and the housing member 140 may be assembled through a bonding process using heat welding and/or an adhesive. At this time, the assembly sequence may be such that the components are first fixed using heat welding and are then bonded to each other using an adhesive.

According to another embodiment, the upper elastic member 150A, as illustrated in FIG. 14, may have a two-divided structure, and the lower elastic member 160A, as illustrated in FIG. 13, may have a unitary structure.

Figure 17:
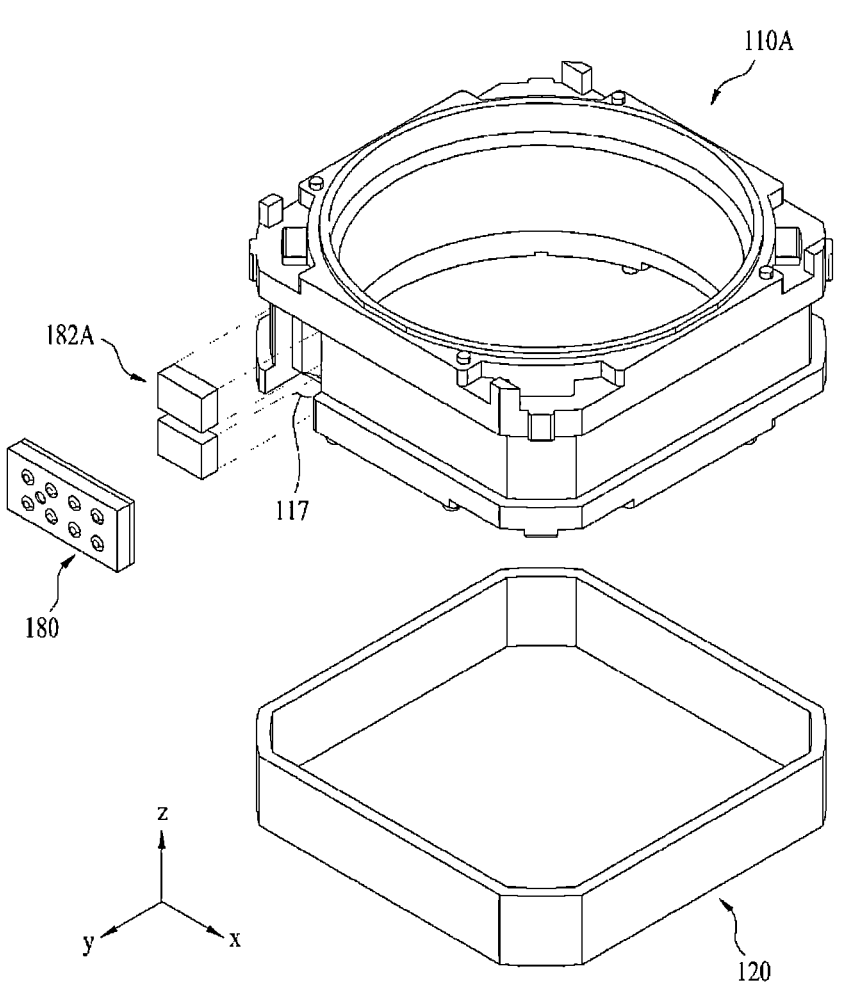
FIG. 17 shows an exploded perspective view of the bobbin, a first coil, a displacement sensing part and a sensing magnet according to another embodiment.
Figure 18:
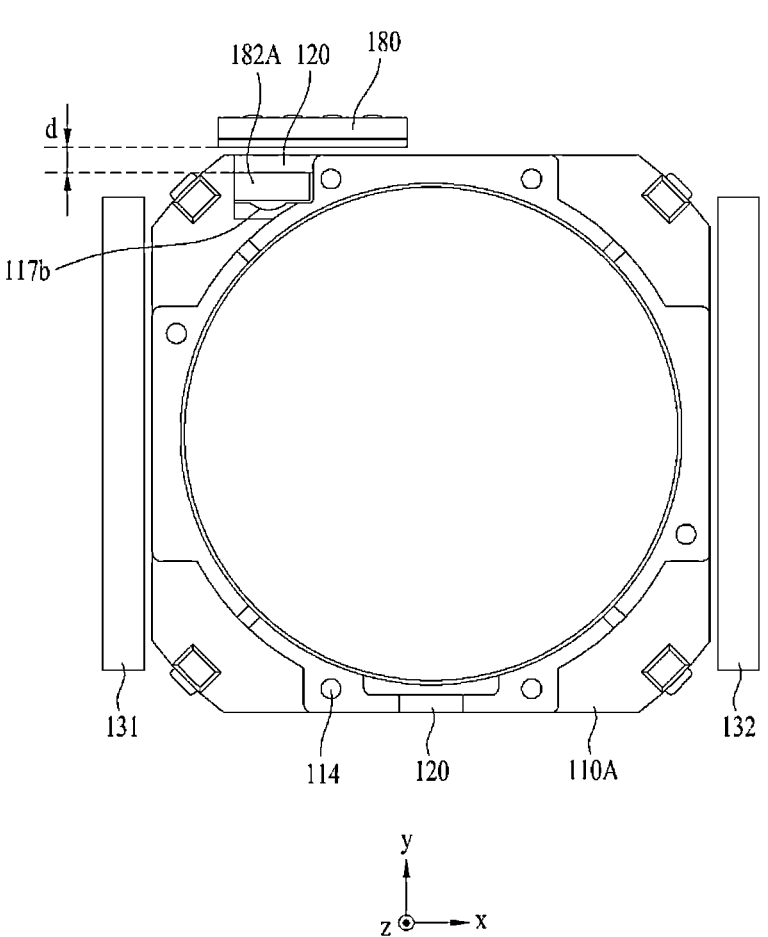
FIG. 18 shows a schematic bottom perspective view of the bobbin, the first coil, first and second driving magnets, the displacement sensing part and the sensing magnet according to another embodiment.

FIG. 17 shows an exploded perspective view of the bobbin 110A, the first coil 120, the displacement sensing part 180 and the sensing magnet 182A according to another embodiment, and FIG. 18 shows a schematic bottom perspective view of the bobbin 110A, the first coil 120, the first and second driving magnets 131 and 132, the displacement sensing part 180 and the sensing magnet 182A according to another embodiment.

The bobbin 110A may be mounted in the housing member 140 so as to be movable reciprocatingly in the optical axis direction. The first coil 120 may be mounted around the outer peripheral surface of the bobbin 110A, and may electromagnetically interact with the driving magnet 130 of the housing member 140, thereby moving the bobbin 110A reciprocatingly in the first direction.

Further, the bobbin 110A may be supported resiliently (or elastically) by the upper elastic member 150A and the lower elastic member 160A so that the bobbin 110A is capable of moving in the first direction, i.e. the optical axis direction, and consequently of performing the auto-focusing function.

Although not illustrated, at least one lens may be provided in the bobbin 110A in a mounting, inserting, seating, contacting, coupling, securing, provisional securing, supporting or disposing manner. For example, the bobbin 110A may include a lens barrel (not illustrated) in which at least one lens is mounted. The lens barrel is a constitutional component of the camera module, which will be described later, but may not be an essential component of the lens driving device. The lens barrel may be coupled to the inside of the bobbin 110A in various manners. In one example, female threads may be formed in the inner peripheral surface of the bobbin 110A, and male threads, which correspond to the female threads, may be formed on the outer peripheral surface of the lens barrel, so that the lens barrel is coupled to the bobbin 110A in a screw-engagement manner. However, the embodiment is not limited to this engagement manner, and the lens barrel may be directly secured to the inside of the bobbin 110A using methods other than screw-engagement without forming threads in the inner peripheral surface of the bobbin 110A.

Alternatively, one or more lenses, without a lens barrel, may be integrally formed with the bobbin 110A. Only a single lens may be coupled to the lens barrel, or two or more lenses may be provided to form an optical system.

The bobbin 110A may have a plurality of upper support protrusions 113 protruding from the top surface thereof and a plurality of lower support protrusions 114 protruding from the bottom surface thereof. The upper support protrusions 113, as illustrated in FIG. 15, may have a cylindrical shape or an angular column shape, and the inner frame 151 of the upper elastic member 150A and the bobbin 110A may be assembled with the upper support protrusions 113 in a coupling, securing, provisional securing, contacting or supporting manner. According to the embodiment, the inner frame 151 of the upper elastic member 150A may have second through holes 151a formed at positions corresponding to the upper support protrusions 113. At this time, the upper support protrusions 113 and the second through holes 151a may be secured to each other using heat welding, or may also be secured to each other using an adhesive member such as epoxy or the like. The upper support protrusions 113 may be provided in a plural number. The distance between the upper support protrusions 113 may be set within a suitable range capable of avoiding interference with peripheral components. That is, the upper support protrusions 113 may be equidistantly arranged in a symmetrical manner about the center of the bobbin 110A, or may alternatively be non-equidistantly arranged in a symmetrical manner about a certain imaginary line that passes through the center of the bobbin 110A.

Similar to the upper support protrusions 113, the lower support protrusions 114, as illustrated in FIG. 16, may have a cylindrical shape or an angular column shape, and the inner frame 161 of the lower elastic member 160A and the bobbin 110A may be assembled with the lower support protrusions 114 in a coupling, securing, provisional securing, contacting or supporting manner. According to the embodiment, the inner frame 161 of the lower elastic member 160A may have third through holes 161a formed at positions corresponding to the lower support protrusions 114 of the bobbin 110A. At this time, the lower support protrusions 114 and the third through holes 161a may be secured to each other using heat welding, or may also be secured to each other using an adhesive member such as epoxy or the like. As illustrated in FIG. 16, the lower support protrusions 114 may be provided in a plural number. The distance between the lower support protrusions 114 may be set within a suitable range capable of avoiding interference with peripheral components. That is, the lower support protrusions 114 may be equidistantly arranged in a symmetrical manner about the center of the bobbin 110A.

The bobbin 110A may have upper escape recesses 112, formed at positions corresponding to the connection portions 153 of the upper elastic member 150A in the top surface of the bobbin 110A, and lower escape recesses 118, formed at positions corresponding to the connection portions 163 of the lower elastic member 160A, in the bottom surface of the bobbin 110A.

Due to the upper escape recesses 112 and the lower escape recesses 118, when the bobbin 110A is moved in the first direction relative to the housing member 140, spatial interference between the connection portions 153 and 163 and the bobbin 110A may be inhibited, and elastic deformation of the connection portions 153 and 163 may be more easily achieved. As illustrated in FIG. 15 or 16, the upper escape recesses 112 or the lower escape recesses 118 may be located in the corners of the bobbin 110, but alternatively, may be located in the side surfaces of the bobbin depending on the shape and/or position of the connection portions of the elastic members.

Further, the bobbin 110A may have a coil-receiving recess (or a coil-receiving portion) 116 formed in the outer peripheral surface thereof, into which the first coil 120 is positioned in a mounting, inserting, seating, contacting, coupling, securing, provisional securing, supporting or disposing manner, but the embodiment is not limited to this configuration. That is, according to another embodiment, instead of directly providing the first coil 120 on the outer peripheral surface of the bobbin 110A in a mounting, inserting, seating, contacting, coupling, securing, provisional securing, supporting or disposing manner, a coil ring (not illustrated), which has the same shape as the outer peripheral shape of the bobbin 110A, may be provided adjacent to the outer peripheral surface of the bobbin 110A in a mounting, inserting, seating, contacting, coupling, securing, provisional securing, supporting or disposing manner, and the first coil 120 may be positioned in the coil ring in a mounting, inserting, seating, contacting, coupling, securing, provisional securing, supporting or disposing manner.

The first coil 120 may be embodied as a ring-shaped coil block, which is positioned on the outer peripheral surface of the bobbin 110A or in the coil-receiving recess 116 in a mounting, inserting, seating, contacting, coupling, securing, provisional securing, supporting or disposing manner, but the embodiment is not limited to this configuration. The coil 120 may be directly wound around the outer peripheral surface of the bobbin 110A or the coil-receiving recess 116. In the case in which the pre-wound first coil 120 is provided around the bobbin 110A in a mounting, inserting or disposing manner, the first coil 120 may be positioned around the bobbin 110A in a mounting, inserting or disposing manner from above or below the bobbin 110A.

According to the embodiment, the first coil 120, as illustrated in FIG. 17, may be formed to have a substantially octagonal shape. This shape corresponds to the shape of the outer peripheral surface of the bobbin 110A, and the bobbin 110A may also have an octagonal shape. Further, at least four surfaces (or at least twenty-two surfaces) of the first coil 120 may be formed to be straight, and the edge portions connecting these surfaces may be formed to be round or straight. At this time, the portion that is formed to be straight may be a surface corresponding to the driving magnet 130. Further, the surface of the driving magnet 130 that corresponds to the first coil 120 may have the same curvature as the curvature of the first coil 120. That is, if the first coil 120 is straight, the surface of the driving magnet 130 corresponding thereto may be straight, and if the first coil 120 is curved, the surface of the driving magnet 130 corresponding thereto may be curved and may have the same curvature as the curvature of the first coil 120. Also, even when the first coil 120 is curved, the surface of the driving magnet 130 corresponding thereto may be straight, and the opposite case may also be possible.

The first coil 120 functions to move the bobbin 110A in the optical axis direction so as to perform an auto-focusing function. As described above, when electric current is applied to the first coil 120, the first coil 120 electromagnetically interacts with the driving magnets 130, and electromagnetic force is generated, by which the bobbin 110A is capable of being moved as aforementioned.

On the other hand, the first coil 120 may be formed to correspond to the driving magnet 130. As illustrated, if the driving magnet 130 is embodied as a singular body and the entire surface thereof that faces the first coil 120 has the same polarity, the surface of the first coil 120 that corresponds to the driving magnet 130 may be formed to have the same polarity. Meanwhile, although not illustrated, if the driving magnet 130 has a two-divided structure that lies in the plane perpendicular to the optical axis and has two or more surfaces that face the first coil 120, the first coil 120 may also be divided into the same number of elements as the number of elements into which the driving magnet 130 is divided.

The lens driving device 2000 may further include a sensing magnet 182A. The sensing magnet 182A may be assembled with the bobbin 110A in a mounting, inserting, seating, contacting, coupling, securing, provisional securing, supporting or disposing manner. Accordingly, when the bobbin 110A is moved in the first direction, the sensing magnet 182A may move to be displaced the same distance as the bobbin 110A in the first direction. Further, the sensing magnet 182A may be integrally formed with the bobbin 110A, and may be arranged such that a portion directed above the bobbin 110A is an N-pole portion and a portion directed below the bobbin 110A is an S-pole portion. However, the embodiment is not limited to this configuration, and the opposite case may also be possible.

Further, the sensing magnet 182A may be embodied as two-divided bipolar-magnetized magnets that lie in the plane perpendicular to the optical axis. The bipolar-magnetized magnet will be described later in detail with reference to FIG. 37*a*, FIG. 37*b*, FIG. 43*a* and FIG. 43*b*.

As illustrated in FIGS. 15 to 18, the bobbin 110A may further include an accommodation recess 117 formed in the outer peripheral surface of the bobbin 110A in order to accommodate the sensing magnet 182A.

The accommodation recess 117 may be formed concave to a predetermined depth in inward direction of the bobbin 110A from the outer surface of the bobbin 110A. In particular, the accommodation recess 117 may be formed in one side surface of the bobbin 110A such that at least a portion of the accommodation recess 117 is located inside the first coil 120.

Further, at least a portion of the accommodation recess 117 may be formed to be concave to a predetermined depth in the inward direction of the bobbin 110A and to be deeper than the coil-receiving recess 116. As such, by forming the accommodation recess 117 in the inward direction of the bobbin 110A, the sensing magnet 182A may be accommodated in the bobbin 110A, and consequently there is no need to secure additional space for mounting the sensing magnet 182A, which leads to improvement in space efficiency of the bobbin 110A.

Specifically, the accommodation recess 117 may be disposed at a position corresponding to the position of the displacement sensing part 180 of the housing member 140 or a position opposite the displacement sensing part 180. Accordingly, the displacement sensing part 180 and the sensing magnet 182A may be aligned along the same axis.

Since the distance d between the sensing magnet 182A and the displacement sensing part 180, which corresponds to the sum of the thickness of the first coil 120 and the distance between the first coil 120 and the displacement sensing part 180, is capable of being minimized, the magnetic force detection accuracy of the displacement sensing part 180 may be enhanced.

In more detail, as illustrated in FIGS. 15 to 18, the accommodation recess 117 may include an inner surface, by which one surface of the sensing magnet 182A is supported, and an adhesion recess 117*b*, which is formed concave to a predetermined depth in the inward direction from the inner surface in order for an adhesive to be injected.

The inner surface of the accommodation recess 117 is a surface that is located at an inward position that is directed toward the center of the bobbin 110A, and when the sensing magnet 182A has a rectangular parallelepiped shape, a larger surface of the sensing magnet 182A contacts or is seated on the inner surface of the accommodation recess.

The adhesion recess 117*b* of the accommodation recess 117 may be a recess that is formed such that a portion of the inner surface is dug to be more concave and deeper in the inward direction toward the center of the bobbin 110A. The adhesion recess 117*b* may extend to the inner surface of the bobbin 110A, on which one surface of the sensing magnet 182A is positioned in a mounting, inserting, seating, contacting, coupling, securing, provisional securing, supporting or disposing manner.

In another embodiment, the depth between the inner surface of the accommodation recess 117, by which one surface (that is, the larger surface) of the sensing magnet 182A is supported, and the outer peripheral surface (that is, the surface of the coil-receiving recess 116), on which the first coil 120 is disposed, may be equal to or smaller than the thickness of the sensing magnet 182A. Accordingly, the sensing magnet 182A may be secured in the accommodation recess 117 due to the inwardly pressurizing force of the first coil 120, which is generated by winding the first coil 120. In this case, there may be no need to use an adhesive.

In an additional embodiment, although not illustrated in the drawings, the bobbin 110A may further include an additional accommodation recess 117, which is formed in the outer peripheral surface of the bobbin 110A at a position symmetrical to the accommodation recess 117 about the center of the bobbin 110A, that is, a position opposite the position on the outer peripheral surface at which the accommodation recess 117 is formed, and a weight-balancing member, which is accommodated in the additional accommodation recess 117.

According to the embodiment, the sensing magnet 182A may be omitted. In this case, a driving magnet 130 may be used instead of the sensing magnet 182A.

According to the above description, the embodiment is capable of generating feedback on the amount of displacement in the optical axis direction of the lens using the sensing results of the displacement sensing part 180 and of readjusting the position of the lens in the optical axis direction, thereby shortening the time taken for focal alignment of the lens.

Further, the embodiment is capable of minimizing the distance between the sensing magnet 182A, which is assembled with the bobbin 110A, which is a movable unit (or a movable body), in a mounting, seating, contacting, securing, provisional securing, coupling, supporting or disposing manner, and the displacement sensing part 180, which is assembled with the housing member 140, which is a fixed unit (or a fixed body), in a mounting, seating, contacting, securing, provisional securing, coupling, supporting or disposing manner, and consequently of more accurately detecting the amount of displacement in the optical axis direction of the lens, thereby more accurately positioning the lens at the focal distance of the lens.

Further, since the sensing magnet 182A is positioned in the bobbin 110A in a mounting, seating, contacting, securing, provisional securing, coupling, supporting or disposing manner and the displacement sensing part 180 is positioned in the housing member 140 in a mounting, seating, contacting, securing, provisional securing, coupling, supporting or disposing manner, the embodiment does not need additional space for mounting at least one of the sensing magnet 182A or the displacement sensing part 180, thereby improving space efficiency of the camera module (particularly, the bobbin).

$3^{rd}$ Embodiment

Figure 19:
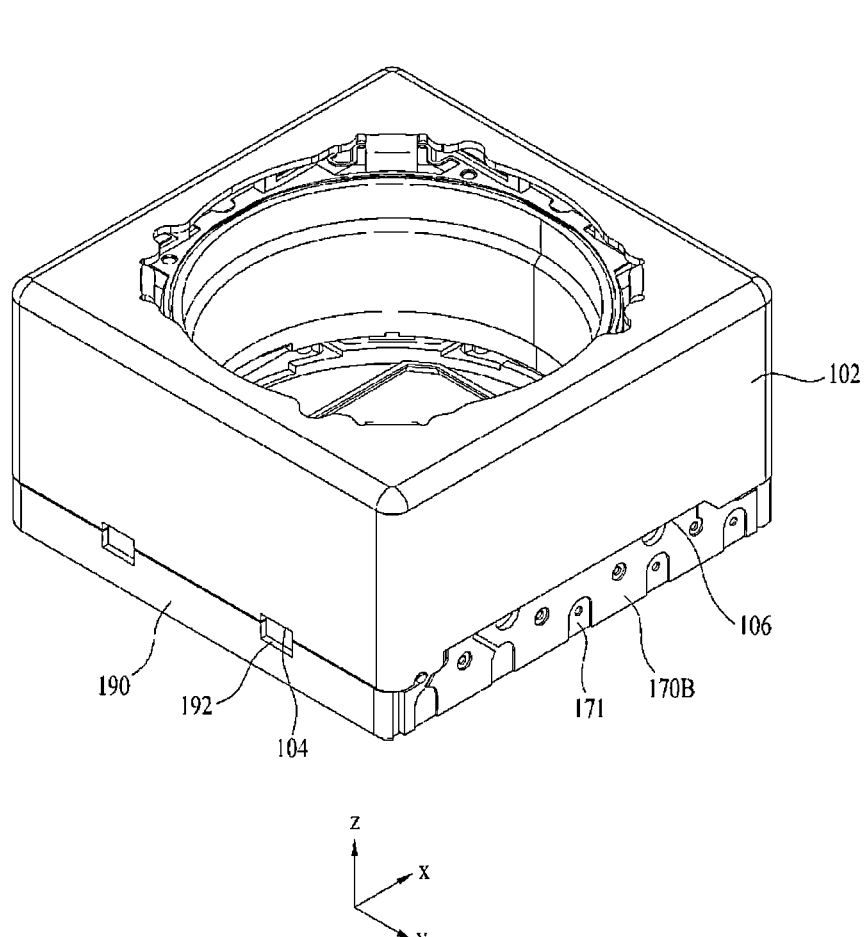
FIG. 19 is a schematic perspective view of a lens driving device according to a $3^{rd}$ embodiment.
Figure 20:
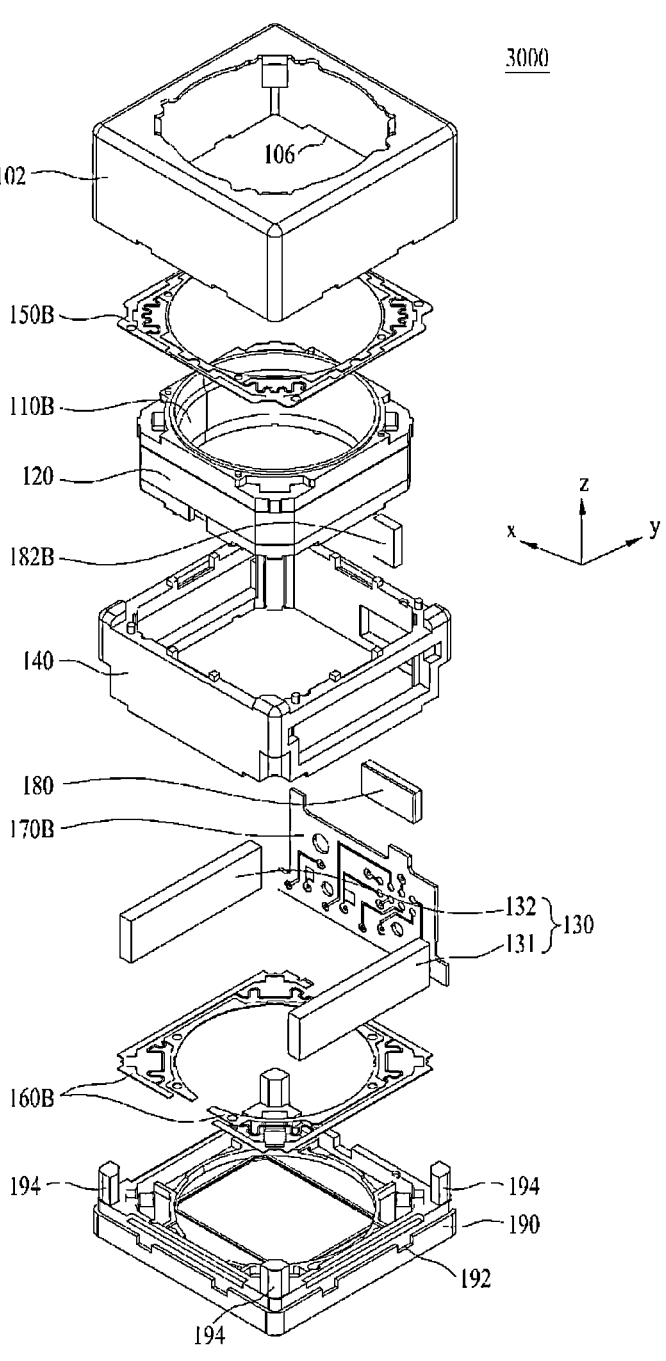
FIG. 20 is a schematic exploded perspective view of the lens driving device depicted in FIG. 19.
Figure 21:
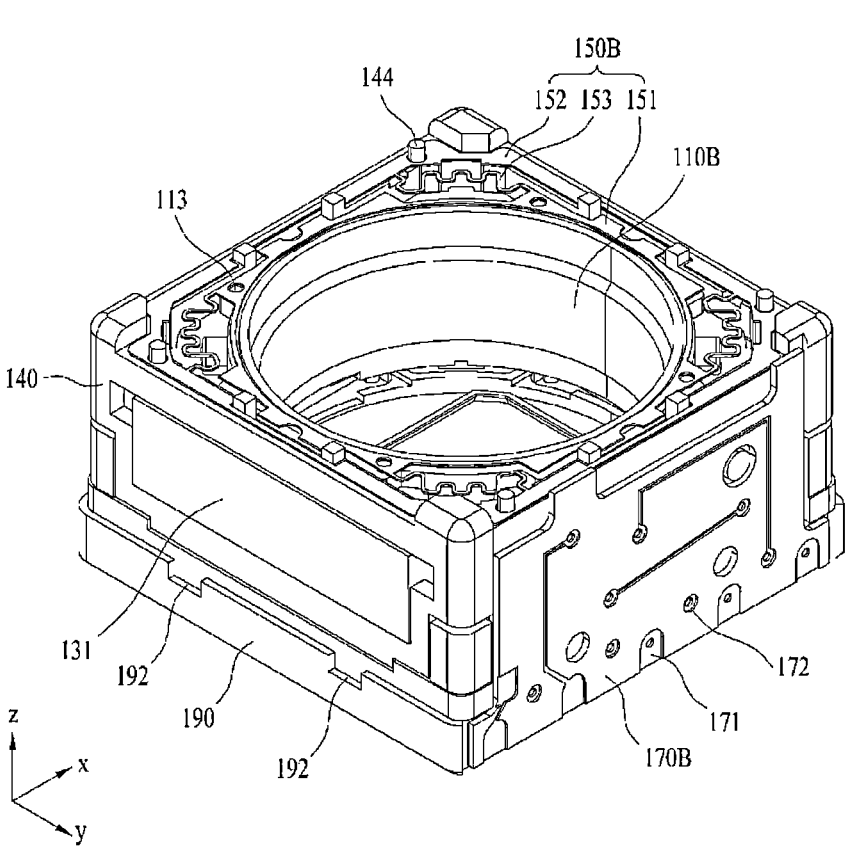
FIG. 21 is a schematic perspective view of the lens driving device in FIG. 19, from which a cover member is removed.
Figure 22:
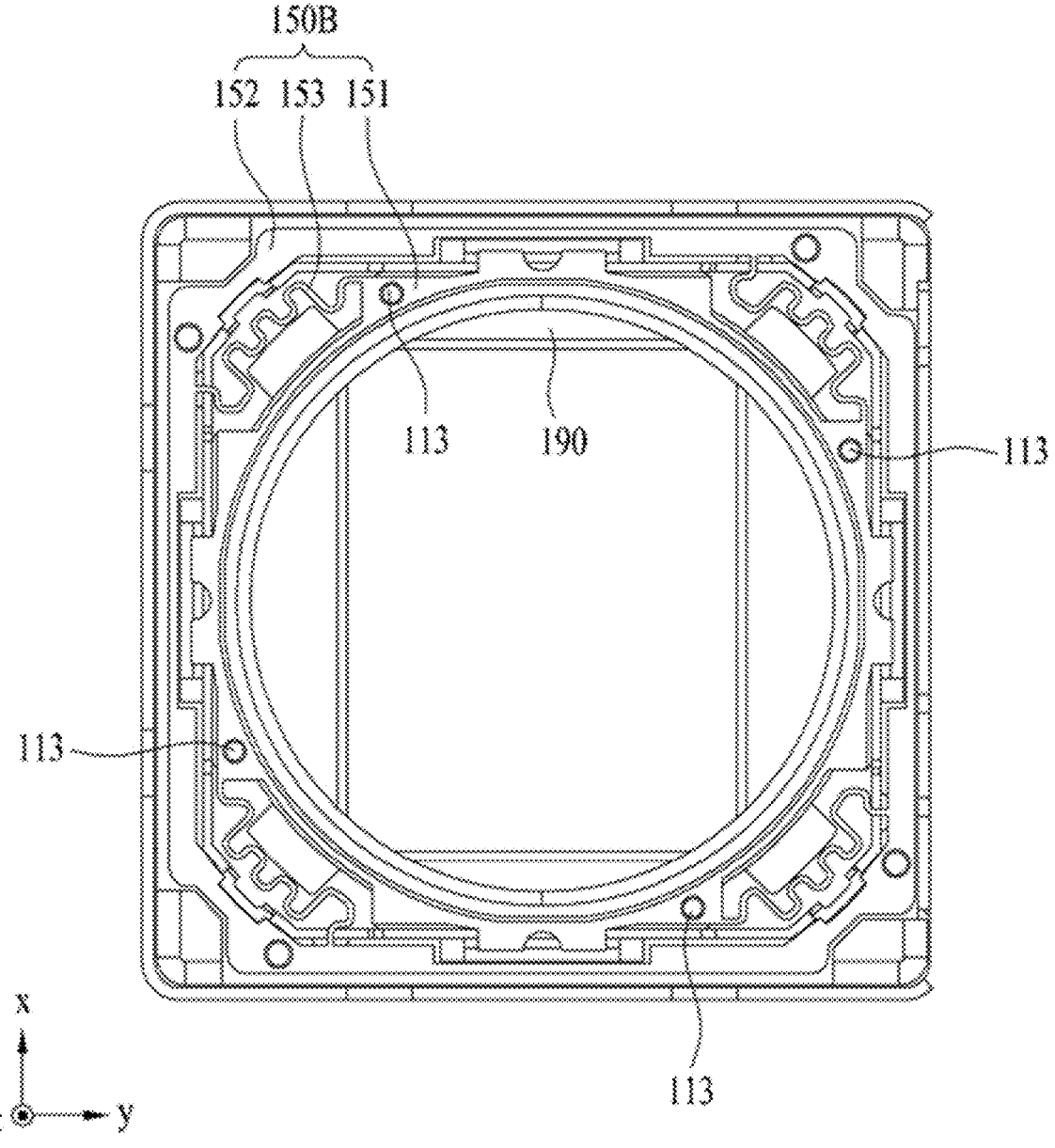
FIG. 22 is a schematic plan view of FIG. 21.
Figure 23:
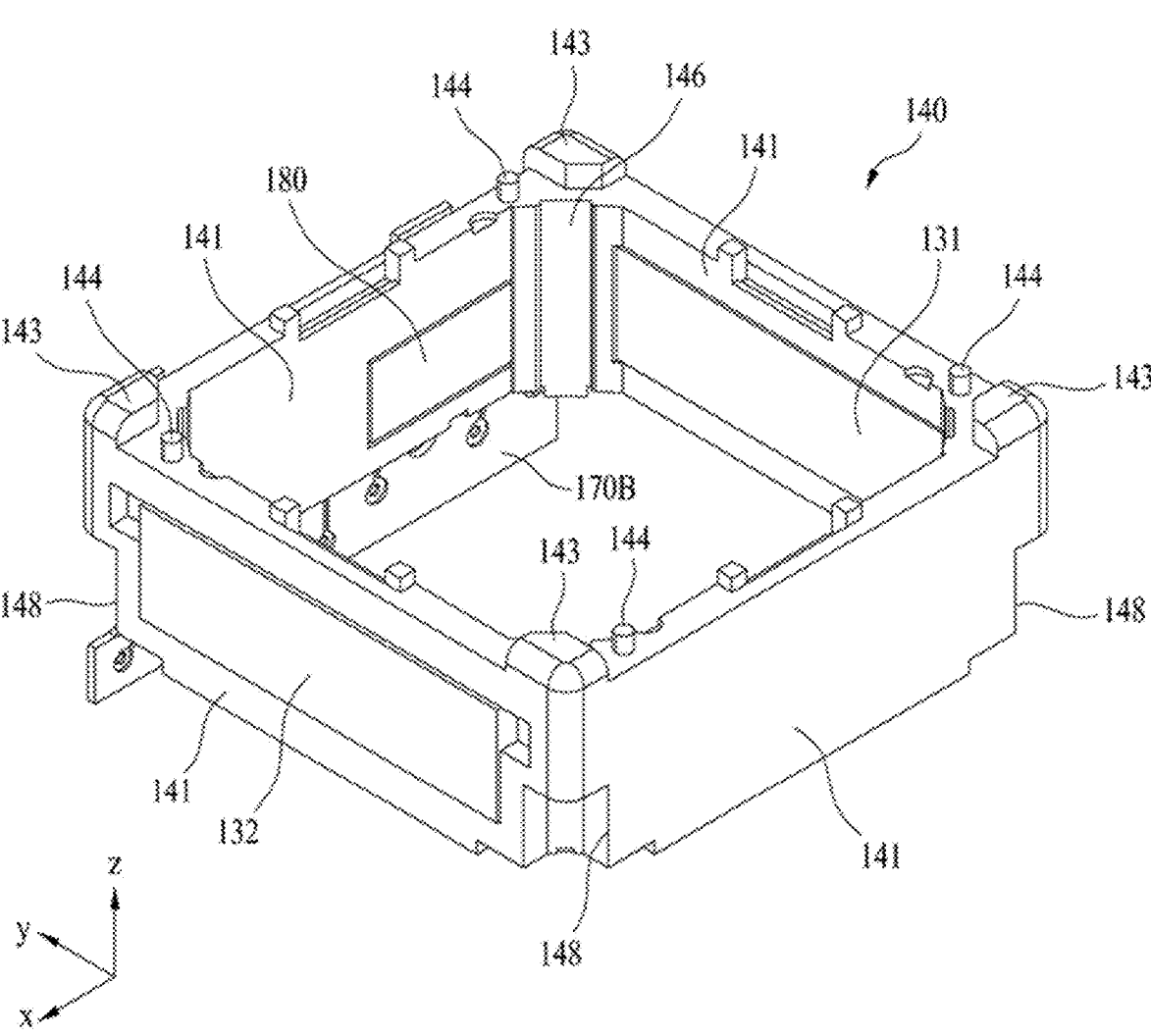
FIG. 23 is a schematic perspective view of a driving magnet, a housing member and a displacement sensing part according to still another embodiment.
Figure 24:
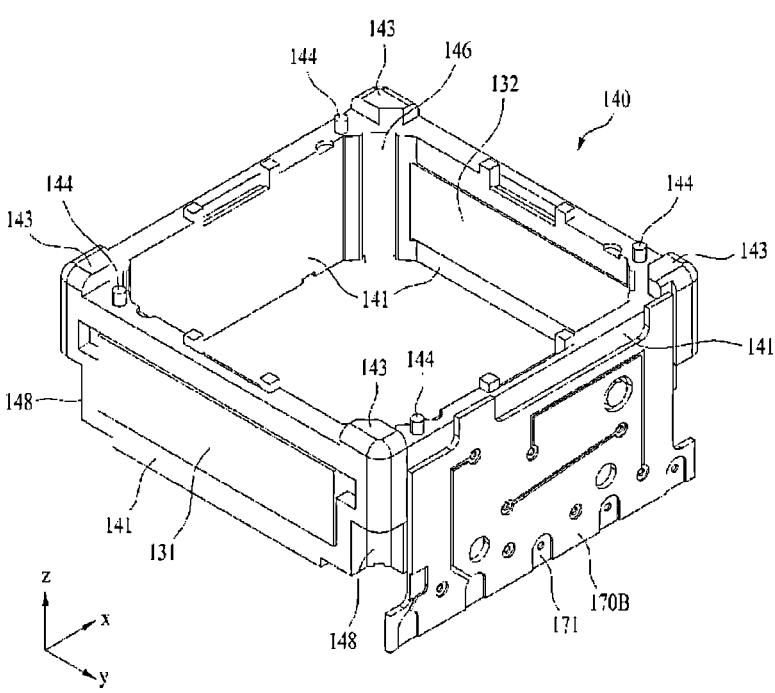
FIG. 24 is a schematic perspective view of the driving magnet, the housing member and the first circuit board when viewed from a different angle from FIG. 23.
Figure 25:
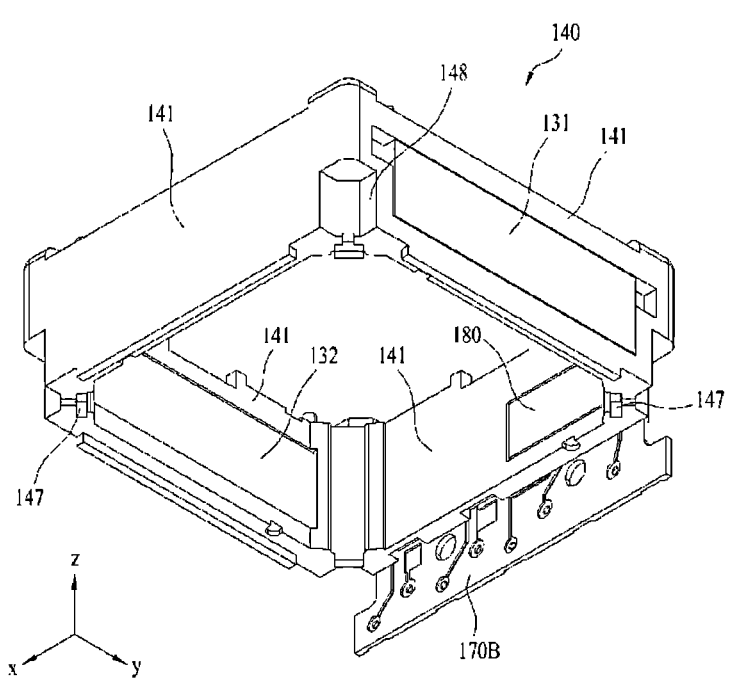
FIG. 25 is a schematic bottom perspective view of the driving magnet, the housing member and the first circuit board according to still another embodiment.
Figure 26:
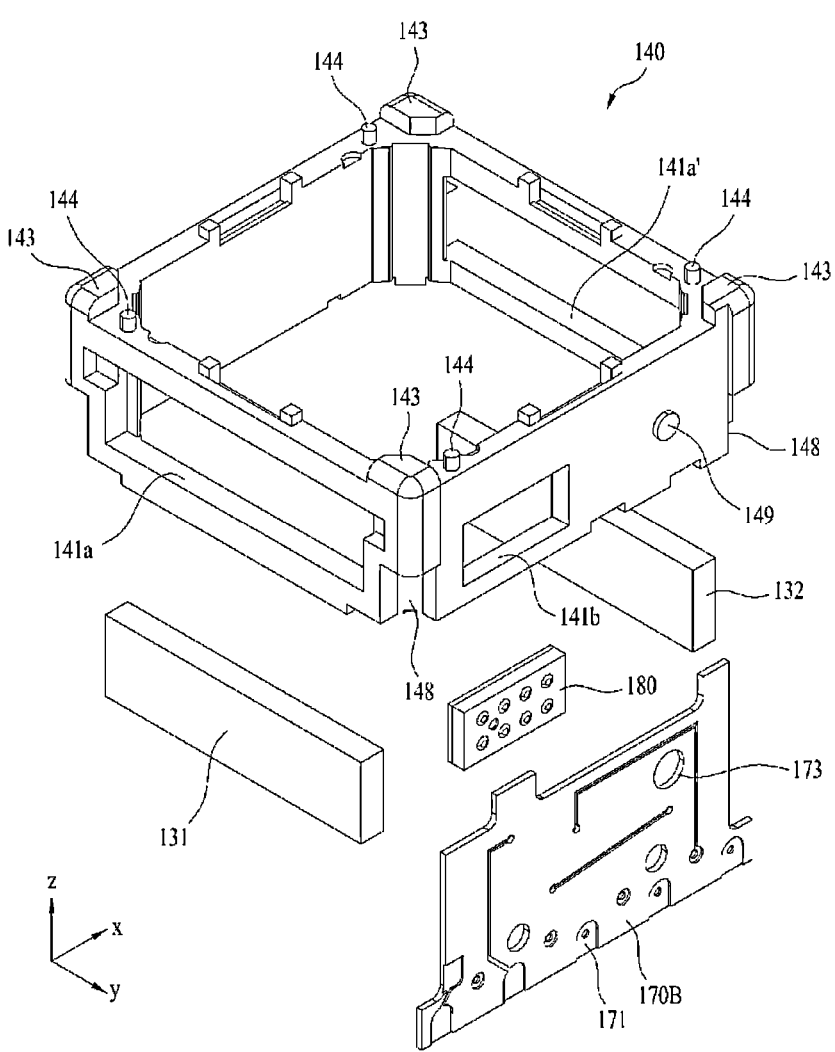
FIG. 26 is a schematic exploded perspective view of the driving magnet, the housing member, the first circuit board and the displacement sensing part according to still another embodiment.
Figure 27:
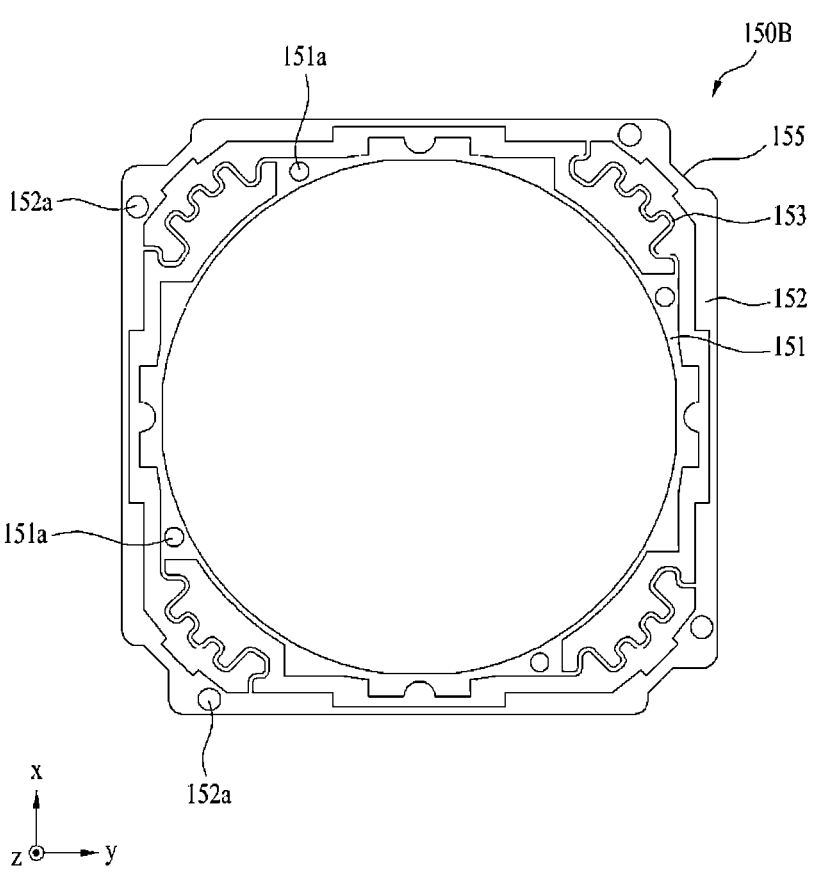
FIG. 27 is a schematic plan view of an upper elastic member according to another embodiment.
Figure 28:
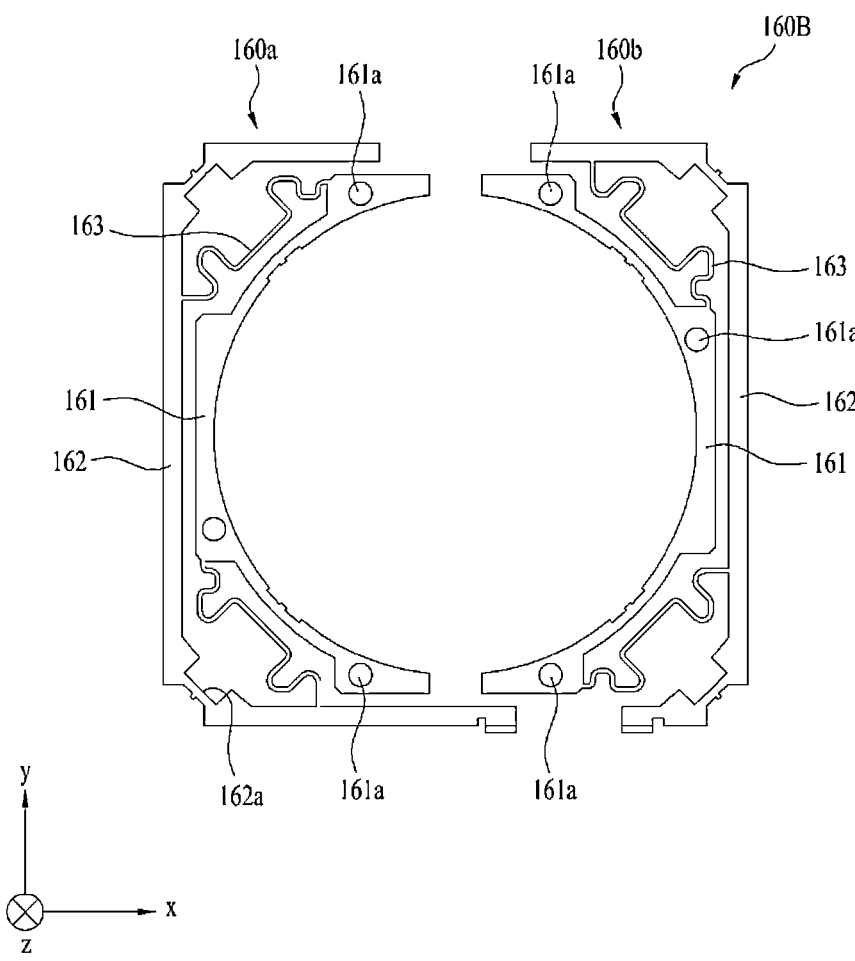
FIG. 28 is a schematic plan view of a lower elastic member according to another embodiment.

FIG. 19 is a schematic perspective view of a lens driving device 3000 according to a $3^{rd}$ embodiment, FIG. 20 is a schematic exploded perspective view of the lens driving device 3000 depicted in FIG. 19, FIG. 21 is a schematic perspective view of the lens driving device 3000 in FIG. 19, from which the cover member (or the cover can) 102 is removed, FIG. 22 is a schematic plan view of FIG. 21, FIG. 23 is a schematic perspective view of the driving magnet 130, the housing member (or the housing) 140 and the displacement sensing part 180 according to still another embodiment, FIG. 24 is a schematic perspective view of the driving magnet 180, the housing member 140 and the first circuit board 170B when viewed from a different angle from FIG. 23, FIG. 25 is a schematic bottom perspective view of the driving magnet 130, the housing member 140 and the first circuit board 170B according to still another embodiment, FIG. 26 is a schematic exploded perspective view of the driving magnet 130, the housing member 140, the first circuit board 170B and the displacement sensing part 180 according to still another embodiment, FIG. 27 is a schematic plan view of the upper elastic member 150B according to another embodiment, and FIG. 28 is a schematic plan view of the lower elastic member 160B according to another embodiment.

Similar to the lens driving device 2000 according to the $2^{nd}$ embodiment, the lens driving device 3000 according to the $3^{rd}$ embodiment is a device that performs an auto-focusing function.

As illustrated in FIGS. 19 to 22, the lens driving device 3000 according to the $3^{rd}$ embodiment may include a cover member 102, a bobbin 110B, a first coil 120, a driving magnet 130, a housing member 140, an upper elastic member 150B, a lower elastic member 160B, a first circuit board (or a printed circuit board) 170B, a sensing unit for detecting the amount of displacement of the bobbin 110B in the optical axis direction (that is, the first direction), and a base 190. Further, the sensing unit may include a displacement sensing part (or a position sensor) 180 and a sensing magnet 182B. Here, since the cover member 102, the bobbin 110B, the first coil 120, the driving magnet 130, the housing member 140, the upper elastic member 150B, the lower elastic member 160B, the first circuit board 170B, the displacement sensing part 180, the sensing magnet 182B and the base 190 respectively correspond to and perform the same functions as the cover can 102, the bobbin 110A, the first coil 120, the driving magnet 130, the housing member 140, the upper elastic member 150A, the lower elastic member 160A, the first circuit board 170A, the displacement sensing part 180, the sensing magnet 182B and the base 190 of the lens driving device 2000 according to the $2^{nd}$ embodiment, the same components are denoted by the same reference numerals, duplicated descriptions will be omitted, and only the differences will be explained.

As can be seen by comparing FIG. 13 and FIG. 27, the upper elastic member 150B is the same as the upper elastic member 150A except for the difference in the number of the second through holes 151a formed in the inner frame 151.

Further, in the case of the lower elastic member 160A depicted in FIG. 14, the inner frames 161 of the first and second lower elastic members 160a and 160b, which are electrically divided into two parts, may be connected to each other by a member 165 having electrical insulation properties. Alternatively, the member 165 may be omitted in order to spatially separate the first and second lower elastic members 160a and 160b from each other. Therefore, when the first and second lower elastic members 160a and 160b are formed of a conductive material, the first and second lower elastic members 160a and 160b may be electrically separated from each other. Meanwhile, in the case of the lower elastic member 160B depicted in FIG. 28, the inner frames 161 of the first and second lower elastic members 160a and 160b, which are electrically divided into two parts, are separated from each other. Except for this, the lower elastic member 160B is the same as the lower elastic member 160A.

Further, as can be seen by comparing FIG. 9 and FIG. 21, the first circuit board 170B is the same as the first circuit board 170A except for the difference in the position and connection configuration of the pins 172, but the embodiment is not limited to this particular position and connection configuration of the pins 172. That is, unlike FIGS. 9 and 21, the position and connection configuration of the pins 172 may vary.

Further, while the sensing magnet 182A depicted in FIG. 17 has a two-divided structure that is divided up and down, the sensing magnet 182B depicted in FIG. 20 has a unitary structure. Except for this, the sensing magnet 182B is the same as the sensing magnet 182A.

Figure 29:
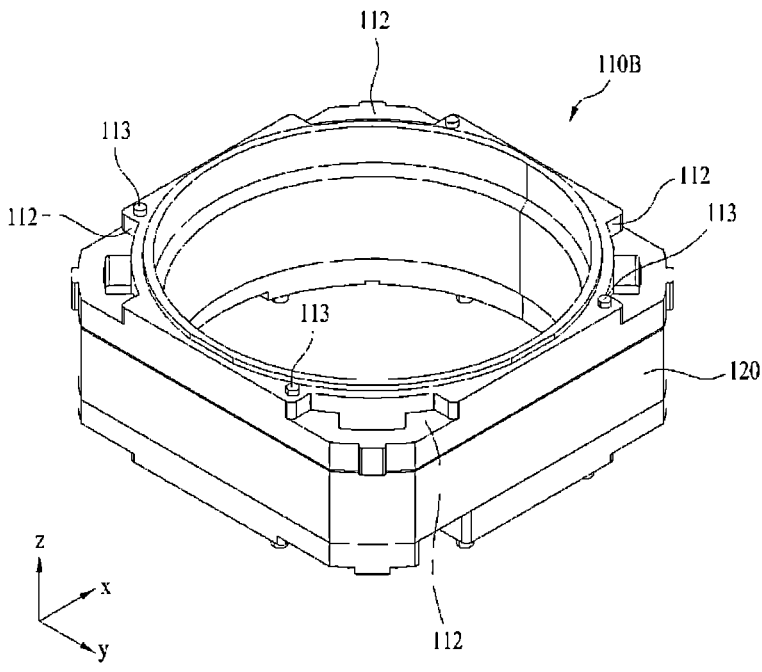
FIG. 29 is a schematic perspective view of a bobbin according to still another embodiment.
Figure 30:
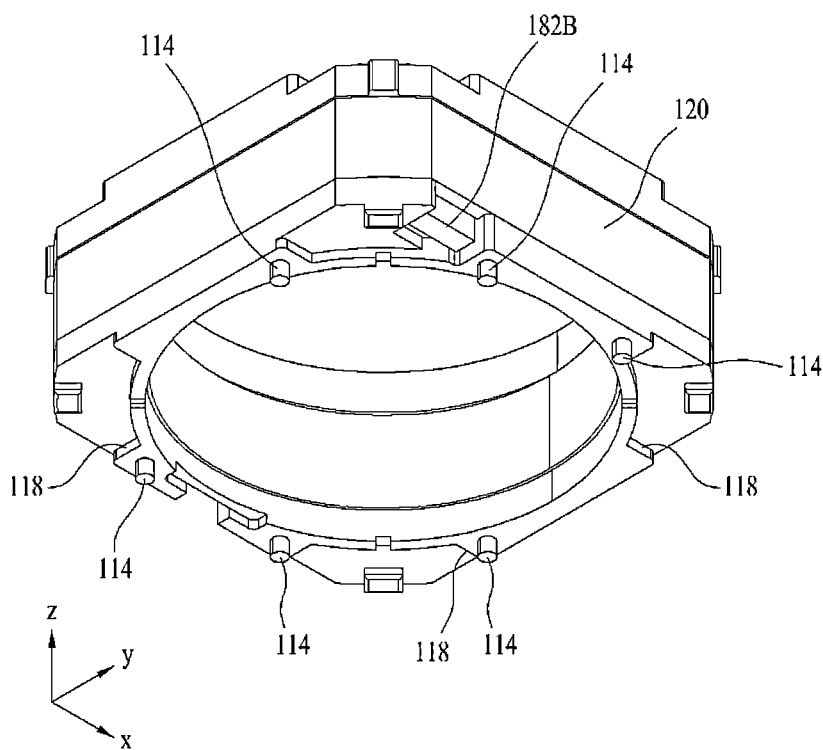
FIG. 30 is a schematic bottom perspective view of the bobbin and a sensing magnet according to still another embodiment.
Figure 31:
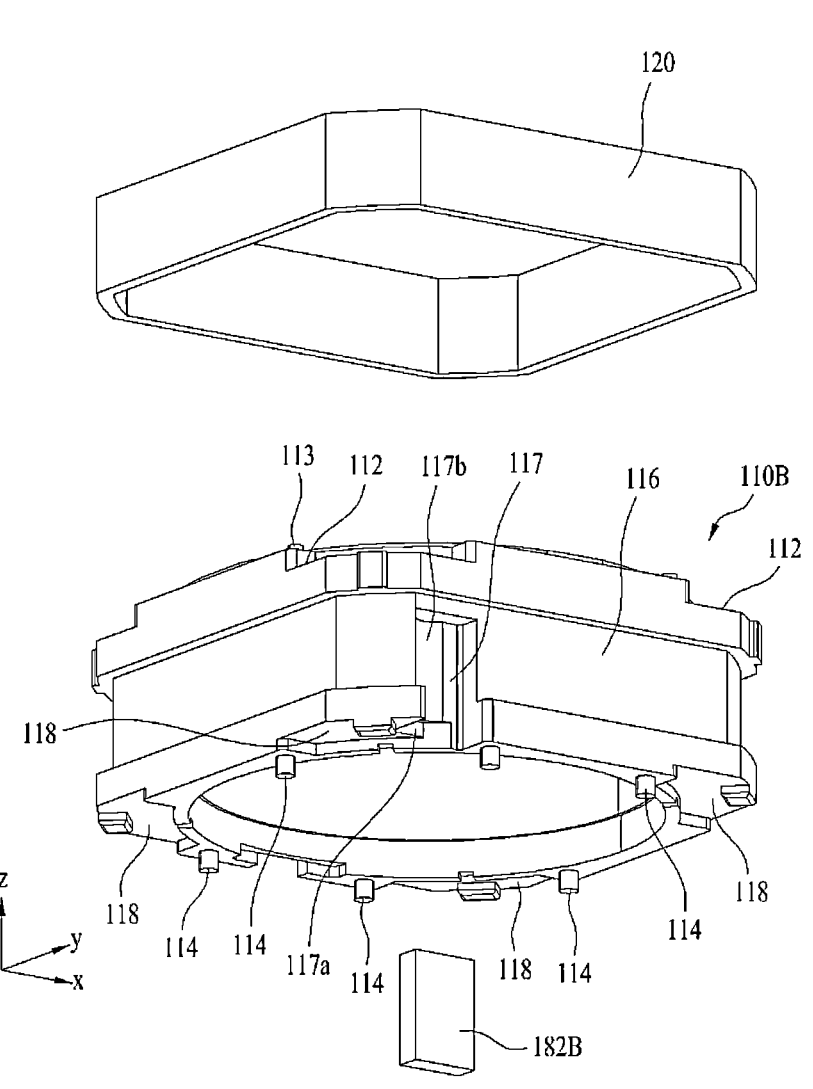
FIG. 31 is a schematic exploded perspective view of the bobbin, a first coil and the sensing magnet according to still another embodiment.
Figure 32:
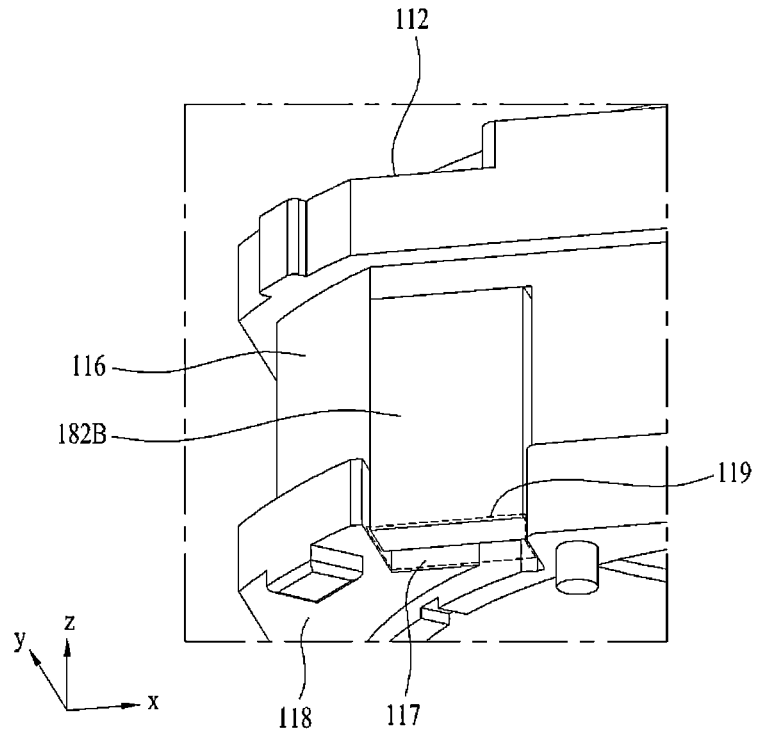
FIG. 32 is a partially enlarged perspective view of the state in which the bobbin and the sensing magnet according to the embodiment are coupled.
Figure 33:
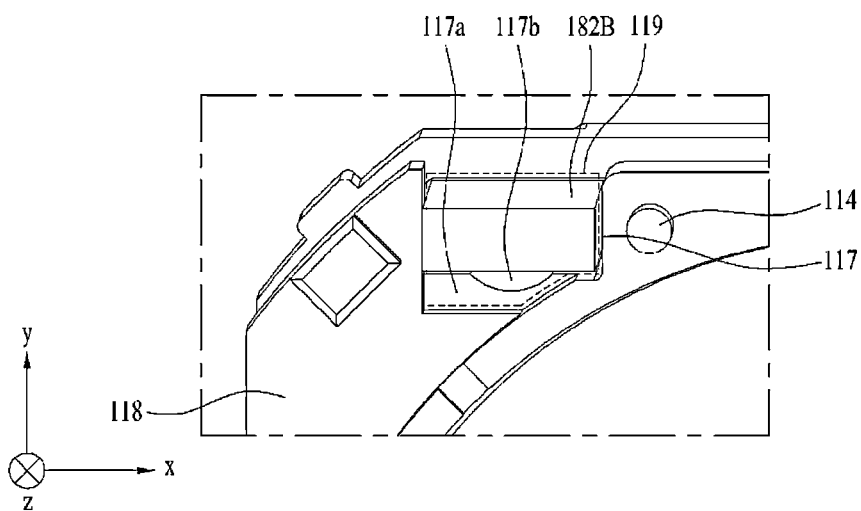
FIG. 33 is a partially enlarged bottom view of the state in which the bobbin and the sensing magnet according to the embodiment are coupled.
Figure 34:
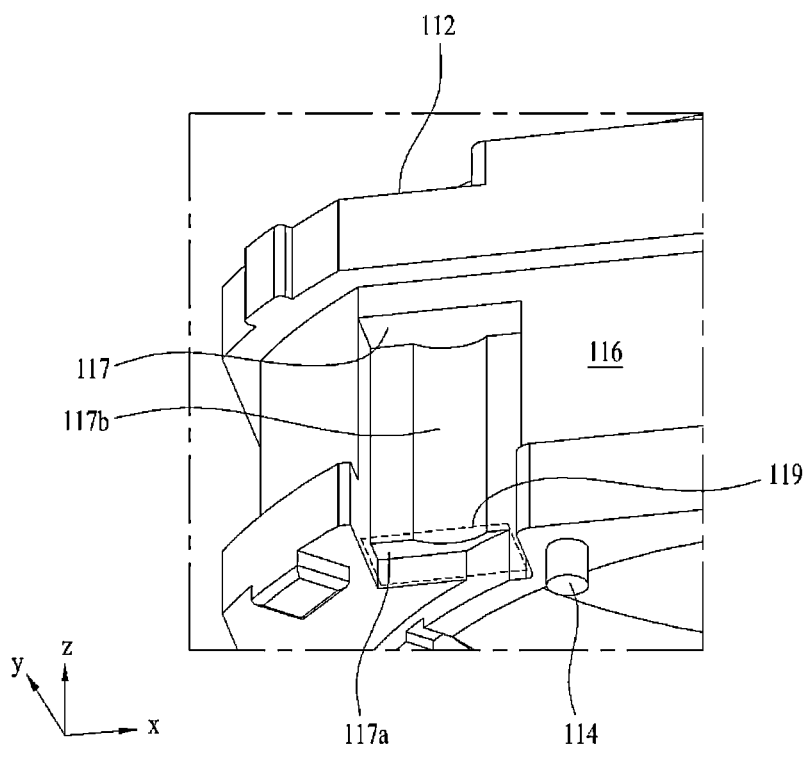
FIG. 34 is a partially enlarged perspective view for explaining an accommodation recess of the bobbin according to the embodiment.
Figure 35:
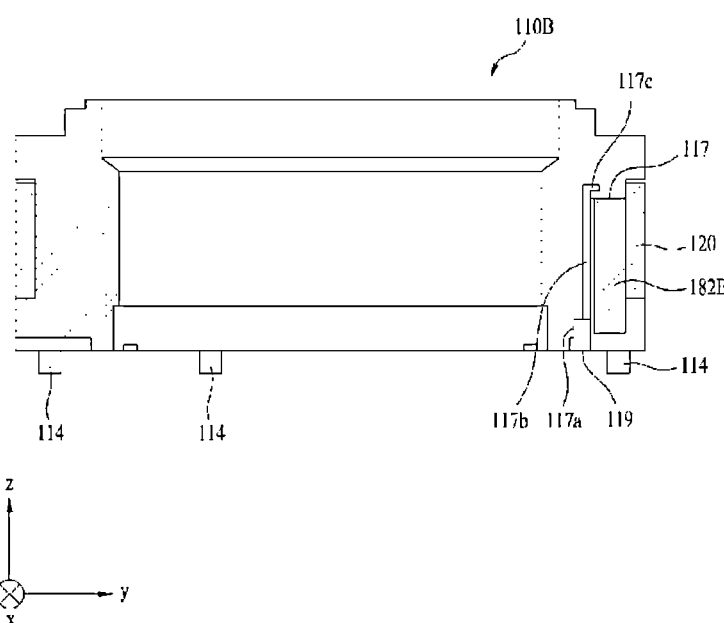
FIG. 35 is a schematic longitudinal sectional view of the bobbin, the first coil and the sensing magnet according to still another embodiment.

FIG. 29 is a schematic perspective view of the bobbin 110B according to still another embodiment, FIG. 30 is a schematic bottom perspective view of the bobbin 110B and the sensing magnet 182B according to still another embodiment, FIG. 31 is a schematic exploded perspective view of the bobbin 110B, the first coil 120 and the sensing magnet 182B according to still another embodiment, FIG. 32 is a partially enlarged perspective view of the state in which the bobbin 110B and the sensing magnet 182B are coupled, FIG. 33 is a partially enlarged bottom view of the state in which the bobbin 110B and the sensing magnet 182B are coupled, FIG. 34 is a partially enlarged perspective view for explaining the accommodation recess 117 in the bobbin 110B according to the embodiment, and FIG. 35 is a schematic longitudinal sectional view of the bobbin 110B, the first coil 120 and the sensing magnet 182B according to still another embodiment.

As can be seen by comparing FIGS. 15 and 16 and FIGS. 29 and 30, the bobbin 110B is the same as the bobbin 110A except for the difference in the shape of a portion of the upper structure. Further, the above explanation of the configuration in which the lens barrel (not illustrated) is coupled to the bobbin 110A may also be applied to the configuration in which the lens barrel (not illustrated) is coupled to the bobbin 110B.

Further, FIGS. 31 to 35 show the accommodation recess 117, which is illustrated in FIGS. 15 to 18, in more detail.

Hereinafter, the accommodation recess 117 will be explained in more detail with reference to FIGS. 31 to 35. Since the above explanation of the accommodation recess 117 and the adhesion recess 117b, which are illustrated in FIGS. 15 to 18, can be applied to FIGS. 31 to 35, duplicated explanations will be omitted. Although the bobbin 110B will now be explained with reference to FIGS. 31 to 35, the following explanation of FIGS. 31 and 35 may, of course, be applied to the bobbin 110A.

The accommodation recess 117 may include an opening 119, which is formed in one of the bottom surface and the top surface of the bobbin 110B and communicates with the accommodation recess 117. For example, as illustrated in FIG. 35, a portion of the bottom surface of the bobbin 110B is open to form the opening 119, and the opening 119 may define an entrance of the accommodation recess 117. The sensing magnet 182B may be inserted into, disposed in, or secured to the accommodation recess through the opening 119, and may be removed from the accommodation recess through the opening 119.

The adhesion recess 117b may preferably extend from the opening 119 to the inner surface of the bobbin 110B, on which one surface of the sensing magnet 182B is positioned in a contacting, seating or disposing manner.

As illustrated in FIG. 35, the accommodation recess 117 may further include a first additional recess 117c. The first additional recess 117c is formed to be concave and deeper than the inner surface of the bobbin 110B, on which one surface of the sensing magnet 182B is positioned in a contacting, seating or disposing manner, and is a portion that extends from the adhesion recess 117b. The overall length of the adhesion recess 117b and the first additional recess 117c is longer than the length of the sensing magnet 182B in the vertical thickness direction of the bobbin 110B (for example, the z-axis direction). Due to the first additional recess 117c, when an adhesive is injected into the adhesion recess 117b through the opening 119, the adhesive sequentially fills the first additional recess 117c and the adhesion recess 117b. Therefore, the adhesive is inhibited from overflowing out of the adhesion recess 117b and flowing to the first coil 120 along a gap between the sensing magnet 182B and the accommodation recess 117. As a result, a defective proportion of the lens driving devices 2000 and 3000 in the process of coupling the sensing magnet 182B may be decreased.

Also, the accommodation recess 117 may further include a second additional recess 117a. The second additional recess 117a may be formed to a predetermined depth in the inward direction toward the center of the bobbin 110B from the opening 119, and may extend from the adhesion recess 117b. That is, the second additional recess 117a may be a portion that is formed near the opening 119 to be deeper than the inner surface in the inward direction toward the center of the bobbin 110B. The second additional recess 117a communicates with the adhesion recess 117b. That is, as described above, the second additional recess 117a is an extending portion of the adhesion recess 117b. As such, due to the provision of the second additional recess 117a, an adhesive is injected into the adhesion recess 117b via the second additional recess 117a, and consequently, the adhesive is inhibited from overflowing near the opening 119 and adhering to other components, such as the first coil 120, of the bobbin 110B. As a result, a defective proportion of the lens driving devices 2000 and 3000 in the process of coupling the sensing magnet 182B may be decreased.

Further, in a modified embodiment, only the second additional recess 117a, without the adhesion recess 117b, may be formed in the bobbin 110B. In this case, the bobbin 110B and the sensing magnet 182B may be coupled and secured to each other by injecting an adhesive into the second additional recess 117a.

Alternatively, at least one of the first additional recess 117c or the second additional recess 117a may be disposed to extend from the adhesion recess 117b. That is, only the first additional recess 117c may be formed to extend from the adhesion recess 117b, or only the second additional recess 117a may be formed to extend from the adhesion recess 117b. As such, the accommodation recess 117 of the bobbin 110B may include at least one of the adhesion recess 117b, the first additional recess 117c, or the second additional recess 117a.

In an additional embodiment, although not illustrated, the bobbin 110B may further include an additional accommodation recess 117, which is formed in the outer peripheral surface of the bobbin 110B at a position symmetrical to the accommodation recess 117 about the center of the bobbin 110B, that is, a position opposite the position on the outer peripheral surface at which the accommodation recess 117 is formed, and a weight-balancing member, which is accommodated in the additional accommodation recess 117.

That is, the additional accommodation recess 117 may be formed to a predetermined depth in the inward direction of the bobbin 110B at a position, at which the additional accommodation recess 117 and the accommodation recess 117 are arranged in a straight line in a symmetrical manner about the center of the bobbin 110B, on the outer peripheral surface that is opposite the position on the outer peripheral surface at which the accommodation recess 117 is formed. The weight-balancing member may be secured and coupled to the inside of the additional accommodation recess 117, and may have the same weight as the magnetic force sensing member (for example, the sensing magnet 182B). Due to the additional accommodation recess 117 and the weight-balancing member, weight imbalance in the horizontal direction of the bobbin 110B attributable to the accommodation recess 117 and the sensing magnet 182B may be compensated for.

Also, the additional accommodation recess 117 may include at least one of an adhesion recess 117b, a first additional recess 117c, or a second additional recess 117a.

The above-described lens driving device 2000 or 3000 according to the $2^{nd}$ or $3^{rd}$ embodiment is capable of generating feedback on the amount of displacement in the optical axis direction of the lens and of readjusting the position of the lens in the optical axis direction, thereby shortening the time taken for focal alignment of the lens.

Further, the above-described lens driving device 2000 or 3000 according to the $2^{nd}$ or $3^{rd}$ embodiment is capable of minimizing the distance between the sensing magnet 182A or 182B, which is assembled with the bobbin 110A or 110B, which is a movable body, in a mounting, inserting, seating, contacting, coupling, securing, provisional securing, supporting or disposing manner and the displacement sensing part 180, which is provided in the housing member 140, which is a fixed body, and consequently of more accurately detecting the amount of displacement in the optical axis direction of the lens, thereby more accurately positioning the lens at the focal distance of the lens.

Further, since the sensing magnet 182A or 182B is positioned in the bobbin 110A or 110B in a mounting, inserting, seating, contacting, coupling, securing, provisional securing, supporting or disposing manner and the displacement sensing part 180 is provided in the housing member 140, the lens driving device 2000 or 3000 according to the $2^{nd}$ or $3^{rd}$ embodiment does not need additional space for mounting the sensing unit, thereby improving space efficiency of the camera module (particularly, the bobbin).

Furthermore, the camera module may be constituted such that the lens is coupled to the lens driving device 2000 or 3000 according to the $2^{nd}$ or $3^{rd}$ embodiment and the image sensor and the second circuit board (or the printed circuit board), on which the image sensor is disposed, are further disposed at the bottom portion of the lens driving device, and the base 190 of the lens driving device 2000 or 3000 and the second circuit board, on which the image sensor is disposed, may be coupled to each other.

$4^{th}$ Embodiment

Hereinafter, the constitution and operation of lens driving devices 200A to 200F according to a $4^{th}$ embodiment will be explained with reference to the attached drawings.

Figure 36:
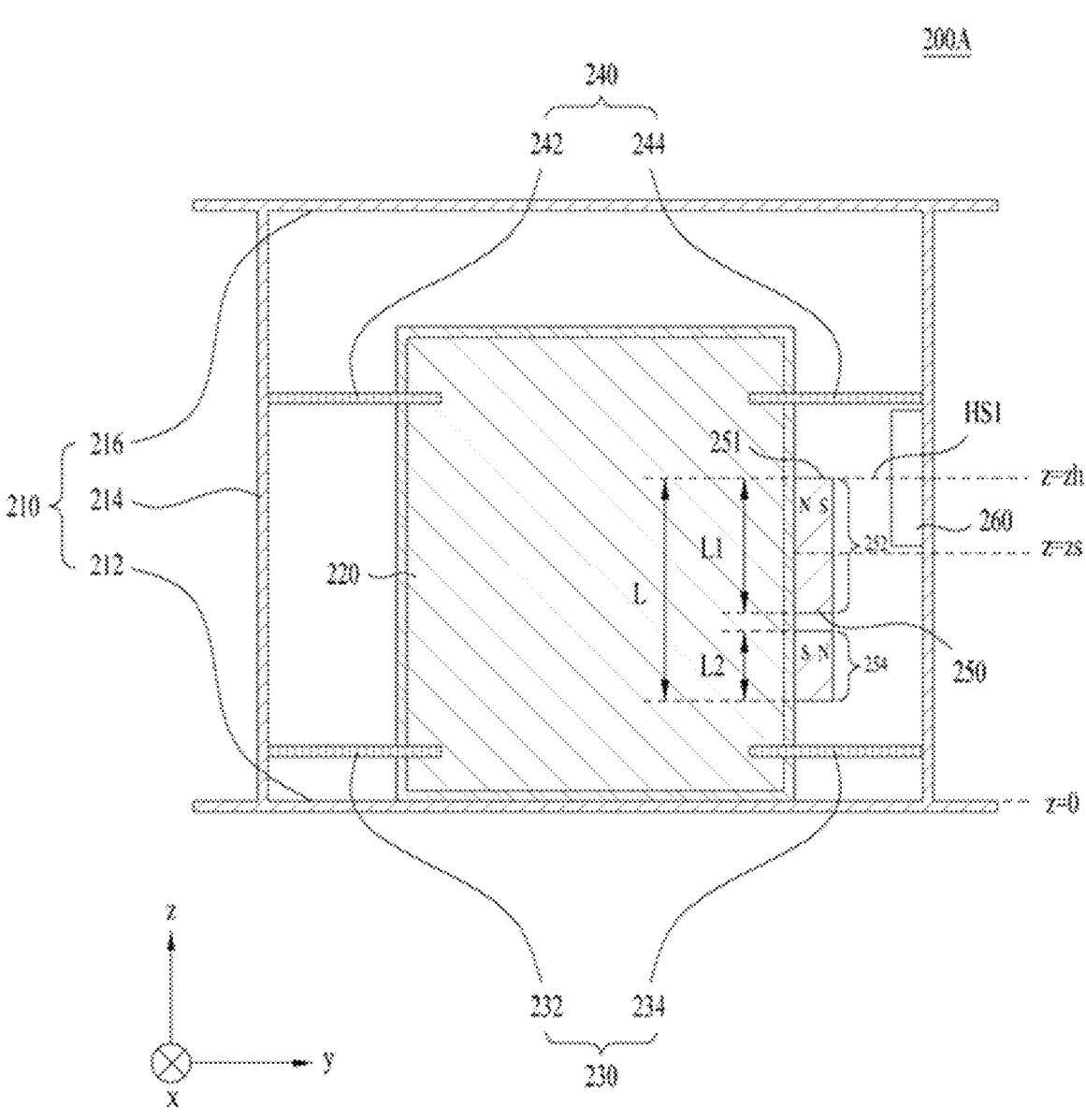
FIG. 36 shows a schematic sectional view of a lens driving device according to a 4-1st embodiment.

FIG. 36 shows a schematic sectional view of a lens driving device 200A according to a $4\text{-}1^{st}$ embodiment.

The lens driving device 200A depicted in FIG. 36 may include a fixed unit 210, a movable unit 220, lower and upper springs 230 and 240, a bipolar-magnetized magnet (or a 2-pole-magnetized magnet) 250, and a position sensor 260 (or a position detection sensor or a driver including a position detection sensor).

The fixed unit 210 may include a lower portion 212, a side portion 214, and an upper portion 216. When the movable unit 220 of the lens driving device 200A is moved in one direction on the optical axis, the movable unit 220, which is initially in a stationary state, may be supported by the lower portion 212 of the fixed unit 210, or may be supported at a position spaced a predetermined distance apart from the lower portion 212 of the fixed unit 210 by the upper and/or lower springs 240 and 230.

The side portion 214 of the fixed unit 210 may function to support the lower spring 230 and the upper spring 240, or alternatively, the lower portion 212 and/or the upper portion 216 of the fixed unit 210 may support the lower spring 230 and/or the upper spring 240. For example, the fixed unit 210 may correspond to the housing member 40 or 140, which supports the driving magnet 41 or 130, to the yoke, to the cover can 60 or 102, or to the base 20 or 190 in the above-described $1^{st}$, $2^{nd}$ or $3^{rd}$ lens driving device 1000-1, 2000 or 3000.

At least one lens (not illustrated) may be mounted to the movable unit 220. For example, the movable unit 220 may correspond to the bobbin 30, 110A or 110B in the above-described $1^{st}$, $2^{nd}$ or $3^{rd}$ lens driving device 1000-1, 2000 or 3000, but the embodiment is not limited thereto.

Although not illustrated, the lens driving device 200A may further include a first coil and a driving magnet. The first coil and the driving magnet, which are included in the lens driving device 200A, are arranged to face each other, and interact with each other so as to move the movable unit 220 in the z-axis direction, which is the optical axis direction of the lens.

For example, the first coil and the driving magnet may respectively correspond to the first coil 31 or 120 and the driving magnet 41 or 130 in the above-described $1^{st}$, $2^{nd}$ or $3^{rd}$ lens driving device 1000-1, 2000 or 3000, but the embodiment is not limited thereto.

Although it is illustrated in FIG. 36 that the movable unit 220 is capable of moving in one direction of the optical axis (that is, the +z-axis direction), the movable unit 220 according to another embodiment may move in both directions of the optical axis (that is, the +z-axis direction or the −z-axis direction), which will be described later.

On the other hand, the position sensor 260 may detect a first displacement value of the movable unit 220 in the z-axis direction, which is the optical axis direction. The position sensor 260 may sense the magnetic field of the bipolar-magnetized magnet 250, and may output voltage having a level that is proportional to the intensity of the sensed magnetic field.

In order to allow the position sensor 260 to detect the magnetic field, the intensity of which changes linearly, the bipolar-magnetized magnet 250 may be arranged to face the position sensor 260 in the y-axis direction, which is the magnetization direction perpendicular to the optical axis direction.

For example, the position sensor 260 may correspond to the displacement sensing part 82 or 180 in the above-described $1^{st}$, $2^{nd}$ or $3^{rd}$ lens driving device 1000-1, 2000 or 3000, and the bipolar-magnetized magnet 250 may correspond to the sensing magnet 70, 182A or 182B in the above-described $1^{st}$, $2^{nd}$ or $3^{rd}$ lens driving device 1000-1, 2000 or 3000, but the embodiment is not limited thereto. The bipolar-magnetized magnet 250 may be generally classified into ferrite, alnico, and rare earth magnets, and may also be classified into a P-type and an F-type according to a magnetic circuit configuration. However, the embodiment is not limited to this classification of the bipolar-magnetized magnet 250.

According to the embodiment, the bipolar-magnetized magnet 250 may include side surfaces that face the position sensor 260. Here, the side surfaces may include a first side surface 252 and a second side surface 254. The first side surface 252 may be a surface having a first polarity, and the second side surface 254 may be a surface having a second polarity, which is opposite the first polarity. The second side surface 254 may be arranged to be spaced apart from or in contact with the first side surface 252 in the z-axis direction, which is parallel to the optical axis direction. At this time, a first length L1 of the first side surface 252 in the optical axis direction may be equal to or longer than a second length L2 of the second side surface 254 in the optical axis direction. Further, in the bipolar-magnetized magnet 250, a first magnetic flux density of the first side surface 252 having the first polarity may be larger than a second magnetic flux density of the second side surface 254 having the second polarity.

The first polarity may be an S-pole and the second polarity may be an N-Pole, or, conversely, the first polarity may be an N-pole and the second polarity may be an S-pole.

Figure 37A:
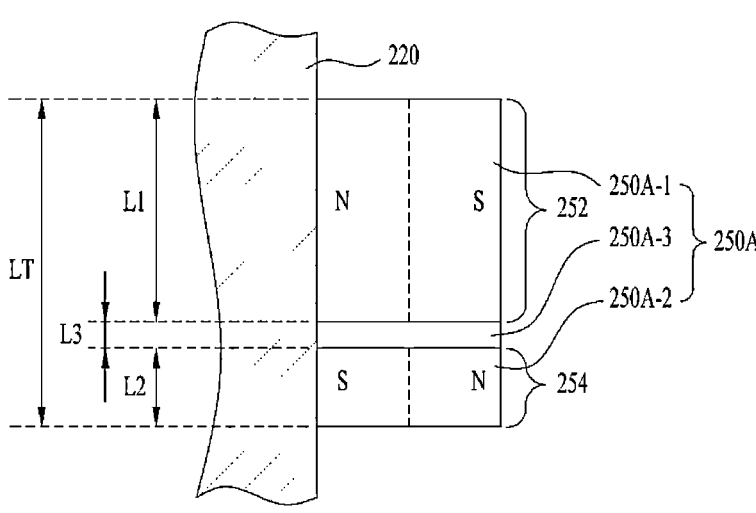
FIGS. 37a and 37b respectively show sectional views of embodiments of a bipolar-magnetized magnet depicted in FIG. 36.
Figure 37A:
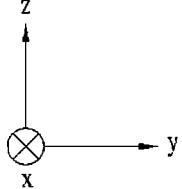
Figure 37B:
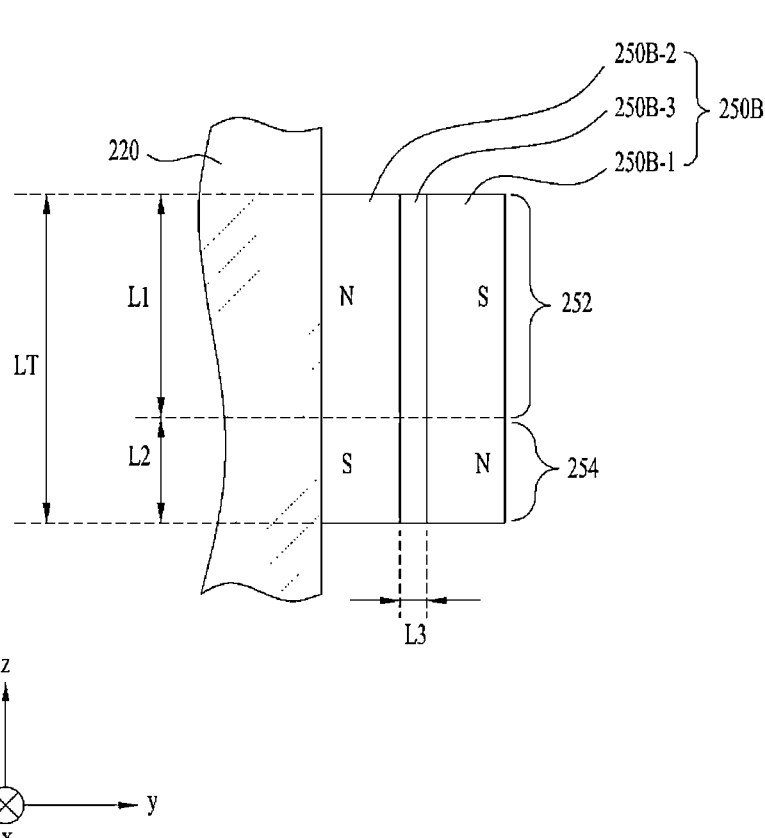

FIGS. 37a and 37b respectively show sectional views of embodiments 250A and 250B of the bipolar-magnetized magnet 250 depicted in FIG. 36.

Referring to FIG. 37a, the bipolar-magnetized magnet 250A may include first and second sensing magnets 250A-1 and 250A-2, and may further include a non-magnetic partition wall 250A-3. Referring to FIG. 37b, the bipolar-magnetized magnet 250B may include first and second sensing magnets 250B-1 and 250B-2, and may further include a non-magnetic partition wall 250B-3.

The first and second sensing magnets 250A-1 and 250A-2 illustrated in FIG. 37a may be arranged to be spaced apart from or in contact with each other, and the first and second sensing magnets 250B-1 and 250B-2 illustrated in FIG. 37b may be arranged to be spaced apart from or in contact with each other.

According to one embodiment, as illustrated in FIG. 37a, the first and second sensing magnets 250A-1 and 250A-2 may be arranged to be spaced apart from or in contact with each other in the direction parallel to the optical axis direction (that is, the z-axis direction).

Alternatively, according to another embodiment, as illustrated in FIG. 37b, the first and second sensing magnets 250B-1 and 250B-2 may be arranged to be spaced apart from or in contact with each other in the magnetization direction (that is, the y-axis direction).

The bipolar-magnetized magnet 250 in FIG. 36 is illustrated as being a magnet having the structure depicted in FIG. 37a, but may be replaced by a magnet having the structure depicted in FIG. 37b.

The non-magnetic partition wall 250A-3 illustrated in FIG. 37a may be disposed between the first and second sensing magnets 250A-1 and 250A-2, and the non-magnetic partition wall 250B-3 illustrated in FIG. 37b may be disposed between the first and second sensing magnets 250B-1 and 250B-2. The non-magnetic partition wall 250A-3 or 250B-3 may be an element that does not actually have magnetic properties, and may include a section having no polarity, which may contain air or a non-magnetic material.

Further, a third length L3 of the non-magnetic partition wall 250A-3 or 250B-3 may be five percent or more or fifty percent or less of the overall length LT of the bipolar-magnetized magnet 250A or 250B in the direction parallel to the optical axis direction.

Figure 38:
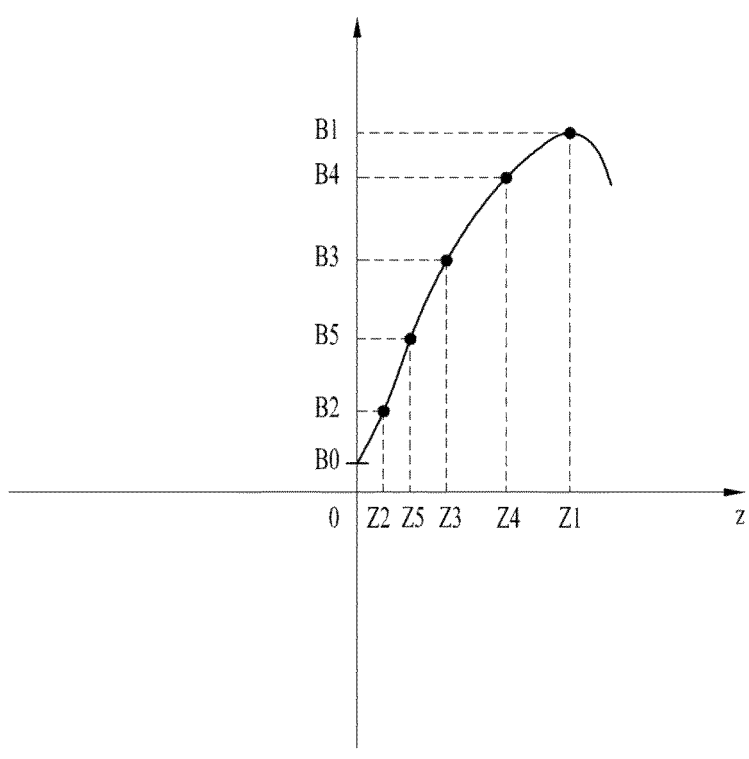
FIG. 38 is a graph for explaining the operation of the lens driving device depicted in FIG. 36.

FIG. 38 is a graph for explaining the operation of the lens driving device 200A depicted in FIG. 36, in which the horizontal axis may represent the distance that the movable unit 220 moves in the optical axis direction or in the z-axis direction, which is a direction parallel to the optical axis direction, and the vertical axis may represent the magnetic field that is sensed by the position sensor 260 or the output voltage that is output from the position sensor 260. The position sensor 260 may output a voltage having a level that is proportional to the intensity of the magnetic field.

As illustrated in FIG. 36, in the initial state, before the lens is moved in the optical axis direction, that is, in the state in which the movable unit 220 equipped with the lens is stationary, rather than moving, the height (z=zh) at which the middle of the position sensor 260 is positioned may be located in an imaginary horizontal plane HS1, which extends from the top 251 of the first side surface 252 in the y-axis direction, which is the magnetization direction, or may be located at a position higher than the imaginary horizontal plane HS1. In this case, referring to FIG. 38, the intensity of the magnetic field, which may be sensed by the position sensor 260, may be very close to '0' but a value B0 which is not '0'. In this initial state, the movable unit 220, which is equipped with a lens and is movable in one direction, that is, only in the +z-axis direction, is located at a lower limit position.

Figure 39:
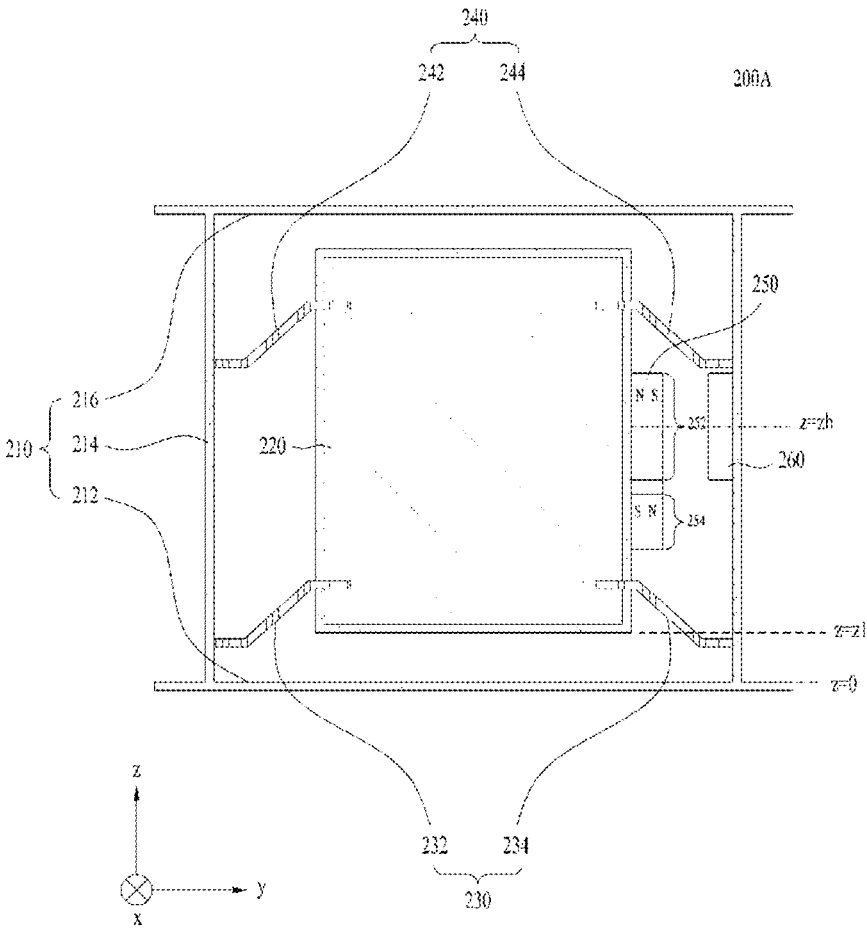
FIG. 39 shows the state in which the lens driving device depicted in FIG. 36 is moved in an optical axis direction.

FIG. 39 shows the state in which the lens driving device 200A depicted in FIG. 36 is moved in the optical axis direction.

Figure 40:
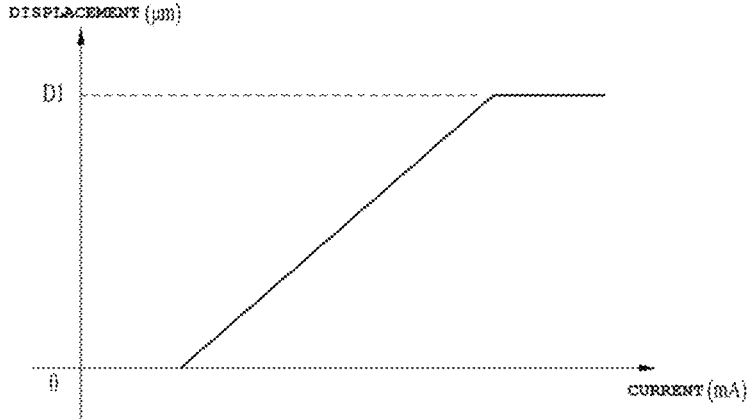
FIG. 40 is a graph showing the displacement of a movable unit depending on electric current supplied to a first coil in the lens driving device according to the $4^{th}$ embodiment.

FIG. 40 is a graph showing the displacement of the movable unit 220 depending on electric current supplied to the first coil in the lens driving device according to the $4^{th}$ embodiment, in which a horizontal axis represents the current supplied to the first coil, and a vertical axis represents the displacement.

Referring to the above-described drawings, if the intensity of the current supplied to the first coil is increased, as illustrated in FIG. 39, the movable unit 220 may be lifted to a predetermined distance (z=z1) in the +z-axis direction. In this case, referring to FIG. 38, the intensity of the magnetic field, which is sensed by the position sensor 260, may be a value B1.

Subsequently, if the intensity of the current supplied to the first coil is decreased or the supply of current to the first coil is interrupted, as illustrated in FIG. 36, the movable unit 220 may drop to its initial position. In order for the movable unit 220 to be lifted from the position shown in FIG. 36 to the position shown in FIG. 39, the electric force of the movable unit 220 should be greater than the spring force (mechanical force) of the lower and upper springs 230 and 240.

Also, in order for the movable unit 220 to return from the upper limit position shown in FIG. 39 to the initial position shown in FIG. 36, the electric force should be equal to or less than the spring force of the lower and upper springs 230 and 240. That is, after the movable unit 220 has been lifted in the +z-axis direction, the movable unit 220 may return to the original position due to the restoring force of the lower and upper springs 230 and 240.

Here, the lower spring 230 may include first and second lower springs 232 and 234, and the upper spring 240 may include first and second upper springs 242 and 244. Here, although it is illustrated that the lower spring 230 is separately divided into two parts, namely the first and second lower springs 232 and 234, the embodiment is not limited thereto. That is, the first and second lower springs 232 and 234 may be integrally formed. Similarly, although the upper spring 240 is illustrated as being separately divided into two parts, namely the first and second upper springs 242 and 244, the embodiment is not limited thereto. That is, the first and second upper springs 242 and 244 may be integrally formed.

For example, the lower spring 230 may correspond to the lower elastic member 52, 160A or 160B in the above-described $1^{st}$, $2^{nd}$ or $3^{rd}$ lens driving device 1000-1, 2000 or 3000, and the upper spring 240 may correspond to the upper elastic member 51, 150A or 150B in the above-described $1^{st}$ $2^{nd}$ or $3^{rd}$ lens driving device 1000-1, 2000 or 3000, but the embodiment is not limited thereto.

As illustrated in FIGS. 36 and 39, when the height (z=zh) at which the middle of the position sensor 260 is positioned is biased toward any one of the first and second side surfaces 252 and 254, the magnetic field, which is sensed by the position sensor 260, has only one of the first and second polarities. Therefore, when the intensity of the magnetic field having the first or second polarity is changed linearly, the position sensor 260 is capable of sensing the magnetic field having the first or second polarity, which is changed linearly. It can be known from FIG. 38 that, while the first movable unit 220 is moved from the lower limit position shown in FIG. 36 to the upper limit position shown in FIG. 39, the intensity of the magnetic field, which is sensed by the position sensor 260, is changed linearly.

It can be known from FIGS. 38 and 40 that the maximum displacement D1 that the movable unit 220 in the lens driving device 200A illustrated in FIG. 36 is able to move is a value Z1.

Figure 41:
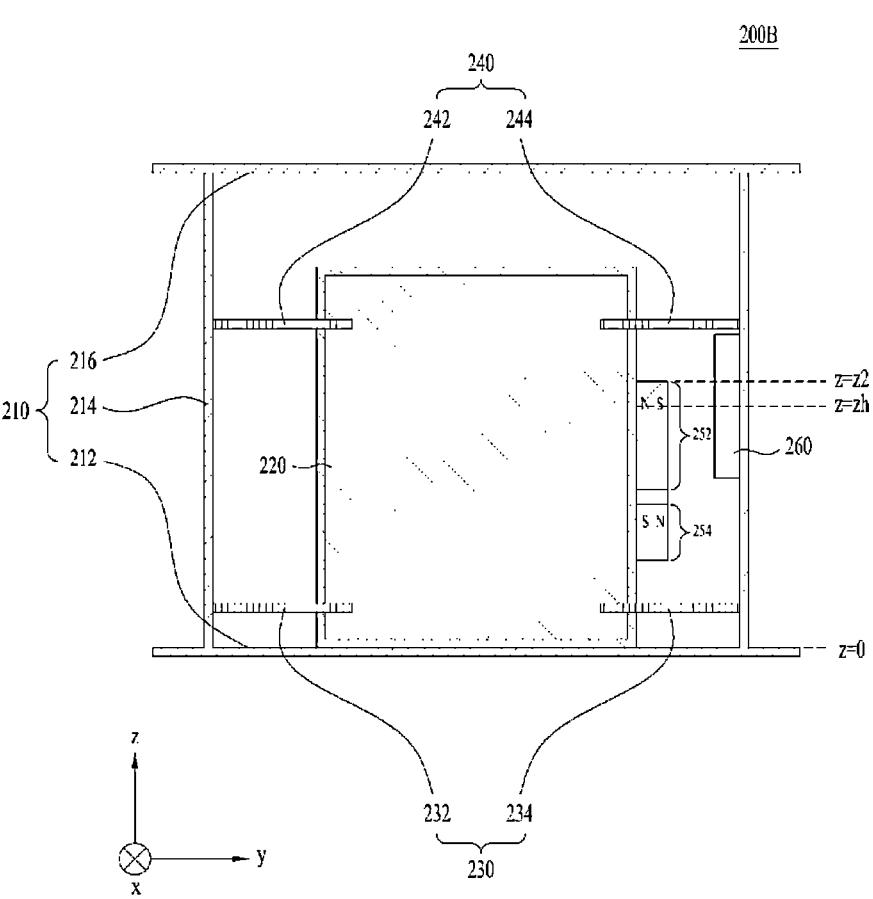
FIG. 41 shows a sectional view of a lens driving device according to a 4-$2^{nd}$ embodiment.

FIG. 41 shows a sectional view of a lens driving device 200B according to a 4-2$^{nd}$ embodiment.

Different from the lens driving device 200A illustrated in FIG. 36, the lens driving device 200B illustrated in FIG. 41 may be configured such that, in the initial state before the lens is moved in the optical axis direction, the height (z=zh) at which the middle of the position sensor 260 is positioned is aligned with a first point on the first side surface 252 in the y-axis direction, which is the magnetization direction. Here, the first point may be a certain point located between the top 251 and the bottom of the first side surface 252, for example, the height at which the middle of the first side surface 252 is positioned.

In the state before the movable unit 220 is moved, the bipolar-magnetized magnet 250 of the lens driving device 200B illustrated in FIG. 41 may be located at a higher position than the bipolar-magnetized magnet 250 of the lens driving device 200A illustrated in FIG. 36 by a distance (z2-zh). In this case, referring to FIG. 38, the minimum value of the magnetic field having the first polarity, which is sensed by the positon sensor 260, may be a value B2, which is larger than B0.

When current is applied to the first coil in the lens driving device 200B illustrated in FIG. 41, the movable unit 220 is capable of being lifted to the upper limit height (z1), like the lens driving device 200A illustrated in FIG. 39. At this time, the upper limit lifting height of the movable unit 220 may be changed by adjusting the elastic modulus of the lower spring 230 and the upper spring 240.

In the case of the lens driving device 200B illustrated in FIG. 41, as well as the lens driving device 200A illustrated in FIGS. 36 and 39, it can be known that the intensity of the magnetic field sensed by the position sensor 260 is changed linearly between B2 and B 1.

It can be known from FIG. 40 that the maximum displacement D1 that the movable unit 220 of the lens driving device 200B illustrated in FIG. 41 is able to move is z1-z2.

Figure 42:
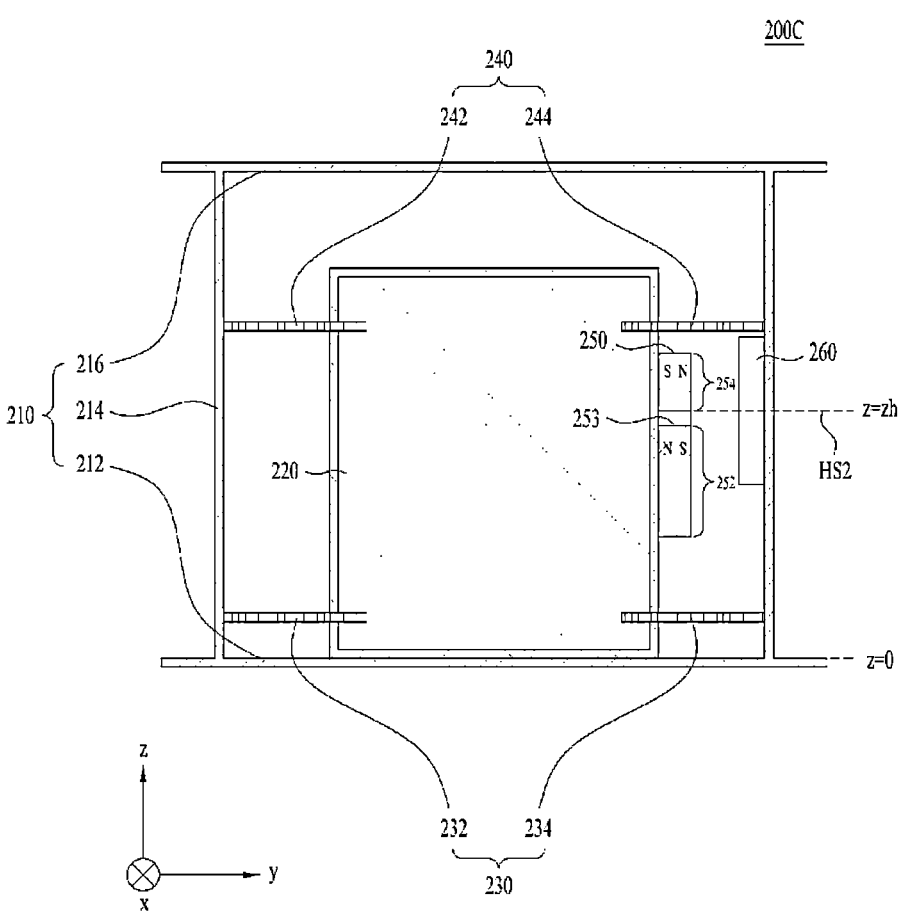
FIG. 42 shows a sectional view of a lens driving device according to a 4-$3^{rd}$ embodiment.

FIG. 42 shows a sectional view of a lens driving device 200C according to a 4-3$^{rd}$ embodiment.

In the case of the lens driving device 200A or 200B illustrated in FIG. 36, 39 or 41, the first side surface 252 is positioned above the second side surface 254. Conversely, in the lens driving device 200C illustrated in FIG. 42, the second side surface 254 may be positioned above the first side surface 252. Since the lens driving device 200C illustrated in FIG. 42 is the same as the lens driving device 200A or 200B illustrated in FIG. 36 or 41 except for the arrangement of the side surfaces of the bipolar-magnetized magnet 250, in which the longer second side surface 252 is positioned below the shorter first side surface 254, the same components are denoted by the same reference numerals, and duplicated descriptions will be omitted.

Figure 43A:
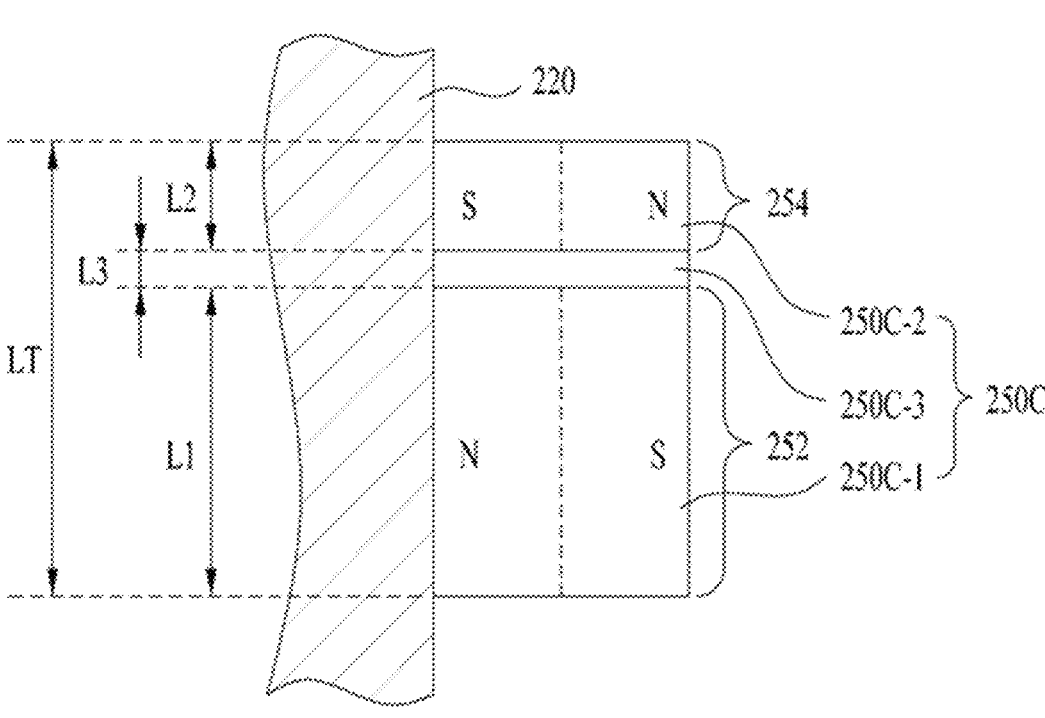
FIGS. 43a and 43b respectively show sectional views of embodiments of a bipolar-magnetized magnet depicted in FIG. 42.
Figure 43A:
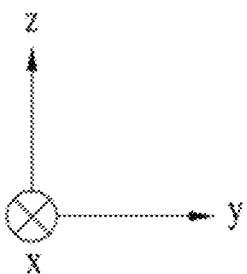
Figure 43B:
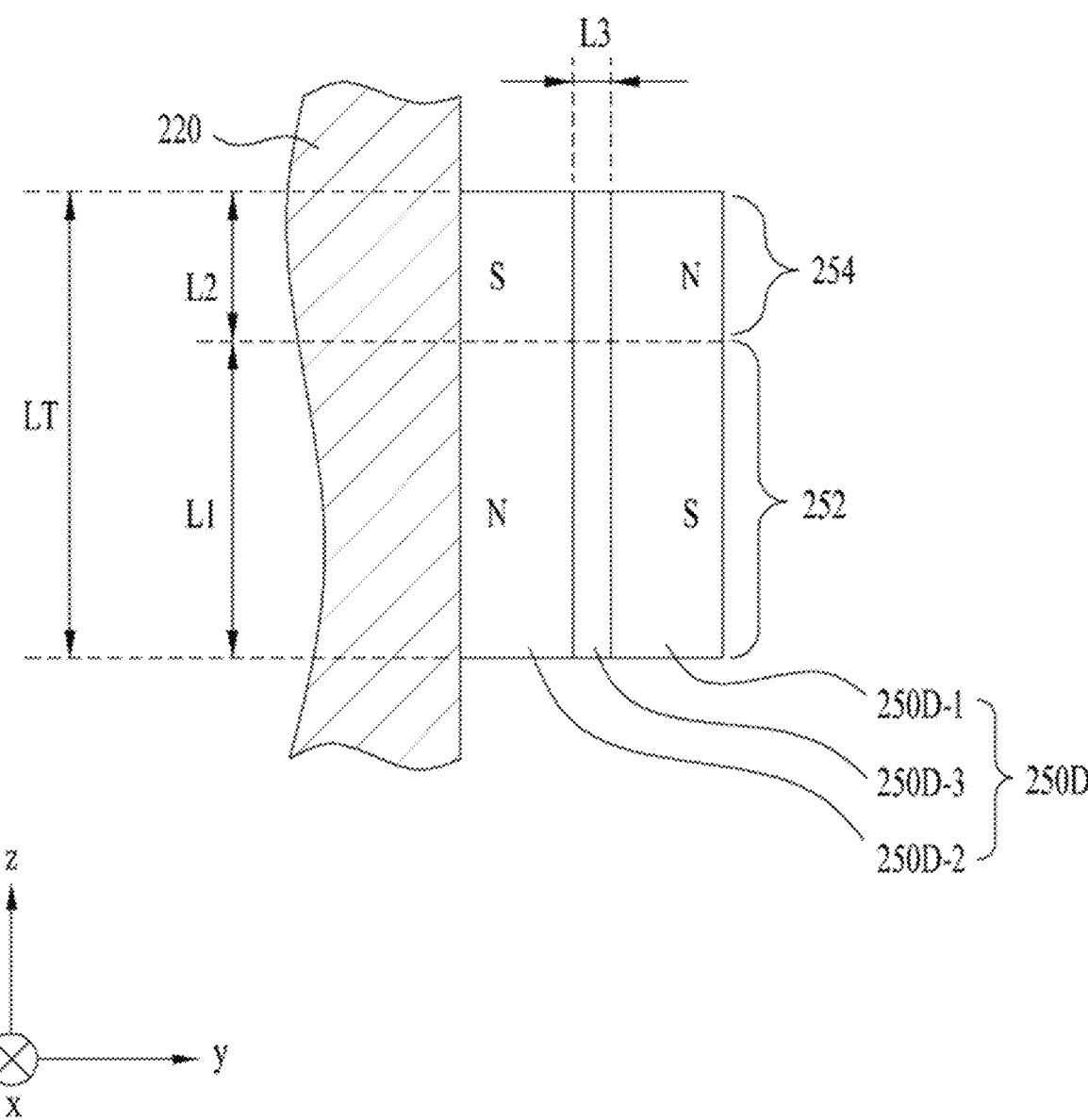

FIGS. 43a and 43b respectively show sectional views of embodiments 250C and 250D of the bipolar-magnetized magnet 250 depicted in FIG. 42.

Referring to FIG. 43a, the bipolar-magnetized magnet 250C may include first and second sensing magnets 250C-1 and 250C-2, and may further include a non-magnetic partition wall 250C-3. Referring to FIG. 43b, the bipolar-magnetized magnet 250D may include first and second sensing magnets 250D-1 and 250D-2, and may further include a non-magnetic partition wall 250D-3.

The first and second sensing magnets 250C-1 and 250C-2 illustrated in FIG. 43a may be arranged to be spaced apart from or in contact with each other, and the first and second sensing magnets 250D-1 and 250D-2 illustrated in FIG. 43b may be arranged to be spaced apart from or in contact with each other.

According to one embodiment, as illustrated in FIG. 43a, the first and second sensing magnets 250C-1 and 250C-2 may be arranged to be spaced apart from or in contact with each other in the direction parallel to the optical axis direction (that is, the z-axis direction).

Alternatively, according to another embodiment, as illustrated in FIG. 43b, the first and second sensing magnets 250D-1 and 250D-2 may be arranged to be spaced apart from or in contact with each other in the magnetization direction (that is, the y-axis direction).

The bipolar-magnetized magnet 250 in FIG. 42 is illustrated as being a magnet having the structure depicted in FIG. 43a, but may be replaced by a magnet having the structure depicted in FIG. 43b.

The non-magnetic partition wall 250C-3, as illustrated in FIG. 43a, may be disposed between the first and second sensing magnets 250C-1 and 250C-2, and the non-magnetic partition wall 250D-3, as illustrated in FIG. 43b, may be disposed between the first and second sensing magnets 250D-1 and 250D-2. The non-magnetic partition wall 250C-3 or 250D-3 may be an element that does not actually have magnetic properties, and may include a section having no polarity, which may contain air or a non-magnetic material.

Further, a third length L3 of the non-magnetic partition wall 250C-3 or 250C-3 may be five percent or more or fifty percent or less of the overall length LT of the bipolar-magnetized magnet 250C or 250C in the direction parallel to the optical axis direction.

Referring to FIGS. 38 and 42, in the initial state before the lens is moved in the optical axis direction, the height (z=zh) at which the middle of the position sensor 260 is positioned may face or may be aligned with the non-magnetic partition wall 250C-3 (or the space between the first side surface 252 and the second side surface 254) in the y-axis direction, which is the magnetization direction. This may mean that the top 253 of the first side surface 252 is located on an imaginary horizontal plane HS2, which extends from the height (z=zh) at which the middle of the position sensor 260 is positioned in the y-axis direction, which is the magnetization direction. Alternatively, the height (z=zh) at which the middle of the position sensor 260 is positioned may be aligned with a position between the top 253 and the second side surface 254.

As such, in the state in which the movable unit 220 is stationary without moving, when the bipolar-magnetized magnet 250 and the position sensor 260 are arranged as illustrated in FIG. 42, the intensity of the magnetic field having the first polarity, which is sensed by the position sensor 260, may be '0'.

As illustrated in FIG. 37a or 43a, the first side surface 252 may correspond to the side surface of the first sensing magnet 250A-1 or 250C-1 that faces the position sensor 260. Also, as illustrated in FIG. 37a or 43a, the second side surface 254 may correspond to the side surface of the second sensing magnet 250A-2 or 250C-2 that faces the position sensor 260.

Alternatively, as illustrated in FIG. 37b or 43b, the first and second side surfaces 252 and 254 may correspond to the side surface of the first sensing magnet 250B-1 or 250D-1 that faces the position sensor 260.

Figure 44:
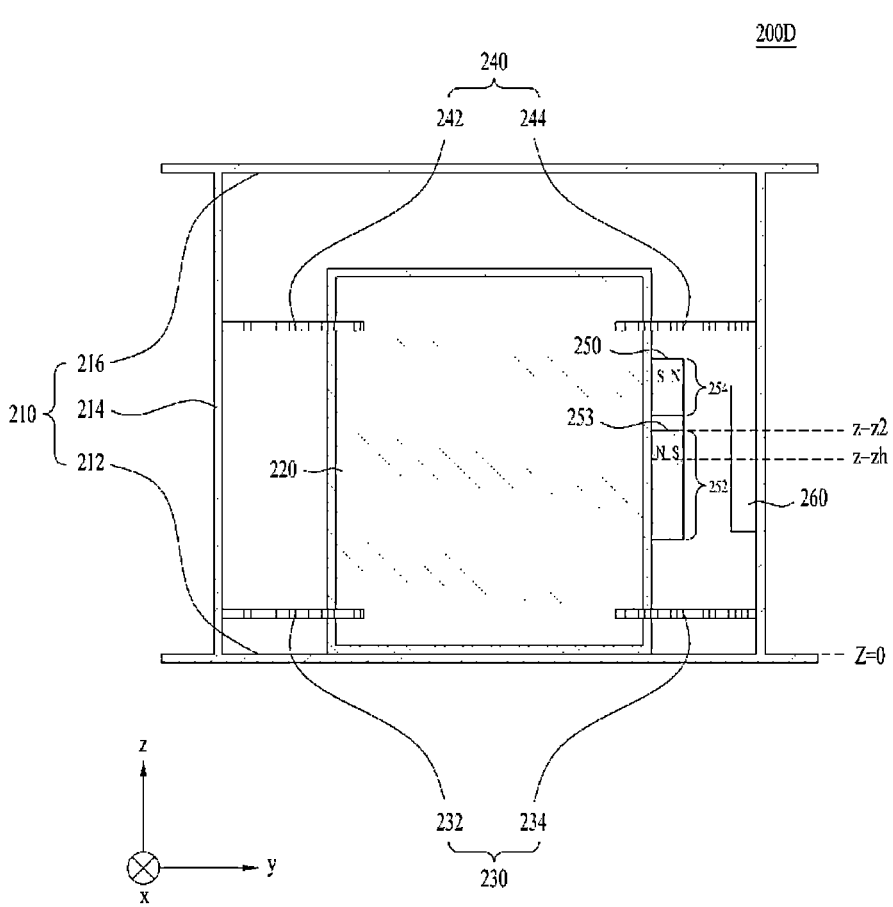
FIG. 44 shows a sectional view of a lens driving device according to a 4-$4^{th}$ embodiment.

FIG. 44 shows a sectional view of a lens driving device 200D according to a 4-4$^{th}$ embodiment.

Referring to FIG. 44, in the initial state before the lens is moved in the optical axis direction, the height (z=zh) at which the middle of the position sensor 260 is positioned is aligned with a first point on the first side surface 252 in the y-axis direction, which is the magnetization direction. Here, the first point may be a certain point located between the top and the bottom of the first side surface 252, for example, the height at which the middle of the first side surface 252 is positioned.

In the state before the movable unit 220 is moved, the bipolar-magnetized magnet 250 of the lens driving device 200D illustrated in FIG. 44 may be located at a position that is a distance (z2-zh) higher than that of the bipolar-magnetized magnet 250 of the lens driving device 200C illustrated in FIG. 42. In this case, referring to FIG. 38, the minimum intensity of the magnetic field having the first polarity, which is sensed by the positon sensor 260, may be a value B2.

When current is applied to the first coil in the lens driving device 200D illustrated in FIG. 44, the movable unit 220 is capable of being lifted to the upper limit height (z1), like the lens driving device 200A. At this time, the upper limit lifting height of the movable unit 220 may be adjusted using a mechanical stopper. Alternatively, the upper limit lifting height of the movable unit 220 may be changed by adjusting the elastic modulus of the lower spring 230 and the upper spring 240.

In the case of the lens driving device 200D illustrated in FIG. 44, as well as the lens driving device 200A illustrated in FIGS. 36 and 39, it can be known that the intensity of the magnetic field having the first polarity sensed by the position sensor 260 is changed linearly between B2 and B 1.

It can be known from FIG. 40 that the maximum displacement D1 that the movable unit 220 of the lens driving device 200D illustrated in FIG. 44 is able to move is z1-z2.

In the above-described lens driving device 200A, 200B, 200C or 200D illustrated in FIGS. 36, 39, 41, 42 and 44, the movable unit 220 may move only in one direction of the optical axis, that is, in the +z-axis direction, from its initial position. However, the embodiment is not limited thereto. That is, according to another embodiment, when current is applied to the first coil, the lens driving device may move in both directions of the optical axis, that is, in the +z-axis direction or in the −z-axis direction, from its initial position. The constitution and operation of the lens driving device according to this embodiment will be described later.

Figure 45:
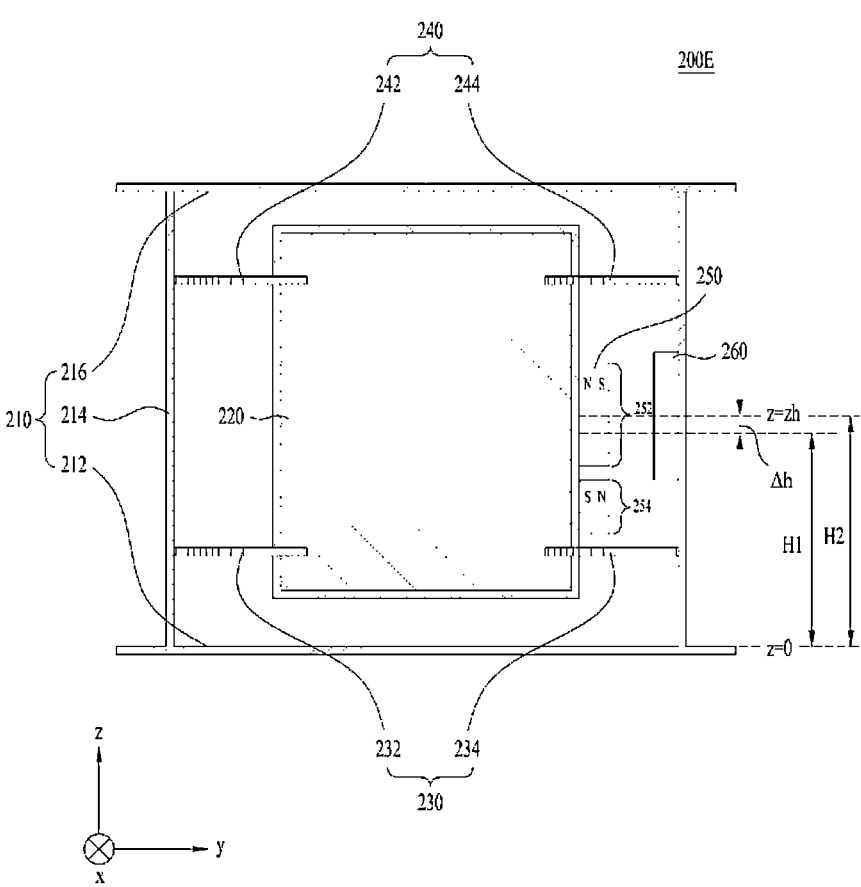
FIG. 45 shows a sectional view of a lens driving device according to a 4-$5^{th}$ embodiment.

FIG. 45 shows a sectional view of a lens driving device 200E according to a 4-5$^{th}$ embodiment.

Unlike the above-described lens driving device 200A or 200B, the lens driving device 200E illustrated in FIG. 45 may move in the +z-axis direction or in the −z-axis direction from its initial position. Therefore, the embodiment has a configuration such that the movable unit 220 is in a state of floating in space due to the lower and upper springs 230 and 240. Except for this, the constitutional components of the lens driving device 200E illustrated in FIG. 45 are the same as those of the above-described lens driving device 200A or 200B, and therefore, duplicated explanations thereof will be omitted.

Referring to FIG. 45, in the initial state before the lens is moved in the optical axis direction, that is, in which the movable unit 220 is stationary without moving, the height (z=zh) at which the middle of the position sensor 260 is positioned may be aligned with a first point on the first side surface 252 in the magnetization direction. Here, the first point may be a certain point located between the top and the bottom of the first side surface 252, for example, the height at which the middle of the first side surface 252 is positioned.

Figure 46:
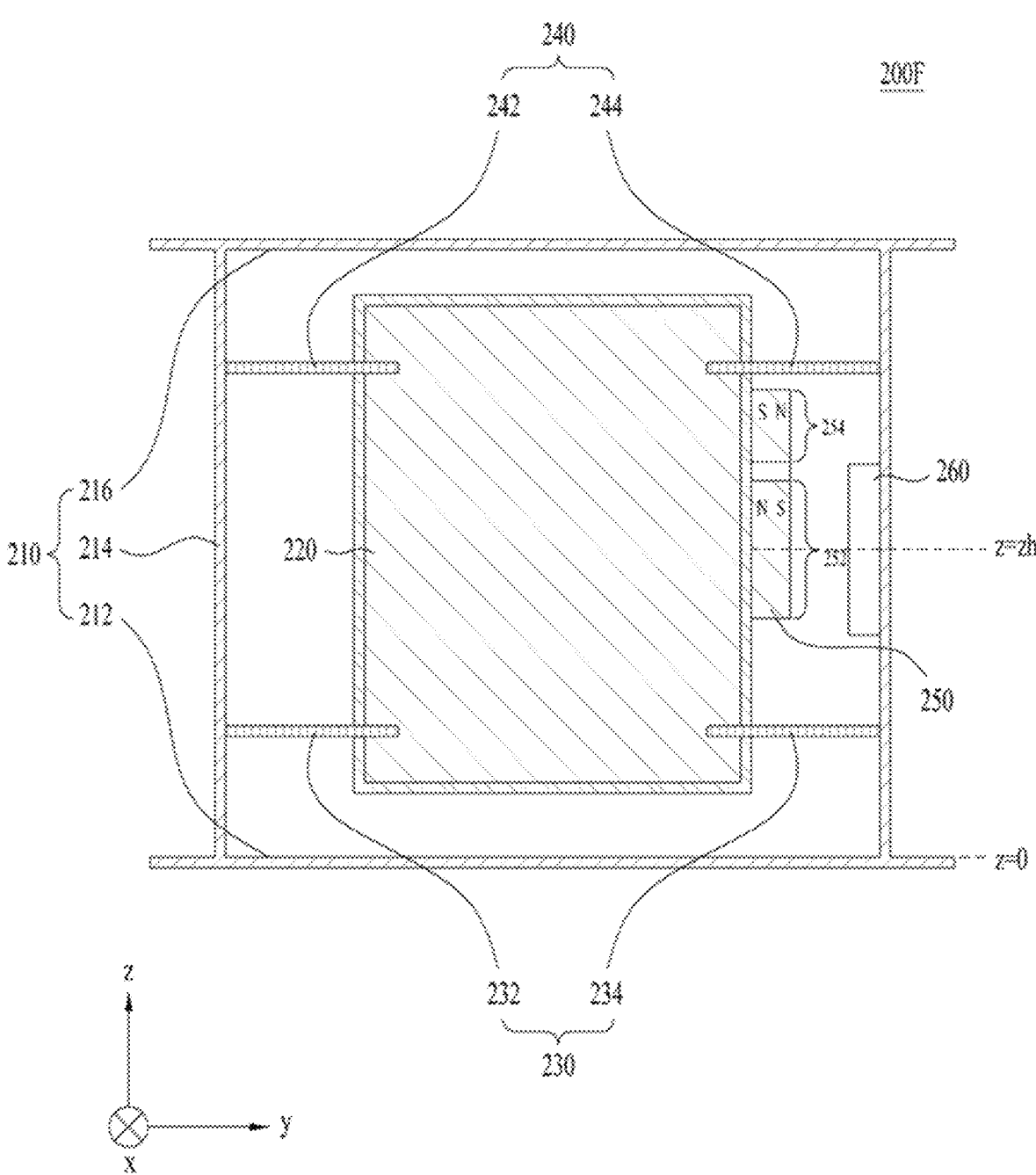
FIG. 46 shows a sectional view of a lens driving device according to a 4-$6^{th}$ embodiment.

FIG. 46 shows a sectional view of a lens driving device 200F according to a 4-6$^{th}$ embodiment.

Unlike the above-described lens driving device 200C or 200D illustrated in FIG. 42 or 44, the lens driving device 200F illustrated in FIG. 46 may move in the +z-axis direction or in the −z-axis direction. Therefore, the embodiment has a configuration such that the movable unit 220 is in a state of floating in space due to the lower and upper springs 230 and 240. Except for this, the constitutional components of the lens driving device 200F illustrated in FIG. 46 are the same as those of the above-described lens driving device 200C or 200D, and therefore, duplicated explanations thereof will be omitted.

Referring to FIG. 46, in the initial state before the lens is moved in the optical axis direction, the height (z=zh) at which the middle of the position sensor 260 is positioned may be aligned with a first point on the first side surface 252 in the magnetization direction. Here, the first point may be a certain point located between the top and the bottom of the first side surface 252, for example, the height at which middle of the first side surface 252 is positioned.

In the lens driving device 200E or 200F illustrated in FIG. 45 or 46, upward and downward movement of the movable unit 220 may be the same as that illustrated in FIG. 38. Therefore, the operation of the lens driving device 200E or 200F illustrated in FIG. 45 or 46 will now be described with reference to FIG. 38.

In the lens driving device 200E or 200F, in the initial state before the lens is moved in the optical axis direction, that is, in which the movable unit 220 is stationary without moving up or down or is at its initial position, when the position sensor 260 and the bipolar-magnetized magnet 250 are arranged as illustrated in FIG. 45 or 46, the magnetic field having the first polarity, which is sensed by the position sensor 260, may be B3. When the movable unit 220 is stationary without moving up or down or is at the initial position, the initial value of the magnetic field sensed by the position sensor 260 may be changed or adjusted depending on the design specifications of the position sensor 260 and the bipolar-magnetized magnet 250, such as, for example, the distance between these components 260 and 250.

Figure 47:
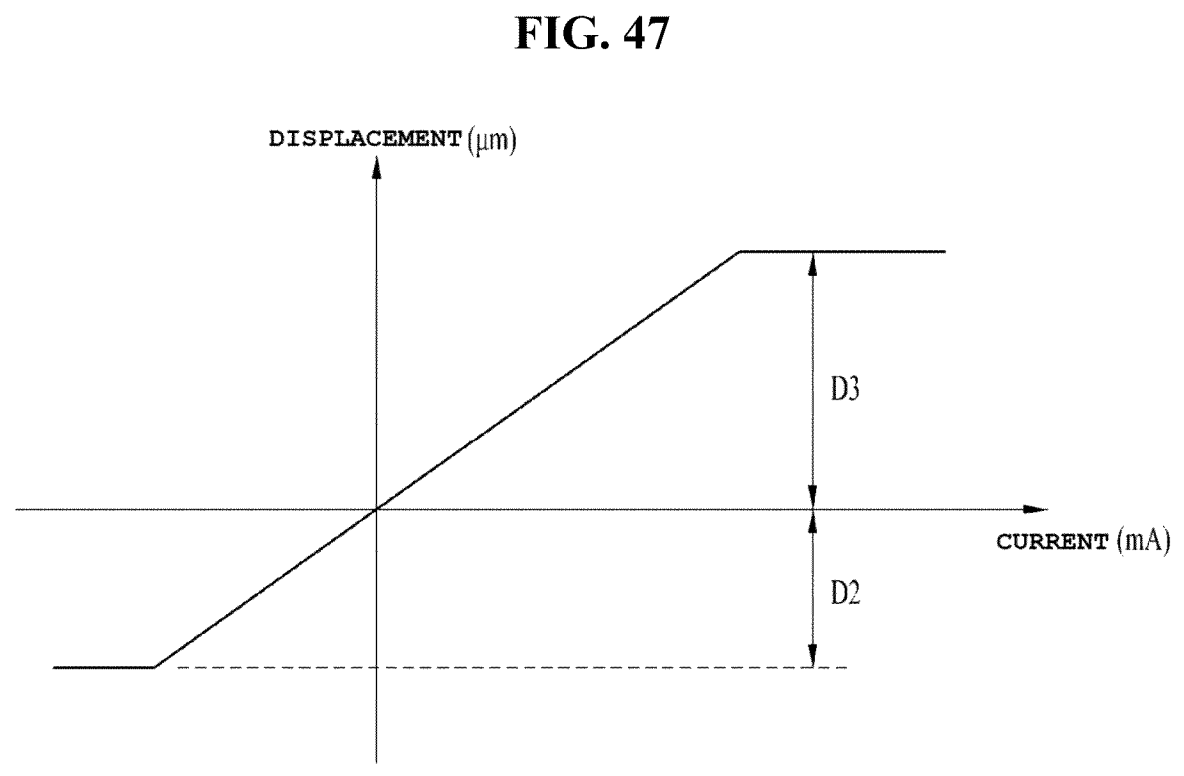

FIG. 47 is a graph showing the displacement of the movable unit 220 depending on electric current supplied to the first coil in the lens driving devices 200E and 200F depicted in FIGS. 45 and 46, in which the horizontal axis represents current supplied to the first coil, and the vertical axis represents the displacement. Further, the right side of the horizontal axis from the vertical axis may represent forward current, current in the forward direction, or +current, and the left side of the horizontal axis from the vertical axis may represent reverse current, current in the reverse direction, or −current.

When the movable unit 220 is stationary without moving or is at its initial position, as illustrated in FIG. 45 or 46, if the intensity of the forward current applied to the first coil is increased, the movable unit 220 may be lifted a predetermined distance (z=z4) in the +z-axis direction. In this case, referring to FIG. 38, the intensity of the magnetic field, which is sensed by the position sensor 260, may be increased from B3 to B4.

Further, when the movable unit 220 is stationary without moving or is at its initial position, as illustrated in FIG. 45 or 46, if the intensity of the reverse current applied to the first coil is increased, or if the intensity of the forward current supplied to the first coil is decreased after the movable unit 220 is moved in the +z-axis direction, the movable unit 220 may drop. In this case, referring to FIG. 38, the intensity of the magnetic field, which is sensed by the position sensor 260, may be decreased from B3 to B5 or from B4 to B3.

As described above, in the lens driving device 200E or 200F illustrated in FIG. 45 or 46, it can be known that the intensity of the magnetic field having the first polarity, which is sensed by the position sensor 260, is changed linearly between B5 and B4.

Referring to FIG. 47, in the configuration in which the movable unit 200 is movable in both directions, as described above, an upward-displacement range D3 and a downward-displacement range D2 of the movable unit 220 may be the same, or the upward-displacement range D3 may be larger than the downward-displacement range D2.

If the upward-displacement range D3 is the same as the downward-displacement range D2, in the initial state before the lens is moved in the optical axis direction, the height (z=zh) at which the middle of the position sensor 260 is positioned may be aligned with the above-described first point in the y-axis direction, which is the magnetization direction. However, if the upward-displacement range D3 is larger than the downward-displacement range D2, when the lens is in an initial state before being moved in the optical axis direction or is at its initial position, the height (z=zh) at which the middle of the position sensor 260 is positioned may be aligned with a second point, which is higher than the above-described first point, in the y-axis direction, which is the magnetization direction. That is, the height at which the position sensor 260 is positioned relative to the bipolar-magnetized magnet 250 when the upward-displacement range D3 is larger than the downward-displacement range D2 may be relatively higher than that when the upward-displacement range D3 is the same as the downward-displacement range D2.

In this case, the difference between the second point and the first point may be calculated using the following Equation 1.

$$\Delta h = H2 - H1 = \frac{\Delta D}{2} \pm \frac{D}{2} \qquad \text{Equation 1}$$

Here, H2 may be a height of the second point, H1 may be a height of the first point, ΔD may be a value calculated by subtracting the downward-displacement range D2 from the upward-displacement range D3 of the movable unit 220, and D may be the displacement range (D2+D3) of the movable unit 220.

Figure 48:
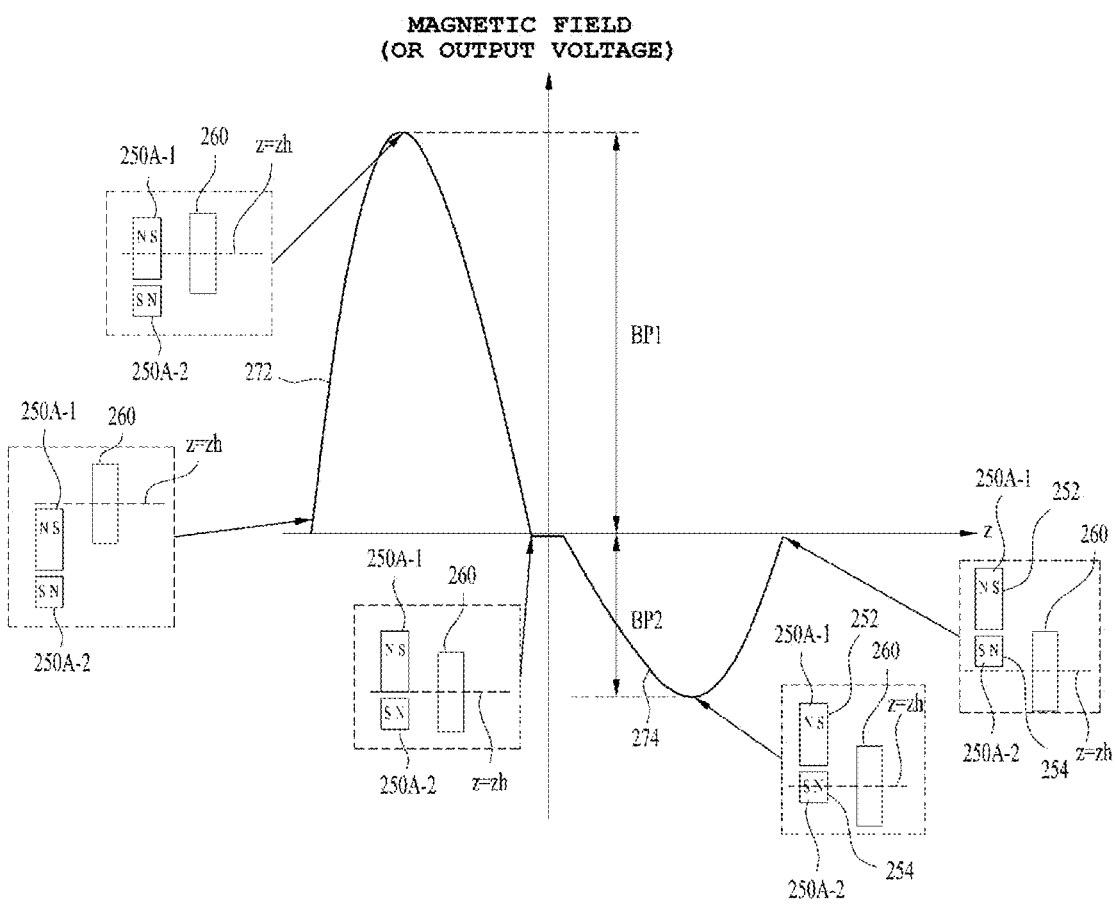
FIG. 48 is a graph showing the intensity of a magnetic field sensed by a position sensor in respective arrangement relationships between the position sensor and the bipolar-magnetized magnets, which are changed depending on a moving distance of the movable unit in the optical axis direction.

FIG. 48 is a graph showing the intensity of the magnetic field (or the output voltage), which is sensed by the position sensor 260, depending on the moving distance of the movable unit 220 in the optical axis direction, according to the respective arrangement relationships between the position sensor 260 and the bipolar-magnetized magnets 250-1 and 250-2 in which a vertical axis represents the intensity of the magnetic field (or the output voltage) and a horizontal axis represents the moving distance of the movable unit 220 in the optical axis direction.

In the graph illustrated in FIG. 48, the structure of the bipolar-magnetized magnet 250, which faces the position sensor 260, corresponds to the first and second sensing magnets 250A-1 and 250A-2 illustrated in FIG. 37*a*. However, instead of the first and second sensing magnets 250A-1 and 250A-2 illustrated in FIG. 37*a*, when the first and second sensing magnets 250B-1 and 250B-2 illustrated in FIG. 37*b*, the first and second sensing magnets 250C-1 and 250C-2 illustrated in FIG. 43*a*, or the first and second sensing magnets 250D-1 and 250D-2 illustrated in FIG. 43*b* are arranged to face the position sensor 260, the following explanation with respect to FIG. 48 may also, of course, be applied to this configuration.

Referring to FIG. 48, as described above, the magnetic field, which is sensed by the position sensor 260 and has an intensity that is changed linearly, may be a magnetic field 272 having a first polarity, for example, an S-pole. However, the embodiment is not limited thereto. That is, according to another embodiment, the magnetic field, which is sensed by the position sensor 260 and has an intensity that is changed linearly, may be a magnetic field 274 having a second polarity, for example, an N-pole.

If the magnetic field, which is sensed by the position sensor 260 and has an intensity that is changed linearly, is not the magnetic field having the first polarity but the magnetic field 274 having the second polarity, that is, the N-pole, as illustrated in FIG. 48, when the lens is in an initial state before being moved in z-axis direction, which is the optical axis direction, or is at the initial position, the height (z=zh) at which the middle of the position sensor 260 is positioned may be aligned with a first point on the second side surface 254. Here, the first point may be a certain point located between the top and the bottom of the second side surface 254, for example, the height at which the middle of the second side surface 254 is positioned. Subsequently, when the lens is moved to the upper limit position in the +z-axis direction, which is the optical axis direction, the height (z=zh) at which the middle of the position sensor 260 is positioned may be aligned with a point that is lower than the bottom of the second side surface 254.

Further, a first section BP1, in which the magnetic field 272 having an S-pole is changed linearly, is larger than a second section BP2, in which the magnetic field 274 having an N-pole is changed linearly. This is because the first length L1 of the first side surface 252 having an S-polarity is longer than the second length L2 of the second side surface 254 having an N-polarity. However, when the first side surface 252 having the first length L1, which is longer than the second length L2, has an N-polarity and the second side surface 254 having the second length L2, which is shorter than the first length L1, has an S-polarity, reference numeral 272 in FIG. 48 may correspond to the magnetic field having an N-polarity and reference numeral 274 may correspond to the magnetic field having an S-polarity. Although not illustrated, if the polarities are switched as described above, the polarities of the Y-axis may also be reversed.

Figure 49A:
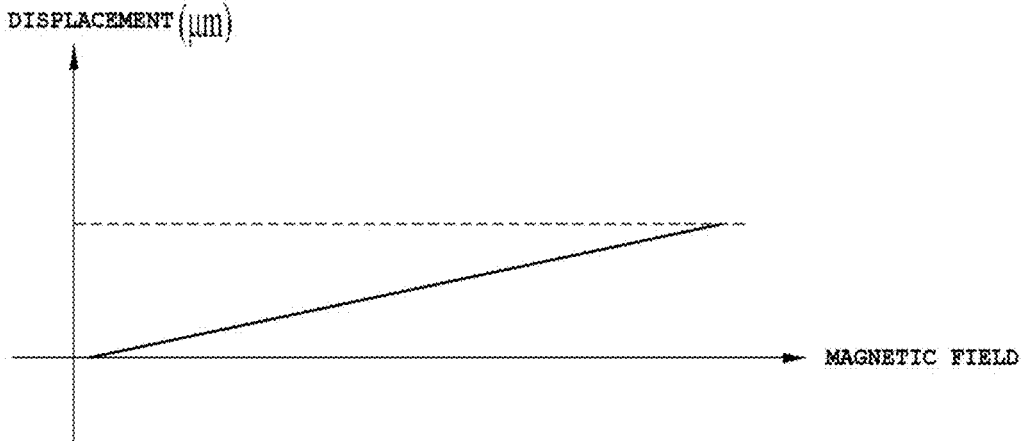
FIGS. 49a and 49b are graphs showing the displacement depending on intensity of a magnetic field sensed by the position sensor.
Figure 49B:
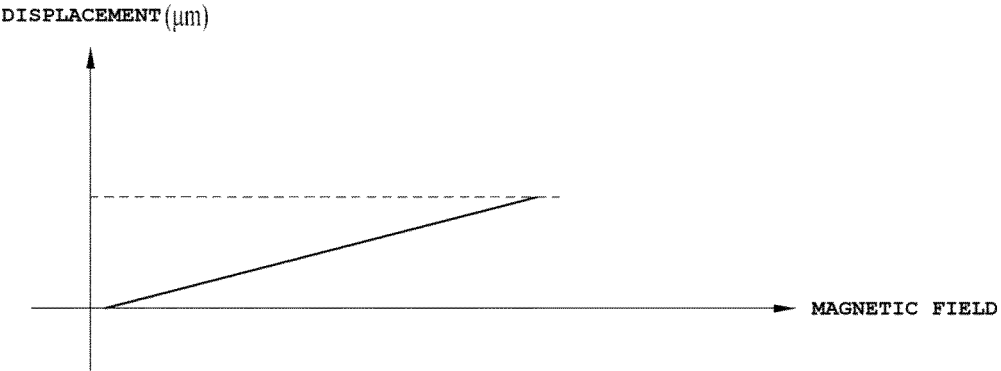

FIGS. 49*a* and 49*b* are graphs showing the displacement depending on the intensity of the magnetic field sensed by the position sensor 260, in which the horizontal axis represents the magnetic field and the vertical axis represents the displacement.

If the position sensor 260 and the bipolar-magnetized magnet 250 are arranged so as to sense the magnetic field in the first section BP1, which is a larger linear section than the second section BP2 illustrated in FIG. 48, as illustrated in FIG. 49*a*, the displacement may be detected even when the change in the sensed magnetic field is small. Meanwhile, if the position sensor 260 and the bipolar-magnetized magnet 250 are arranged so as to sense the magnetic field in the second section BP2, which is a smaller linear section than the first section BP1 illustrated in FIG. 48, as illustrated in FIG. 49*b*, the degree to which the minute displacement can be detected when the change in the sensed magnetic field is small is smaller than that in the configuration in FIG. 49*a*. That is, the slope in the graph in FIG. 49*a* and the slope in the graph in FIG. 49*b* may be different from each other. Therefore, as illustrated in FIG. 49*a*, the configuration in which the position sensor 260 and the bipolar-magnetized magnet 250 are arranged so as to allow the position sensor 260 to sense the magnetic field in the first section BP1, which is larger than the second section BP2, is capable of detecting the displacement at much higher resolution. That is, as the section in which the intensity of a magnetic field is changed linearly increases, the change in displacement with respect to the encoded magnetic field may be checked more accurately.

Further, according to the embodiment, the intensity of the magnetic field, which is sensed by the position sensor 260 and is changed linearly, may be encoded using 7 to 12 bits. In this case, the control unit (not illustrated) may include a look-up table (not illustrated) so as to precisely control the displacement of the movable unit 220 using the position sensor 260. The displacement and the code values corresponding to the intensity of the magnetic field that match the respective displacement may be stored in the look-up table. For example, referring to FIG. 38, the intensity of the magnetic field, from the minimum magnetic field B0 to the maximum magnetic field B 1, may match the respective displacement z, and may be encoded using 7 to 12 bits. Therefore, in order to control the displacement of the movable unit 220, the control unit may seek a corresponding code value, and may move the movable unit 220 to a position that matches the sought code value in the optical axis direction. The control unit may be disposed or included in the image sensor, or may be disposed or included in the first circuit board, to which the image sensor is mounted.

Further, in the above-described lens driving devices 200A to 200F, the length LT of the bipolar-magnetized magnet 250 in the z-axis direction, which is parallel to the optical axis direction, may be at least 1.5 times larger than the movable range, that is, the maximum displacement of the movable unit 220. For example, referring to FIGS. 36 and 39, since the movable range, that is, the maximum displacement of the movable unit 220, is z1, the length LT of the bipolar-magnetized magnet 250 may be 1.5*z1 or more.

It has been described above that the lens driving devices 200A to 200F have a configuration such that the position sensor 260 is positioned in the fixed unit 210 in a coupling, contacting, supporting, provisional securing, inserting or seating manner and the bipolar-magnetized magnet 250 is positioned in the movable unit 220 in a coupling, contacting, supporting, securing, provisional securing, inserting or seating manner. However, the embodiment is not limited to this configuration.

That is, according to another embodiment, the position sensor 260 may be positioned in the movable unit 220 in a coupling, contacting, supporting, provisional securing, inserting or seating manner and the bipolar-magnetized magnet 250 may be positioned in the fixed unit 210 in a coupling, contacting, supporting, securing, provisional securing, inserting or seating manner, and the above explanation may also be applied to this configuration.

Figure 50:
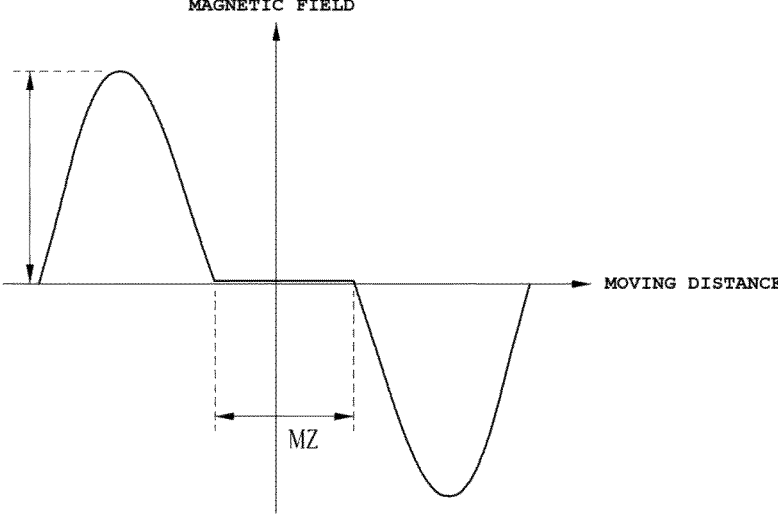
FIG. 50 is a graph for explaining a change of intensity of a magnetic field depending on a moving distance of a movable unit in a lens driving device according to a comparative example.

FIG. 50 is a graph for explaining a change in the intensity of a magnetic field depending on a moving distance of the movable unit 220 in a lens driving device according to a comparative example, in which a horizontal axis represents a moving distance and a vertical axis represents the intensity of a magnetic field.

If the position sensor 260 is not biased closer to any one of the first and second side surfaces 252 and 254 of the bipolar-magnetized magnet 250 and the first and second lengths L1 and L2 in the optical axis direction are the same, a change in the magnetic field, which is sensed by the position sensor 260 while the movable unit 220 is moved, may be as shown in FIG. 50. At this time, referring to FIG. 50, the polarities of the magnetic field sensed by the position sensor 260 may be opposite each other about a mutual zone (MZ). Here, the mutual zone (MZ) is a zone in which, although the movable unit 220 is moved, the intensity of the magnetic field sensed by the position sensor 260 is fixed to '0'. This mutual zone (MZ) may not be handled even by software-based processing. Therefore, because the position sensor 260 cannot but recognize the intensity of the magnetic field as '0' in the mutual zone (MZ), the moving distance of the movable unit 220 in the mutual zone (MZ) cannot be accurately measured or controlled.

However, according to the embodiment, since the bipolar-magnetized magnet 250 is configured such that the first length L1 is longer than the second length L2 and the magnetic field having the first polarity, the intensity of which is changed linearly, is sensed by the position sensor 260, the problem with the above-described comparative example may be inhibited. Accordingly, the design margin and reliability of the lens driving devices 200A to 200F may be improved.

Figure 51:
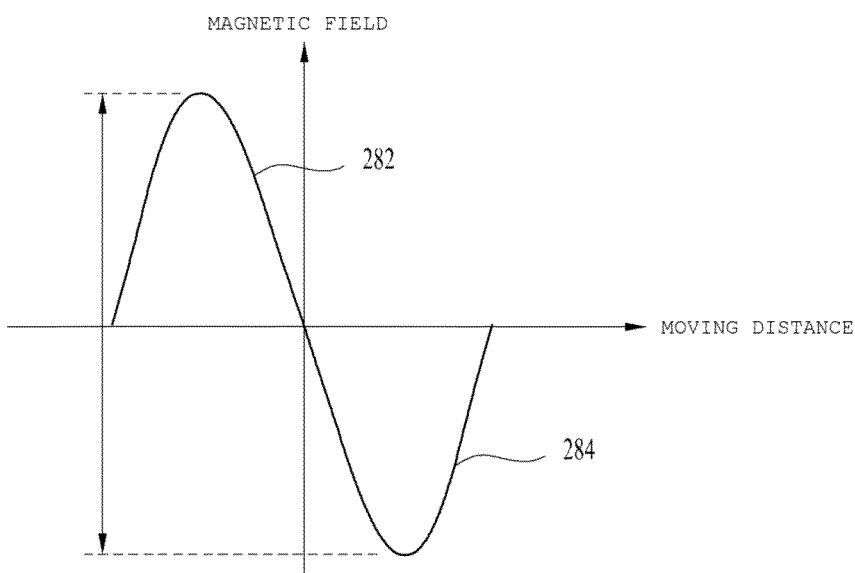
FIG. 51 is a graph showing a change of a magnetic field sensed by the position sensor depending on movement of the movable unit in the lens driving device according to the embodiment.

FIG. 51 is a graph showing a change of a magnetic field sensed by the position sensor 260 depending on movement of the movable unit 220 in the lens driving device according to the embodiment, in which a horizontal axis represents a moving distance and a vertical axis represents a magnetic field.

If the third length L3 of the above-described non-magnetic partition wall 250A-1 or 250C-1 is decreased to fifty percent or less of the overall length LT of the bipolar-magnetized magnet 250, as illustrated in FIG. 51, the mutual zone (MZ) may be almost eliminated. At this time, the height (z=zh) at which the middle of the position sensor 260 is positioned may be aligned with the height at which the middle of the bipolar-magnetized magnet 250 is positioned. In this case, the intensity of a magnetic field 282 having a first polarity and the intensity of a magnetic field 284 having a second polarity may be changed substantially linearly. Therefore, since the position sensor 260 is capable of sensing both the magnetic field 282 having a first polarity and the magnetic field 284 having a second polarity, the intensities of which are changed linearly depending on the movement of the movable unit 220, the embodiment may have relatively higher resolution than the configuration in which the position sensor 260 senses a magnetic field that has only one of the first and second polarities and has intensity that is changed linearly.

Further, if the third length L3 of the non-magnetic partition wall 250A-1 or 250C-1 is set to be ten percent or more of the overall length LT of the bipolar-magnetized magnet 250, the mutual zone (MZ) and the linear section of the magnetic field are clearly separated from each other, and thus the position sensor 260 is capable of sensing only the magnetic field that has one of the first and second polarities and has intensity that is changed linearly.

The above-described lens driving devices 1000-1, 2000, 3000, and 200A to 200F according to the 1$^{st}$ to 4$^{th}$ embodiments are applicable to camera modules (for example, reference numeral '1000' in the 1$^{st}$ embodiment) for mobile appliances such as mobile phones.

The camera module according to the 2$^{nd}$ to 4$^{th}$ embodiments may include the lens driving device 2000, 3000, and 200A to 200F according to the 2$^{nd}$ to 4$^{th}$ embodiments, the lens provided in the lens driving device 2000, 3000, and 200A to 200F according to the 2$^{nd}$ to 4$^{th}$ embodiments in a mounting, inserting, seating, contacting, coupling, securing, supporting or disposing manner, the image sensor (not illustrated) disposed at the lower portion, the second circuit board (not illustrated) (or the main circuit board) on which the image sensor is disposed, and the optical system.

At this time, the camera module according to the 2$^{nd}$ to 4$^{th}$ embodiments may further include the lens barrel, which is coupled to the bobbin 110A and 110B or the movable unit 220. The lens barrel is as described above, and the second circuit board, to which the image sensor is mounted, may serve as the bottom surface of the camera module. Further, the optical system may include at least one lens for transmitting an image to the image sensor.

Further, the above-described camera module according to the 1$^{st}$ to 4$^{th}$ embodiments may further include the camera module control unit (or the control unit) (not illustrated). The camera module control unit may compare a first displacement value, which is calculated based on a code value or an electric current change value, sensed by the displacement sensing part 82 and 180 or the position sensor 260, with a focal distance of the lens depending on the distance between the subject and the lens. Subsequently, if the focal distance of the lens does not correspond to the first displacement value or the current position of the lens, the camera module control unit may readjust the amount of electric current applied to the first coil 31 and 120 of the bobbin 30, 110A and 110B or the movable unit 220 or the code value, thereby moving the bobbin 30, 110A and 110B or the movable unit 220 by a second displacement amount in the first direction. Further, the displacement sensing part 82 and 180 or the position sensor 260, which are secured to the housing member 40 and 140 that is a fixed body or to the fixed unit 210, may sense the change of the intensity of a magnetic field (or magnetic force) emitted from the sensing magnet 70, 182A and 182B or the bipolar-magnetized magnet 250 depending on movement in the first direction of the sensing magnet 70, 182A and 182B or the bipolar-magnetized magnet 250, which is secured to the bobbin 30, 110A and 110B that is a movable body or to the movable unit 220, and an additional driver IC or the camera module control unit may calculate or determine the current position or the first displacement amount of the bobbin 30, 110A and 110B or the movable unit 220 based on the change amount of the electric current, which is output depending on the change amount of the intensity of the sensed magnetic field, or the mapped code value. The current position or the first displacement amount of the bobbin 30, 110A and 110B or the movable unit 220, which is calculated or determined using the displacement sensing part 82 and 180 or the position sensor 260, may be transmitted to the camera module control unit of the first circuit board 80, 170A and 170B, so that the camera module control unit is capable of re-determining the position of the bobbin 30, 110A and 110B or the movable unit 220 for auto-focusing and of adjusting the amount of current applied to the first coil 31 and 120, thereby maintaining the code value. Here, the applied amount of current may generate different outputs depending on the posture and conditions, and the amount of current applied to the first coil 31 and 120 may be adjusted corresponding thereto.

For example, referring to FIGS. 9 and 12, the camera module control unit may be included in the first circuit board 170A, and may readjust the amount of current applied to the first coil 120 based on the first displacement value sensed by the displacement sensing part 180. For example, the camera module control unit may receive signals from the 2-1$^{st}$ and 2-2$^{nd}$ pins of the Hall sensor 180. The camera module control unit may be mounted on the first circuit board 170A. Alternatively, according to another embodiment, the camera module control unit may not be mounted on the first circuit board 170A but may be mounted on an additional board. Here, the additional board may be the second circuit board (not illustrated), on which the image sensor (not illustrated) is mounted, in the camera module, or may be a separate another board. For example, the second circuit board may be the printed circuit board 10, on which the image sensor 11 depicted in FIG. 2 is mounted.

On the other hand, the optical system may include an actuator module capable of performing an auto-focusing function and a hand shake compensation function. The actuator module for performing the auto-focusing function may be constituted in various fashions, among which a voice coil unit motor is commonly used. The lens driving device 1000-1, 2000, 3000, and 200A to 200F according to the above-described embodiments may correspond to the actuator module for performing the auto-focusing function. However, the embodiment is not limited to the actuator module for performing only the auto-focusing function, and may also be applied to an actuator module capable of performing both the auto-focusing function and the hand shake compensation function.

Although not illustrated, if a second coil (not illustrated), a support member (not illustrated) and a plurality of sensing parts (not illustrated) are added to the above-described lens driving device 1000-1, 2000, 3000, and 200A to 200F of performing the auto-focusing function, the lens driving device 1000-1, 2000, 3000, and 200A to 200F is capable of performing the hand shake compensation function as well as the auto-focusing function. Here, the second coil may be arranged such that the bottom surface of the driving magnet 41 and 130 directly faces the second coil, the plurality of sensing parts may be respectively embodied as, for example, a Hall sensor, and the sensing parts, the second coil and the driving magnet 41 and 130 may be arranged in the same axis. Accordingly, the second coil may move the housing member 40 and 140 in the second direction and/or the third direction through interaction with the driving magnet 41 and 130, thereby performing the hand shake compensation.

At this time, the support member may be disposed on the top surface of the base 20 and 190 so as to resiliently (or elastically) support horizontal movement of the housing member 40 and 140 that is moved in the direction perpendicular to the first direction. Further, the base 20 and 190 may support the bottom of the housing member 40 and 140.

The camera module according to the 1$^{st}$ to 4$^{th}$ embodiments may further include an infrared cut-off filter (not illustrated). The infrared cut-off filter functions to inhibit infrared light from being introduced into the image sensor. In this case, the infrared cut-off filter may be mounted at a position corresponding to the image sensor in the base 190 and may be coupled to a holder member (not illustrated). Further, the base 190 may support the bottom of the holder member.

Further, in the camera module according to the $2^{nd}$ to $4^{th}$ embodiments, an additional terminal member for electrical connection with the second circuit board (not illustrated) may be mounted to the base 190, and such a terminal member may be integrally formed with the base 190 using a surface electrode.

On the other hand, the base 20 and 190 in the lens driving device 1000-1, 2000, 3000, and 200A to 200F according to the $1^{st}$ to $4^{th}$ embodiments may function as a sensor holder for protecting the image sensor (for example, corresponds to reference numeral 11 in the lens driving device according to the Pt embodiment), and in this case, protrusions may be formed downward along the side surfaces of the base 20 and 190. But, this is not an essential constitution, and although not illustrated, an additional sensor holder may be disposed below the base 20 and 190 so as to perform the image sensor protection.

The explanation of any one embodiment of the above-described lens driving devices 1000-1, 2000, 3000, and 200A to 200F according to the $1^{st}$ to $4^{th}$ embodiments may, of course, be applied to the other embodiments so long as it is not contrary to the explanation of the other embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

Mode for Invention

Various embodiments have been described in the best mode for carrying out the invention.

INDUSTRIAL APPLICABILITY

A lens driving device and a camera module including the same according to the embodiments are applicable to mobile appliances such as mobile phones (or, portable phone) and smart phones, and are also applicable to various multimedia fields including notebook type personal computers, tablet PCs, camera phones, PDAs, smart phones and toys, and to image input equipment including monitoring cameras and information terminals for video tape recorders.

The invention claimed is:

1. A lens driving device comprising:
a cover member;
a bobbin disposed in the cover member;
a coil disposed on the bobbin;
a driving magnet disposed between the bobbin and the cover member;
a sensing magnet disposed on the bobbin;
a sensor configured to sense a position of the sensing magnet;
a circuit board comprising a plurality of terminals formed on a lower end portion of the circuit board; and
two lower elastic members coupled with a lower portion of the bobbin and spaced apart from each other,
wherein the two lower elastic members electrically connect the coil and the circuit board.

2. The lens driving device of claim 1, wherein the lower elastic member comprises two terminals electrically connected with the circuit board.

3. The lens driving device of claim 1, wherein the bobbin comprises an accommodation recess recessed from an outer lateral surface of the bobbin, and
wherein the sensing magnet is disposed in the accommodation recess of the bobbin.

4. The lens driving device of claim 1, comprising an upper elastic member coupled with an upper portion of the bobbin,
wherein the upper elastic member is integrally formed.

5. The lens driving device of claim 1, wherein the cover member comprises an upper plate and a lateral plate,
wherein the lateral plate of the cover member comprises first and second lateral plates opposite to each other, and third and fourth lateral plates opposite to each other, and
wherein the driving magnet comprises a first magnet disposed on the first lateral plate, and a second magnet disposed on the second lateral plate.

6. The lens driving device of claim 5, wherein the driving magnet is not disposed on the third and fourth lateral plates.

7. The lens driving device of claim 6, wherein the sensing magnet is disposed on a first surface of the bobbin facing the third lateral plate of the cover member.

8. The lens driving device of claim 6, wherein the sensor is disposed on the circuit board, and
wherein at least a portion of the circuit board is disposed on the third lateral plate of the cover member.

9. The lens driving device of claim 1, wherein the bobbin comprises an adhesion recess recessed further from the accommodation recess, and
wherein an adhesive is disposed in the adhesion recess to fix the sensing magnet to the bobbin.

10. The lens driving device of claim 1, wherein the driving magnet is fixed with a lateral plate of the cover member by an adhesive.

11. The lens driving device of claim 5, wherein the cover member comprises an inner yoke extending from an inner edge of the upper plate,
wherein the coil is disposed on a periphery of the bobbin,
wherein the bobbin comprises a recess formed on the periphery of the bobbin and forming a space between the bobbin and the coil, and
wherein at least a part of the inner yoke is disposed in the space between the bobbin and the coil.

12. The lens driving device of claim 8, wherein the circuit board is disposed outside the third lateral plate of the cover member.

13. The lens driving device of claim 1, wherein the sensing magnet comprises an outer lateral surface facing the sensor, and
wherein a vertical length of the outer lateral surface of the sensing magnet is greater than a horizontal length of the outer lateral surface of the sensing magnet.

14. A camera module, comprising:
a printed circuit board;
an image sensor disposed on the printed circuit board;
the lens driving device of claim 1 disposed on the printed circuit board; and
a lens coupled to the bobbin of the lens driving device.

15. A mobile phone comprising the camera module of claim 14.

16. A lens driving device comprising:

a cover member comprising an upper plate and a lateral plate;

a bobbin disposed in the cover member;

a coil disposed on the bobbin;

a driving magnet disposed between the bobbin and the cover member, a sensing magnet disposed on the bobbin;

a circuit board disposed on the lateral plate of the cover member;

a sensor configured to sense a position of the sensing magnet and disposed on the circuit board; and a lower elastic member coupled with a lower portion of the bobbin, wherein the lower elastic member comprises two terminals electrically connected with the circuit board.

17. The lens driving device of claim 16, wherein the lower elastic member is electrically connected with the coil.

18. The lens driving device of claim 16, wherein the bobbin comprises an accommodation recess recessed from an outer lateral surface of the bobbin, and wherein the sensing magnet is disposed in the accommodation recess of the bobbin.

19. The lens driving device of claim 16, comprising an upper elastic member coupled with an upper portion of the bobbin, wherein the upper elastic member is integrally formed.

20. The lens driving device of claim 18, wherein the bobbin comprises an adhesion recess recessed further from the accommodation recess, and wherein an adhesive is disposed in the adhesion recess to fix the sensing magnet to the bobbin.

* * * * *